US008301651B2

(12) United States Patent
Jones et al.

(10) Patent No.: US 8,301,651 B2
(45) Date of Patent: Oct. 30, 2012

(54) METHOD AND SYSTEM FOR IMPROVING UTILIZATION OF HUMAN SEARCHERS

(75) Inventors: Scott A. Jones, Carmel, IN (US); Chris Lenzo, Carmel, IN (US); Thomas E. Cooper, Indianapolis, IN (US)

(73) Assignee: ChaCha Search, Inc., Carmel, IN (US)

( * ) Notice: Subject to any disclaimer, the term of this patent is extended or adjusted under 35 U.S.C. 154(b) by 297 days.

(21) Appl. No.: 12/275,864

(22) Filed: Nov. 21, 2008

(65) Prior Publication Data

US 2009/0132500 A1 May 21, 2009

Related U.S. Application Data

(60) Provisional application No. 60/989,664, filed on Nov. 21, 2007.

(51) Int. Cl.
*G06F 17/30* (2006.01)

(52) U.S. Cl. ........................................................ 707/765

(58) Field of Classification Search .................. 707/765
See application file for complete search history.

(56) References Cited

U.S. PATENT DOCUMENTS

| | | | |
|---|---|---|---|
| 5,974,406 A | 10/1999 | Bisdikian et al. | |
| 6,029,141 A | 2/2000 | Bezos | |
| 6,128,646 A | 10/2000 | Miloslavsky | |
| 6,363,377 B1 * | 3/2002 | Kravets et al. | 1/1 |
| 6,505,166 B1 | 1/2003 | Stephanou | |
| 6,594,799 B1 | 7/2003 | Robertson | |
| 6,732,156 B2 | 5/2004 | Miloslavsky | |
| 6,938,048 B1 | 8/2005 | Jilk et al. | |
| 6,968,513 B1 | 11/2005 | Rinebold | |
| 7,069,028 B2 | 6/2006 | Natsuno | |
| 7,155,400 B1 | 12/2006 | Jilk et al. | |
| 7,209,909 B2 | 4/2007 | Jeanblanc et al. | |
| 7,249,064 B1 | 7/2007 | Carmen | |
| 7,287,021 B2 | 10/2007 | De Smet | |
| 7,571,161 B2 * | 8/2009 | Watson | 1/1 |
| 2001/0054064 A1 * | 12/2001 | Kannan | 709/203 |
| 2002/0082960 A1 | 6/2002 | Goedken | |
| 2002/0140715 A1 * | 10/2002 | Smet | 345/700 |
| 2003/0014331 A1 | 1/2003 | Simons | |
| 2004/0030556 A1 * | 2/2004 | Bennett | 704/270 |
| 2004/0030688 A1 | 2/2004 | Aridor et al. | |
| 2004/0044542 A1 * | 3/2004 | Beniaminy et al. | 705/1 |
| 2004/0083195 A1 * | 4/2004 | McCord et al. | 706/47 |

(Continued)

FOREIGN PATENT DOCUMENTS

WO WO2007117513 10/2007

(Continued)

OTHER PUBLICATIONS

PCT International Search Report issued on Jan. 15, 2009 in corresponding PCT Patent Application PCT/US 08/84408.

*Primary Examiner* — William Spieler

(57) ABSTRACT

A method and system of improving utilization of human searcher(s) in a search system provides an ambassador guide who may categorize and structure a request, interact with a user, provide a search result, and review a search result. The ambassador guide improves response time, automation, and efficiency of use of searchers and resources of the search system. A toolset may be provided to an ambassador to assist in rapidly executing relevant tasks.

20 Claims, 38 Drawing Sheets

U.S. PATENT DOCUMENTS

| | | |
|---|---|---|
| 2004/0153352 A1 | 8/2004 | Berns |
| 2004/0199397 A1 | 10/2004 | Dresden |
| 2004/0210661 A1 | 10/2004 | Thompson |
| 2005/0055298 A1 | 3/2005 | Czora |
| 2005/0119957 A1 | 6/2005 | Faber et al. |
| 2005/0154717 A1 | 7/2005 | Watson |
| 2006/0010126 A1* | 1/2006 | Anick et al. ............. 707/4 |
| 2006/0041476 A1 | 2/2006 | Zheng |
| 2006/0143160 A1 | 6/2006 | Vayssiere |
| 2006/0167896 A1* | 7/2006 | Kapur et al. ............ 707/10 |
| 2006/0195442 A1 | 8/2006 | Cone et al. |
| 2006/0212817 A1* | 9/2006 | Paek et al. ............. 715/745 |
| 2006/0235690 A1 | 10/2006 | Tomasic et al. |
| 2006/0294083 A1 | 12/2006 | Benton et al. |
| 2007/0043583 A1 | 2/2007 | Davulcu |
| 2007/0174244 A1* | 7/2007 | Jones .................. 707/3 |
| 2007/0174273 A1* | 7/2007 | Jones et al. ............. 707/5 |
| 2007/0185841 A1 | 8/2007 | Jones et al. |
| 2007/0208570 A1 | 9/2007 | Bhardwaj |
| 2007/0239675 A1 | 10/2007 | Ragno et al. |
| 2007/0244866 A1 | 10/2007 | Mishkanian et al. |
| 2007/0260601 A1 | 11/2007 | Thompson |
| 2007/0266002 A1* | 11/2007 | Chowdhury et al. ........ 707/2 |
| 2008/0028039 A1 | 1/2008 | Christopher |
| 2008/0033770 A1 | 2/2008 | Barth |
| 2008/0033823 A1 | 2/2008 | Monteverde |

FOREIGN PATENT DOCUMENTS

WO    WO2007117973    10/2007

* cited by examiner

RAW QUERY RECORD 500

| | Description | Example Content |
|---|---|---|
| 505 | Query ID | 'Who is the #1 quarterback for the Bears?' |
| 510 | Keyword | 'bears','quarterback' |
| 515 | Category | 'Sports>News>NFL'; 'Sports>NCAA>Football' |
| 520 | Structured Query | 'Who is the quarterback for the Bears?'; 'Who is the starting quarterback for the Chicago Bears?'; 'Who is the current quarterback for the University of California Bears?' |
| 525 | User List | 'Bill 1023' |
| 530 | Profile | 'Bill 1023_profile' |
| 535 | Search resource ID | 'Sporting News';'NFL Network';'Chicago SunTimes' 'NCAA News' |
| 540 | Search result ID | 'Kyle Orton is the QB - Go Bears'; 'www.nfl.com/bears/kyleorton' |
| 545 | Guide ID | 'Ambassador 100'; 'Searcher 22' |

FIG. 5

VETTED QUERY RECORD

600

| | Description | Example Content |
|---|---|---|
| 605 | Vetted Query ID | 'Who is the quarterback for the Chicago Bears?' |
| 610 | Keyword | 'Chicago Bears';'quarterback' |
| 615 | Category | Sports>News>NFL; Sports>People>Chicago; |
| 620 | Raw Query | 'Who is the quarterback for the Bears?'; 'Who is the #1 quarterback for the Bears?' 'Chicago Bears quarterback'; |
| 625 | User List | 'Bill 1023';'Mark 1000' |
| 630 | Profile | 'Bears Fans' |
| 635 | Search Result ID | 'Kyle Orton is the QB - Go Bears';'www.nfl.com/bears/kyleorton'; 'I am in love with Kyle Orton!';'www.kyleortonfans.com' |
| 640 | Searcher ID | 'Searcher 22';'Searcher 2242' |

ChaCha Guide Sign-Up

Join the Search Engine Revolution!

We need smart people who are really good at Internet searching to power the best search experience on the web.

Signing up is easy. The process takes less than an hour. And, if you get interrupted at any time, simply log out. When you're ready to finish, use your User Name and Password to get back in... right where you left off.

1. Sign-Up - Fill out the information below, and click SIGN-UP
2. Introduction - Watch the brief introduction to ChaCha video

FAQ's

What is ChaCha?
What is a ChaCha guide?
What if I stop in the middle of the process?
When can I start working?
What are the minimum system requirements for guides?

— 885

Bold fields required

Credentials
- User Name (805)
  - (a-z, 0-9) characters only. No spaces
- Password — 830
- Confirm Password — 835
- Email — 840
- blah@blah.com — 845

Basic Information (810)
- First Name
- MI — 852
- Last Name — 854
- Address Line 1 — 850
- Address Line 1
- City — 856
- State — 858 (Alaska)
- Postal Code
- Phone Number — 860
- 866
- 862
- 864
- Gender — 868
- Date of Birth (August 20 2007) — 870
- Required for password retrieval

Areas of Interest (815)
☐ Art ☐ Business ☐ Computers ☐ Games ☐ Health ☐ Home
☐ Kids & Teens ☐ News ☐ Recreation ☐ Reference ☐ Regional
☐ Science ☐ Shopping ☐ Society ☐ Sports ☐ World

Additional Information (820)
- Education Level [High School] — 880
- Internet Connect Speed [Uber Fast] — 882
- How did you hear about ChaCha? [You Mom] — 884

[ Sign Up ] — 825

Verify all required fields are filled in

Instruction and Overview Page Module

So you want to be a ChaCha Guide?

GREAT! But we need to see if you've got what it takes first. The qualification process is easy. There will be a Progress Tracker on the right side of every page that shows you how close you are to finishing. And remember, if you need to stop during the process, just use your User Name and Password to re-enter and complete the process.

So, when you're ready, here's what's next for you:

PART 1 – Introduction

- Watch the brief introduction to ChaCha video.

PART 2 – Qualification

- Take the 3 ten-minute skills assessment tests
  - Problem Solving Test
  - Typing Test
  - Search Competency Test
- Pass the tests, and become an official ChaCha Guide!

[ Next ] —1010

Progress Tracker

Part 1:
✓ Initial Sign-up Page
✓ TOS Page Module
  Introduction and Overview
  Introduction Video Module Part 2:
  Test Instructions
  Problem Solving Test
  Typing Assessment
  Search Competency Test Part 3:
  Summary Page Module
  W9 Page Module
  Handbook and Final Instructions Page Module

Test Instructions

Welcome to the Basic Skills Test

Our Guides are the most important part of our service because they are what makes us better than every other search engine. So we need to test you in three areas to ensure you will be a solid part of the team that provides ChaCha users with better, simpler, faster answers every time.

You will be taking 3 ten-minute, timed tests:

- Problem Solving Test – to see how well you solve different kinds of problems.
- Typing Assessment – to see how fast and accurately you type
- Search Competency Test – to see how well you find information online.

A few hints before you begin:

- RELAX. Ten minutes should be plenty of time to complete each test. And even if some of the questions aren't in your area of expertise, you'll do great if you just relax.
- OPEN A BROWSER WINDOW. During the last test, you'll need to search online. So to save yourself some time, open a browser window before you start the test.
- ANSWER EVERY QUESTION. The questions cover a variety of topics, and you may not be good at some of them. But we're looking for your OVERALL skills. So answer every question, even if you don't know the answer.

At any time, if you need to leave during this process, be sure to leave before or after any of the sections (don't log out in the middle of a test). When you're ready to resume testing, just use your User Name and Password to log back in, and you'll pick up right where you left off. When you have completed the entire Basic Skills Test, you will be able to see your scores.

So, when you're ready, click the START TEST NOW button.

Good luck! We hope to welcome you into the exclusive ChaCha Guide family very soon!

Start Test Now — 1210

Progress Tracker — 1205

Part 1:
✓ Initial Sign-up Page
✓ TOS Page Module
✓ Introduction and Overview
✓ Introduction Video Module Part 2:
Test Instructions
Problem Solving Test
Typing Assessment
Search Competency Test Part 3:
Summary Page Module
W9 Page Module
Handbook and Final Instructions Page Module

ChaCha® results

Problem Solving Test

11 minutes 13 seconds remaining —1420    Page 1 of 5

In a population of monkeys in the zoo, 8 monkeys have gray fur, the rest have black fur. If the 8 gray monkeys make up 25% of the monkey population, how large is the total monkey population?
- ○ 10
- ○ 12
- ○ 16 —1415a
- ○ 32

1410a

James has 8 blue pens, 6 black pens, and 4 red pens. If he grabs one pen at random, what is the probability that the pen is either red or black?
- ○ 2/3
- ○ 3/4
- ○ 3/5 —1415b
- ○ 1/2

1410b

[ Next >> ] —1425

1405 Progress Tracker

Part 1:
✓ Initial Sign-up Page
✓ TOS Page Module
✓ Introduction and Overview
✓ Introduction Video Module

Part 2:
✓ Test Instructions
    Problem Solving Test
    Typing Assessment
    Search Competency Test

Part 3:
    Summary Module
    W9 Module
    Handbook and Final
    Instructions Page

Typing Assessment

ChaCha Guides can type like the wind.

OK, not all of them. And we don't need you to be a speed typist, but you need to be pretty fast and very accurate. In this 10-minute Typing Test, text will appear in the box and you type along as quickly and accurately as you can. Your score will be based on time, number of errors, and number of corrections. (And don't get any ideas about cheating, because we can tell if you copy and paste.)

Finish as quickly as you can, and click the I'M DONE button when you are finished.

So crack those knuckles! The clock starts when you type your first character.

When you're ready to begin, click the START button.

Good luck!

(Need to take a break? You can close your browser window and log in at a later time. When you're ready to resume, visit underground.chacha.com and login with your User Name and Password at the top. Your testing will resume at this page.)

Start — 1510

1505

Progress Tracker

Part 1:
✓ Initial Sign-up Page
✓ TOS Page Module
✓ Introduction and Overview
✓ Introduction Video Module Part 2:
✓ Test Instructions
✓ Problem Solving Test
  Typing Assessment
  Search Competency Test Part 3:
  Summary Module
  W9 Module
  Handbook and Final
  Instructions Page

Search Competency Test

11 minutes 13 seconds remaining —1820    Page 1 of 5

_____ is a term associated with or assigned to a piece of information describing the item and enabling keyword-based classification.
- JDK
- Tag
- BBS  —1815a
- Muse 1810a Identify the person in this picture.
- Sean Lennon
- Iggy Pop
- Beck  —1815b
- Prince 1810b

[ Next >> ] —1825

1805

Progress Tracker

Part 1:
- ✓ Initial Sign-up Page
- ✓ TOS Page Module
- ✓ Introduction and Overview
- ✓ Introduction Video Module Part 2:
- ✓ Test Instructions
- ✓ Problem Solving Test
- ✓ Typing Assessment
- [ Search Competency Test ]

Part 3:
- Summary Module
- W9 Module
- Handbook and Final Instructions Page

Handbook and Final Instructions Page

Here's where it gets good!
Congratulations! You are now ready to enter the world of the ChaCha Guide. From here you will receive information about downloading the ChaCha Guide application, Guide Handbooks, and we'll show you how to join the "Underground" with all of our other Guides.

What is the Underground?
The Underground is how you connect with other ChaCha Guides. It includes tools to make you a better Guide and make being a guide fun!

Here are some other pointers to help you along your way:

- In the forum you can converse with other guides in the ChaCha universe to share experiences and help each other out (click "Forum" at the top-right of the Underground)
- Be sure to visit the KnowledgeBase to find answers to all of your questions (click "KnowledgeBase" at the top-right corner of the Underground)
- You can customize your underground profile (http://knowledgebase.chacha.com/questions/163/)
- Once you get to your profile, follow the dashboard on the left hand side to continue your training and earn the right to various ChaCha Guide roles (Rate ChaCha's Results, Live Query, Mobile).
- Follow this link to complete your payment set-up process

[ Visit Your Profile ]—2210

2205

Progress Tracker

Part 1:
✓ Initial Sign-up Page
✓ TOS Page Module
✓ Introduction and Overview
✓ Introduction Video Module Part 2:
✓ Test Instructions
✓ Problem Solving Test
✓ Typing Assessment
✓ Search Competency Test Part 3:
✓ Summary Module
✓ W9 Module
Handbook and Final Instructions Page

SMS Application Usage Test Intro

Now that you've seen the training video and are familiar with the SMS Handbook, you will be tested on your understanding of the material.

This test asks a series of true/false or multiple-choice questions based on the information you just received. Here's an example of the type of question you may see on this test:

Example Question: The result you send to the InfoSeeker during an SMS query should not include:
- The link to the result web page
- Up to 160 characters of text
- The information source (for example, "CNN.com")
- Text from the page You will have 10 minutes to complete the test. Be sure to answer all questions provided. When you're ready click [Start Test Now] to begin.

Start Test Now — 2510

Progress Tracker

Part 1:
✓ Introduction

Part 2:
✓ Training Video

Part 3:
   SMS Education Test
   Empathy Inference Skills Test

Part 4:
   Summary

METHOD AND SYSTEM FOR IMPROVING UTILIZATION OF HUMAN SEARCHERS

CROSS-REFERENCE TO RELATED APPLICATIONS

This application is related to and claims the benefit of U.S. Provisional Application Ser. No. 60/989,664, inventor Scott A. Jones, et al., titled METHOD AND SYSTEM FOR IMPROVING UTILIZATION OF HUMAN SEARCHERS, filed Nov. 21, 2007.

BACKGROUND

1. Field

The present invention is related to search engine technologies including human-assisted search engines and, more particularly, to a method and system for improving utilization of human searchers.

2. Description of the Related Art

In a typical human assisted search system, it is common practice to direct a query to a first available responder in order to provide a rapid response to a user submitting the query. However, such a methodology generally does not produce a high quality search result. A first available responder may not have expertise in the area requested. In addition, a search request may not include sufficient information for a search to be performed. In such a case, a first responder may be required to interact with a user to clarify a search request and obtain more information. However, such interaction is generally unstructured and does not produce a search request which can be processed rapidly. As a result, the best available human responder and/or search result may not be provided to a user.

Such an approach requires a single individual to not only be an expert at search, but also an expert at determining the intent of the customer. For example, the system of U.S. Pat. No. 7,287,021 by deSmet uses an internet search expert and several adjunct experts. Such a system may be economically unproductive as several expert searchers may be occupied with any single request. This problem becomes acute when a user is utilizing a voice, SMS or other communication with limited bandwidth.

A voice or SMS based answer system such a AQA as described in US Published Application 20070219978 takes a different approach wherein an initial query is compared to a database of queries. If the query matches, an automated answer may be provided. If no answer is found, the query is routed to a searcher who may be provided with suggested responses, and may spend up to ten minutes researching the query. This has limited viability, as evidenced by the high cost per answer charged.

An alternate approach is to analyze a search request to obtain a classification or categorization of a query. For example, categorization may be done using an automated analysis of content of a query, and/or information associated with a query. After applying such an automated analysis, a human responder may be selected to respond to a query or search request. A selected responder may be an expert in the area identified, but the query itself may be incorrectly categorized or more information may be required determine the intent of the search request due to the intrinsic ambiguity of natural language, or use of abbreviations, slang, etc. Additionally, a specialist in a given area may not be able to identify the correct subject matter of a query in order to route the query to an appropriate specialist. Valuable time of the searcher may be wasted by the need to simply return a query to a user, or to respond to a request for humor or a note of gratitude.

It may further be necessary that a search result is selected and/or modified in order to be presented to a user. For example, a user may be utilizing a device with limited capabilities such as a mobile phone which may have the capability for a short message service (SMS) or voice but no broadband connectivity. A user may desire to receive only one result at a device, but may desire to receive an additional result(s) at some future time. Such tasks are easily and rapidly done by a generalist, but may frustrate a topic expert. Expert searchers may produce an excellent response to a query in their area of knowledge, but it is difficult to reuse an expert answer as evidenced by AQA. The 'target' is to reuse answers, or to answer by automation at least 80% of queries. However, there is no explanation of how such a result may be achieved, which implies such a result may be difficult.

In light of the above and other problems existing in typical search systems, there is a need for a system and method for optimizing user of searchers in a human assisted search system.

SUMMARY

The disclosed system and method includes receiving a search request, providing information of the search request to a guide, where the guide modifies the search request based on the information and a search result is provided responsive to the search request.

The disclosed modification may include providing a query conforming to a structured grammar, categorizing the search request, and determining a location relevant to the request.

The disclosed system and method includes forwarding a request of a user to a human guide who qualifies the request based on a review of information of the request and executing a search using the request qualified by the guide.

Additional aspects and/or advantages will be set forth in part in the description that follows, and in part will become more apparent from the description, or may be learned by practice of the invention.

BRIEF DESCRIPTION OF THE DRAWINGS

Aspects and advantages of the invention will become apparent and more readily appreciated from the following description of the embodiments, taken in conjunction with the accompanying drawings, of which:

FIG. 5 illustrates a database record for a raw query.

FIG. 6 illustrates a database record for a vetted query.

FIG. 8 illustrates a guide registration graphical user interface (GUI).

FIG. 10 illustrates a guide introduction GUI.

FIG. 12 illustrates a guide test instruction GUI.

FIG. 14 illustrates a guide test GUI.

FIG. 15 illustrates a guide test instruction GUI.

FIG. 18 illustrates a guide test GUI.
FIG. 21 illustrates a guide registration GUI.
FIG. 22 illustrates a guide instruction GUI.
FIG. 25 illustrates a guide test GUI.
FIG. 35 illustrates a category selection GUI.

DETAILED DESCRIPTION OF THE PREFERRED EMBODIMENTS

Figure 1:
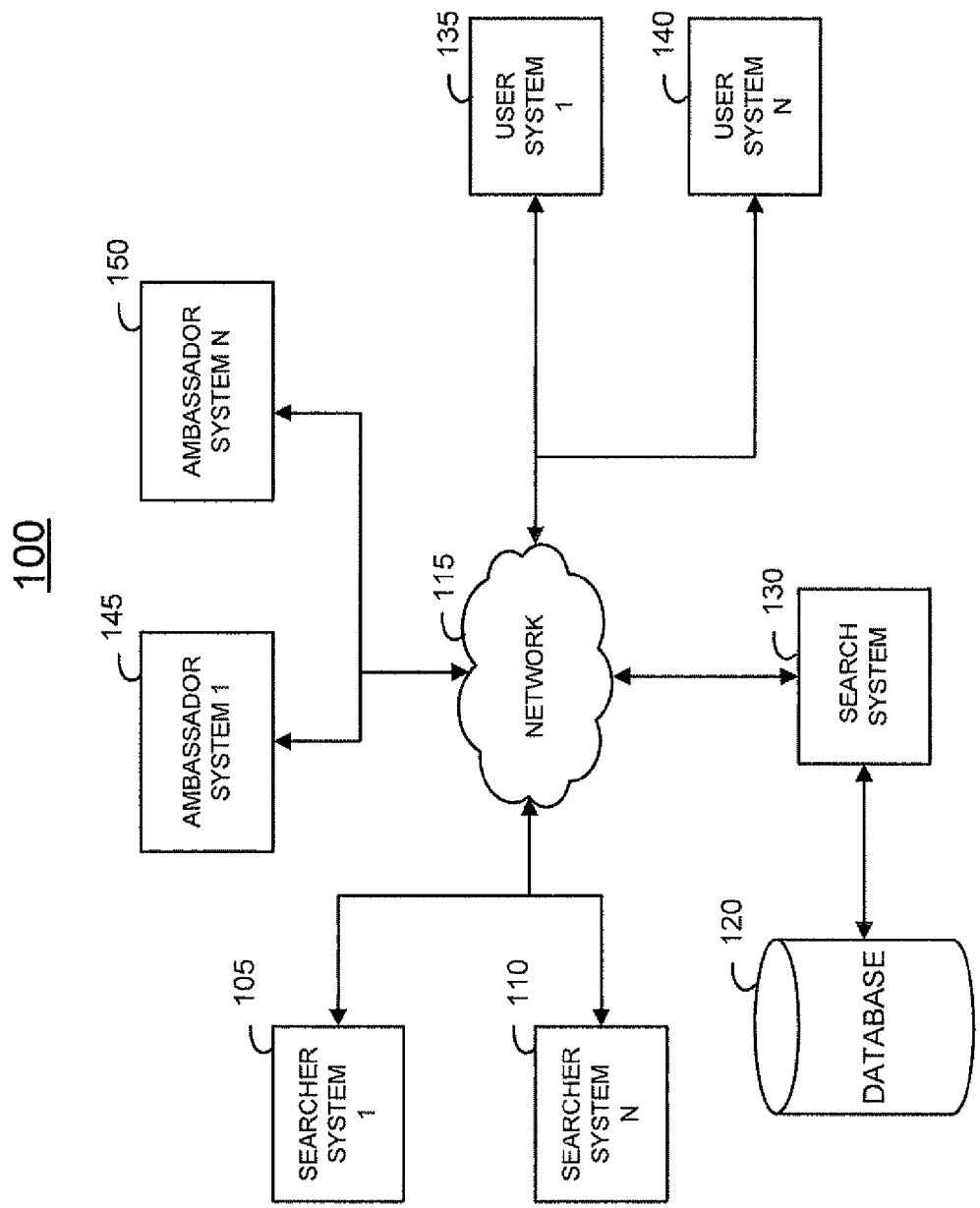
FIG. 1 is a block diagram of a system embodiment.

Reference will now be made in detail to the present embodiments discussed herein, examples of which are illustrated in the accompanying drawings, wherein like reference numerals refer to the like elements throughout. The embodiments are described below to explain the disclosed system and method by referring to the figures. It will nevertheless be understood that no limitation of the scope is thereby intended, such alterations and further modifications in the illustrated device, and such further applications of the principles as illustrated therein being contemplated as would normally occur to one skilled in the art to which the embodiments relate.

A method and system of improving utilization of human searchers using an intermediary is disclosed. The disclosed method and system allows a customer relations specialist or an "ambassador" guide to process a search request prior to selection of a searcher. Processing performed by an ambassador may include formulating and/or selecting a query which conforms to a specified grammar or "structured query" based on information associated with a search request, categorizing a search request, interacting with a customer to obtain information relating to a search request, reviewing available search results and/or searchers, determining the scope of a request, determining the time-frame for a response, and/or other additional information associated with a request.

An ambassador guide may be provided with a tool set which allows rapid characterization of a search query or request. Such a tool set may include aides for query formulation, customer communication, searcher selection, categorization, location and user information review and other activities.

Subsequent to the processing of a request or search query by an ambassador a search result may be provided to a user. A search result(s) may be produced using an automated search without the use of a human searcher, may be selected by an ambassador, may be produced by a human searcher, and/or any combination thereof.

An ambassador guide may be utilized to process a search result(s) to be delivered to a user. In at least one embodiment, a search result(s) may be selected and/or reformatted in order to be compatible with a user device(s). A search result(s) may be transmitted to more than one user device and/or may be made available for review based on a set of conditions.

A system embodiment, methods, data structures and interfaces for operating the embodiments are described below in detail.

A "user" may be any person or entity which may submit a request or search request to the search system 130. A request or search request or query is information which may be submitted using any communication service which may be able to access a search system as further described herein below.

A "guide" may be any person who may be compensated and/or may be a volunteer who may respond to a request. An "ambassador" is a guide who may perform processing of a request and/or a search result(s). A "searcher" is a guide who may perform an information search responsive to a request.

A "raw query" is a request submitted by a user, which may include any type of information provided by a user and/or associated with a user.

A "vetted query" includes a request which is associated with a category, a structured query, or otherwise qualified query.

A "structured query" is a question formulated according to a structured grammar. In at least one embodiment, a grammar construction required for a structured query is a question. A structured query may also be referred to as a "succinct query".

An "identifier" or ID is a group of characters, numbers and/or other types of information which may be used to identify an item which is stored in the database 120.

A "guided request" is a request which uses the assistance of one or more guides.

A "result" or "search result" is any information which may be provided responsive to a request. A search result includes but is not limited to any of an advertisement(s), a link to a web page, a message of any sort, image, audio, text, games, interactive media and/or software of any sort.

A "search resource" is any source of information which may be used to obtain a search result. A search resource includes automated and/or human-assisted systems, and any type of media and/or systems which may provide information.

A "profile" is a group of one or more characteristics which may be associated with a person. Profile characteristics include but are not limited to demographic, geographic, personality, affiliations, areas of interest, historical actions, preferences, memberships, associations, etc.

An exemplary system embodiment is illustrated in FIG. 1. As illustrated in FIG. 1, system 100 includes searcher system(s) 105, 110, a network 115 such as the Internet, a search system 130, user system(s) 135, 140, a database 120, which may comprise various records, and ambassador system(s) 145, 150.

Each of the guide systems, that is, the searcher systems 105, 110 and the ambassador systems 145 and 150 can be operated by a guide to obtain search result(s) on behalf of a user located at a user system (e.g., the user systems 135, 140). While only a limited number of searcher (also referred to as a human searcher), ambassador (also referred to as a vetting guide or query vetting guide or expeditor) and user (also referred to as an information seeker or requester) systems are depicted in FIG. 1, it is within the scope of the disclosure for multiple searcher, ambassador and user systems to be utilized.

The network 115 (FIG. 1) may be a global public network of networks (the Internet) and/or consist in whole or in part of one or more private networks and communicatively couples the searcher computer systems, the ambassador systems and user computer systems with the other components of the system such as the search system 130, and the database 120. The network may for example include any or all of a wireless network(s) such as a cellular phone network, a WiMax network, a WiFi network, etc. a network such as the Public Switched Telephone Network (PSTN), or any other type of communication network.

The search system 130 allows interaction to occur between the searcher systems 105, 110, the ambassador systems 145, 150 and the user systems 135, 140. For example, a request(s) can be transmitted from the user systems 135, 140 to the search system 130, where a request(s) can be accessed by the searcher systems 105, 110 and/or the ambassador systems 145, 150. Similarly, a search result(s) produced using the searcher systems 105, 110 or the ambassador systems 145, 150 in response to a request(s) produced by the user systems 135, 140 may be transmitted to the search system 130, where it may be stored by the search system 130 and/or may be transmitted to the user systems 135, 140 and/or the ambassador systems 145, 150.

The user systems 135, 140 may include within the scope of the disclosure, any device through which an information seeker can submit a request(s) to and/or receive information or search result(s) from the search system 130. In one embodiment, the user system 135 may be a device configured for connection to a network and may run web browser software. Thus, the user systems 135, 140 may be a portable or laptop computer, a personal data assistant (PDA), a desktop computer such as a PC or Mac®, a workstation or a terminal connected to a mainframe, a specialized search apparatus, or a smart phone, etc. within the scope of the disclosure. Any device which can communicate using Internet Protocol (IP) may be a user system, a searcher system, and/or an ambassador system within the scope of the disclosure.

The search system 130 may include a gateway for voice communication and a speech-to-text system or other transcription device and/or personnel to facilitate access to the search system via voice communications such as through a land line phone, cellular phone, Voice over Internet Protocol and/or other telephonic device(s). Any device(s) which may be used to communicate using voice (speech) may be a user system, a searcher system and/or an ambassador system.

The search system 130 may include hardware and/or software interface(s) to a system(s) which provide communication services such as Instant Messaging (IM), email, Short Messaging Service (SMS), Enhanced Messaging Service (EMS), Multimedia Messaging Service (MMS), and/or other forms of messaging services. Any device(s) which may communicate using such services may be a user system, a searcher system, and/or an ambassador system within the scope of the disclosure herein. A request may be submitted to the search system 130 using any or all communication services which are able to communicate with the search system 130.

Although the search system 130 is illustrated as a single system, the search system 130 may include any number of hardware systems, which may function as servers or other elements. For example, a server functionality associated with any of the communication services identified herein above may be implemented to allow messages to be transmitted between the elements of the system 100. Any suitable computer hardware which is well known in the art may be used to implement the search system 130.

The search system 130 is communicatively coupled with the database 120. As will be described herein in further detail below, the database includes data that is processed during operation of the embodiments. Although FIG. 1 illustrates the database 120 as a separate component of the system, the database 120 may be integrated with the alternate search system 130. Further, the records maintained in the database 120 may be stored in any typical manner, including in a Network Attached Storage (NAS), a Storage Area Network (SAN), etc. using any typical or proprietary database software such as DB2®, Informix®, Microsoft® SQLServer™, MySQL®, Oracle®, etc., and may also be a distributed database on more than one server. Elements of the database 120 may reside in any suitable elements of the system 100. For example, elements of the database 120 may be stored in any storage media accessible to a user system, a searcher system, and/or an ambassador system.

After being presented with the disclosure herein, one of ordinary skill in the art will readily appreciate that the computer systems of the embodiments can be any type of viable systems known in the art.

In the disclosed system and method, guides (searchers) and/or ambassadors may be required to register with the search system 130, and in certain embodiments undergo training prior to being permitted to provide responses to requests submitted by a user(s) utilizing the search system 130. In one embodiment, a prospective guide may also be invited to register as a guide with the search system 130. In such a system, a previously registered guide or an affiliate group may initiate the invitation process and thereby be designated as a sponsor for the invited guide. In one embodiment of the disclosed system and method, a prospective guide is sent an email invitation to register as a guide with the search system 130. The email invitation in one embodiment contains a link to a guide registration page and some indicia recognizable by the search system 130 as to the person or entity that invited a prospective guide to register so that upon registration the person or entity may be accredited with sponsorship of the invited guide.

Should a prospective guide elect to register as a guide with the search system 130, the prospective guide may for example initiate a registration process by selecting a link that directs the guide's web browser to a URL of a guide registration page generated by a web server function of the search system 130 (FIG. 1). While registration of a prospective guide is described with respect to the search system 130 providing pages to a browser, the present invention is not limited to any particular configuration for registering guide(s). For example, a system dedicated to registration of guide(s) may be provided which is separate from the search system 130.

A prospective guide may elect to be a searcher and/or an ambassador, and/or to perform other activities. A prospective guide may undergo training and/or testing which may be used to determine whether a guide is competent to perform a task(s). After completion of testing and/or training, a guide may be allowed to perform a task(s). A registration and qualification process for a guide(s) is further described herein below. A guide may act as an ambassador, and/or as a searcher based on completion of training and/or testing. An ambassador processes a user search request and/or a search result(s). A searcher may receive a processed request and may perform a search responsive to the processed request. Various criteria may be considered for determining whether a guide may act as an ambassador and/or a searcher including but not limited to time spent as a guide, level of knowledge in particular area(s), etc. In at least one embodiment, the role of ambassador and searcher may be mutually exclusive.

The performance of an ambassador may be monitored. Multiple feedback mechanisms may be utilized including ratings by one or more users, guides, or other persons, time required to complete a task(s), complexity rating of a query, and/or other speed and/or quality metrics. In at least one embodiment, a rating of an ambassador may be based on the number of queries which are answered without a searcher.

Figure 2:
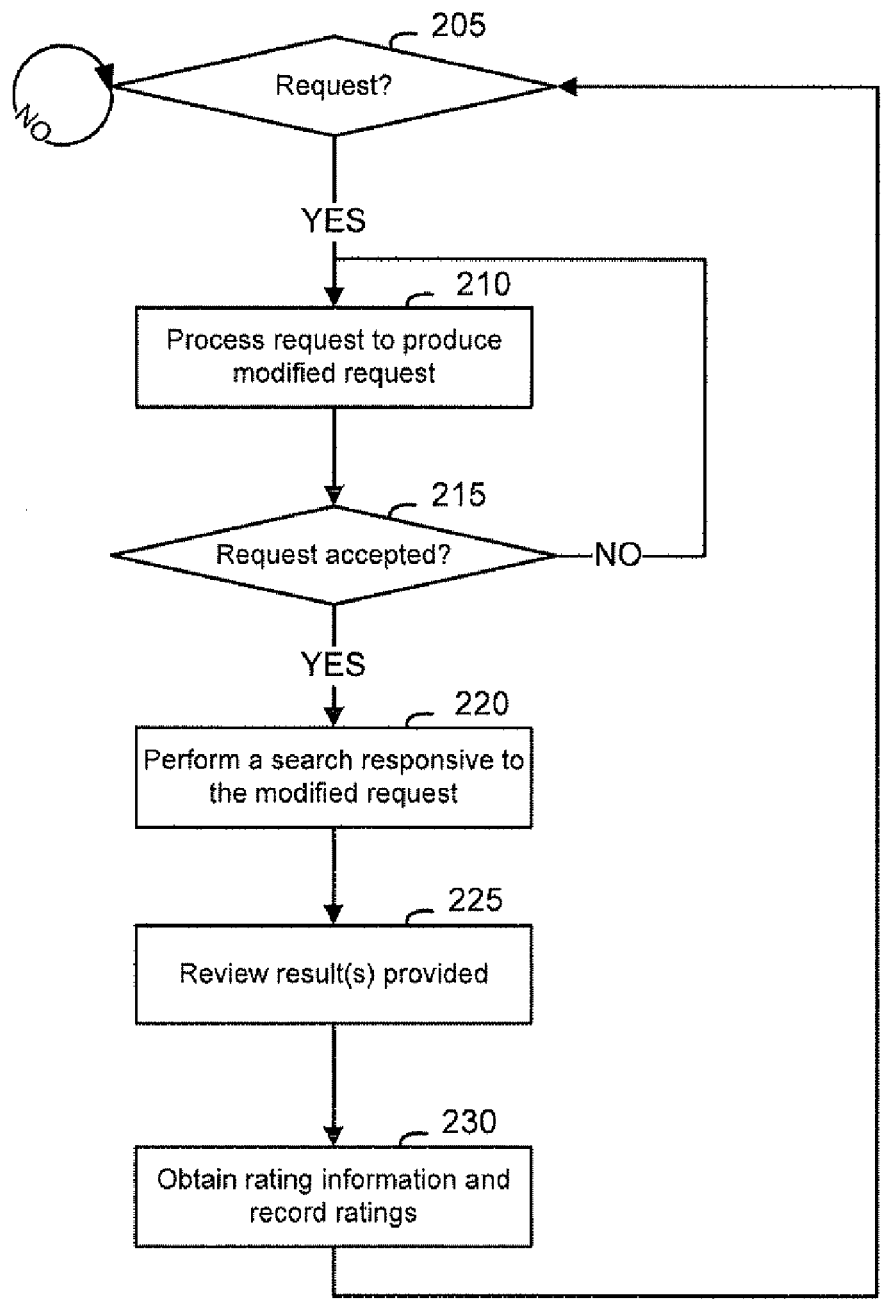
FIG. 2 illustrates a flow diagram of a process of performing a search.

As illustrated in FIG. 2, a process 200 for performing an information search in which one or more ambassadors act as an intermediary is provided.

In operation 205 (FIG. 2) a determination is made as to whether a request is received. If it is determined in operation 205 that a request is not received, control remains at operation 205 and process 200 continues. If it is determined in operation 205 that a request is received, control is passed to operation 210 and process 200 continues.

The determination in operation 205 may be made using various criteria. In at least one embodiment, if a message is received at a server associated with the search system, it may be determined that a request is received. For example, if an email message, an SMS, EMS, and/or MMS message, an IM, an IP message, and/or a voice message is received at an address associated with the search system 130 (FIG. 1) it may be determined that a request is received. The search system 130 may determine whether the assistance of a guide will be used to respond to a request.

In operation 210 an ambassador processes a request. A process for processing a request is further described herein below with respect to FIG. 3. Control is passed to operation 215 and process 200 continues.

In operation 215 a determination is made as to whether a processed request is accepted. If in operation 215 it is determined that a processed request is not accepted, control is passed to operation 210 and process 200 continues. If in operation 215 it is determined that a processed request is accepted, control is passed to operation 220 and process 200 continues.

An ambassador(s) may be associated with a rating and/or compensation structure. The rating and/or compensation of an ambassador may be affected by acceptance of a request(s) processed by the ambassador. If a vetted query is not accepted by a searcher, it may be assigned to a second ambassador. Actions of guide(s) may be utilized as a form of quality control. For example, if two ambassadors agree on the content of a vetted query, and a second searcher accepts a vetted query, the rejected vetted query may not be counted towards the rating and/or compensation of an ambassador. The compensation and/or rating of a searcher who rejected a vetted query may be affected if a rejected vetted query is accepted by an ambassador and/or a different searcher.

In operation 220 an information search is performed by a searcher responsive to a vetted query and a search result(s) is returned. An information search may be performed by any guide. A searcher and/or an ambassador may perform a search. Control is passed to operation 225 and process 200 continues.

In operation 225 a search result(s) is reviewed by an ambassador and may be presented to a user. A process for review and presentation of a search result(s) is further described herein below with respect to FIG. 4. Control is passed to operation 230 and process 200 continues.

In operation 230 rating information is obtained A rating may be based on user acceptance, and/or a review by a guide(s), and/or review by a system administrator. The database 120 (FIG. 1) is updated. Information such as ratings of a search result, ratings of a guide(s), ratings of a vetted query, time to perform operations, etc. may be recorded. Control is passed to operation 205 and process 200 continues.

In at least one embodiment, an ambassador who performs the processing in operation 210 and an ambassador who performs the review in operation 225 may be the same person. In other embodiments, a different ambassador may perform the processing and the review operations.

Figure 3:
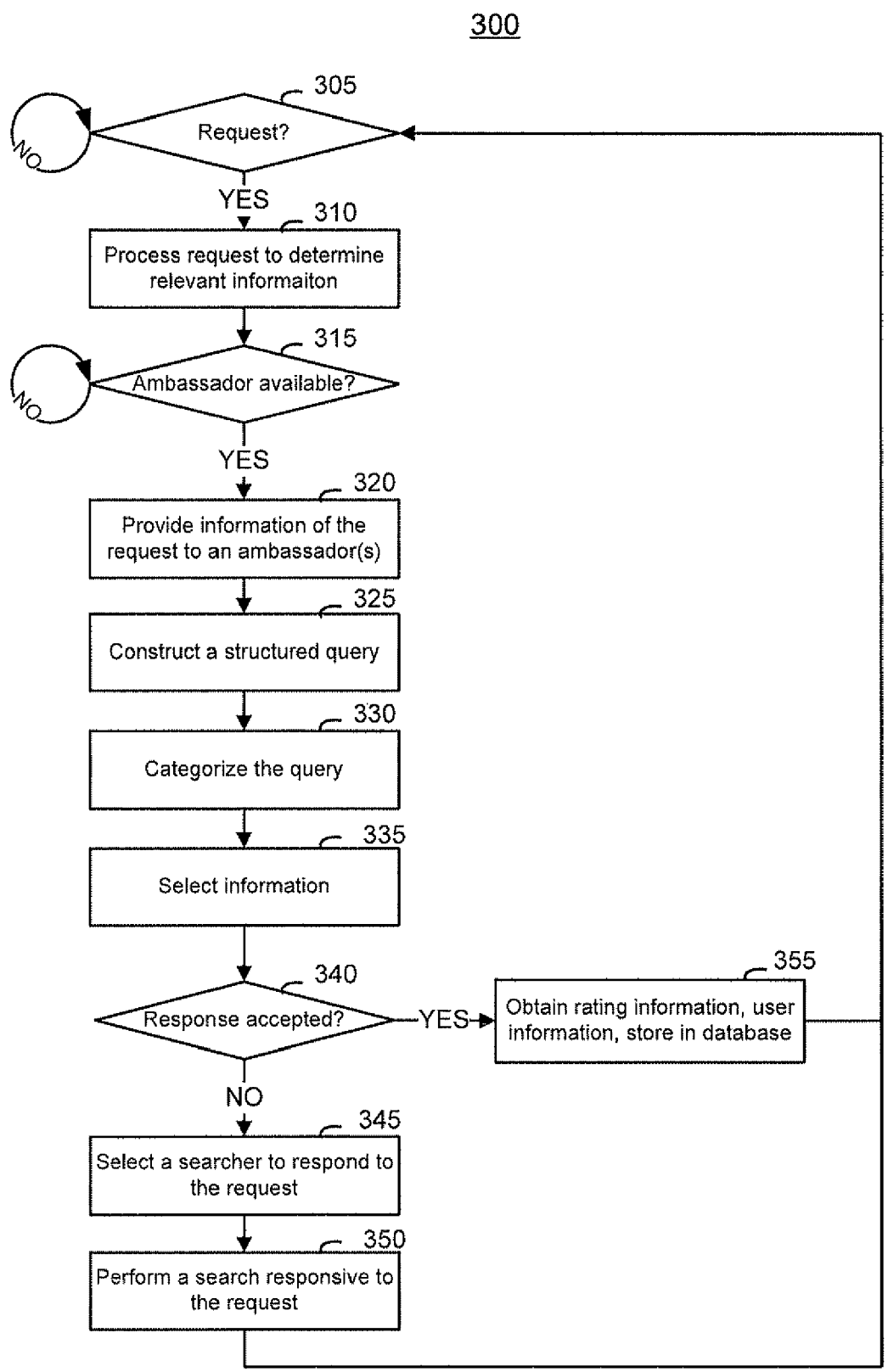
FIG. 3 illustrates a flow diagram of a process of responding to a request.

As illustrated in FIG. 3, a process 300 for processing a guided request is provided.

In operation 305 a determination is made as to whether a guided request is received. If it is determined in operation 305 that a guided request is not received, control remains at operation 305 and process 300 continues. If it is determined in operation 305 that a guided request is received, control is passed to operation 310 and process 300 continues.

The search system 130 (FIG. 1) may determine whether a guided request is received. Content of a message may be used to determine whether a guide is to respond to a request. A target address such as a telephone number, a short code, an IM credential, etc. may be used to determine whether a guide is to respond to request.

In operation 310, the request (or a raw query) is processed to determined relevant information. For example, the raw query is compared to a query(ies) indicated in the database 120 (FIG. 1). A raw query may include text, audio, and/or other media. A raw query is processed in order to determine one or more keywords, categories and/or vetted queries which may be associated with a raw query. A vetted query is further described herein below. A user ID may be associated with a raw query, and a unique ID may be assigned to a raw query. A raw query may be compared to structured queries using stemming, word counts, and/or other forms of processing which are well known in the art. The database 120 is updated with information pertaining to the request. Control is passed to operation 315 and process 300 continues.

In operation 315 a determination is made as to whether an ambassador(s) is available to respond to a guided search request. If in operation 315 it is determined that an ambassador is not available, process 300 continues to wait. If in operation 315 it is determined that an ambassador(s) is available to respond to a guided search request, control is passed to operation 320 and process 300 continues.

The determination in operation 315 may be based on various criteria. In at least one embodiment, available ambassadors are notified, and the first to respond is selected. If an ambassador is notified and does not respond, the ambassador may be recorded as unavailable. In at least one embodiment, an ambassador may be selected based on information associated with a raw query. For example, an ambassador may be selected based on a type of device a requester is utilizing to submit a request, and/or to receive a search result(s). An ambassador may be selected based on a competency, a training status, a keyword(s) and/or category(ies), geographic information, demographic information, personality information, interest area information, affiliate group information, a contractual relationship, a language skill, etc. which may be associated with a raw query and/or an ambassador. If an ambassador is currently responding to a request, the ambassador may not be available. If an ambassador is not logged-in to the search system 130 (FIG. 1), the ambassador may not be available. Availability of an ambassador may be determined dynamically. For example, if no ambassador who meets a group of criteria is available, one or more criteria may be modified so that an ambassador who meets a different group of criteria is available. Alternately, the search system may wait until an ambassador who meets a group of criteria is available. An ambassador(s) may be notified of a request(s) via various forms of communication such as IM, a voice message, a pop-up in a browser, an email message, an SMS, EMS or MMS, etc. which may be used to communicate with a system associated with the ambassador.

Figure 32:
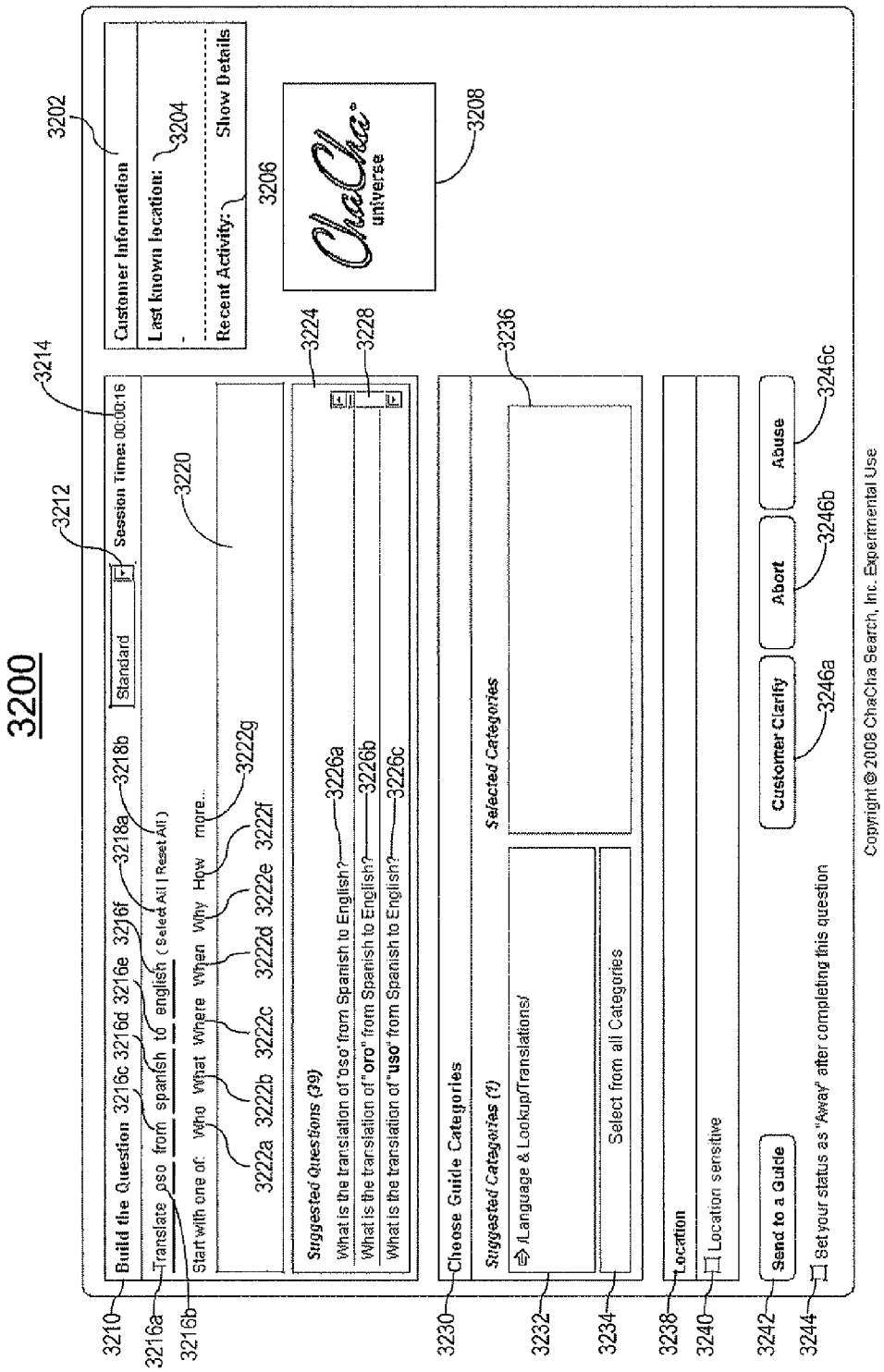
FIG. 32 illustrates a query processing GUI.

In operation 320 information of a raw query and/or associated information such as a keyword(s), category(ies), profile(s), vetted query(ies), etc. identified in operation 310 are provided to an ambassador. An ambassador may be presented with a GUI such as the GUI 2800 (FIG. 28) or the GUI 3200 (FIG. 32). Control is passed to operation 325 and process 300 continues.

In operation 325 an ambassador constructs a structured query. The structured query may be based on a keyword(s), category(ies), image(s), audio, video, a profile(s), a structured query(ies), a vetted query(ies) and/or any information associated with a raw query. An ambassador may select an advertisement(s) which may be transmitted to a user(s). Control is passed to operation 330 and process 300 continues.

A vetted query may utilize various construction methods. In at least one embodiment, a structured grammar is employed which includes phrasing a request in the form of a question. A structured query construction may require standard elements to be selected. Using the example illustrated in FIG. 5, the structured query 'Who is the starting quarterback for the Chicago Bears' is a structured query associated with the raw query 'Who is the #1 quarterback for the Bears?'. An ambassador may communicate with a user using a real-time interface such as a chat or Instant Message (IM) session, voice connection, text-to-speech, etc. Interaction with a user may allow an ambassador to determine information of a raw query including intended meaning(s) of a keyword(s), a geographic location, or other information which may be used to form a structured query and/or which may be associated with and/or contained in a vetted query. An ambassador may confirm user acceptance of a structured query which is associated with a raw query. An ambassador may modify, adjust, qualify and/or supplement a keyword(s) and/or other information of a raw query. For example, if the query 'best apple' is a raw query, an ambassador may construct the structured query 'what is the best apple computer available?', or the structured query 'what is the best apple for baking a pie?', or the structured query 'what is the best apple?' Although a vetted query may be ambiguous, it is structured to conform to a standard format, which may improve matching of raw queries to structured queries.

Figure 28:
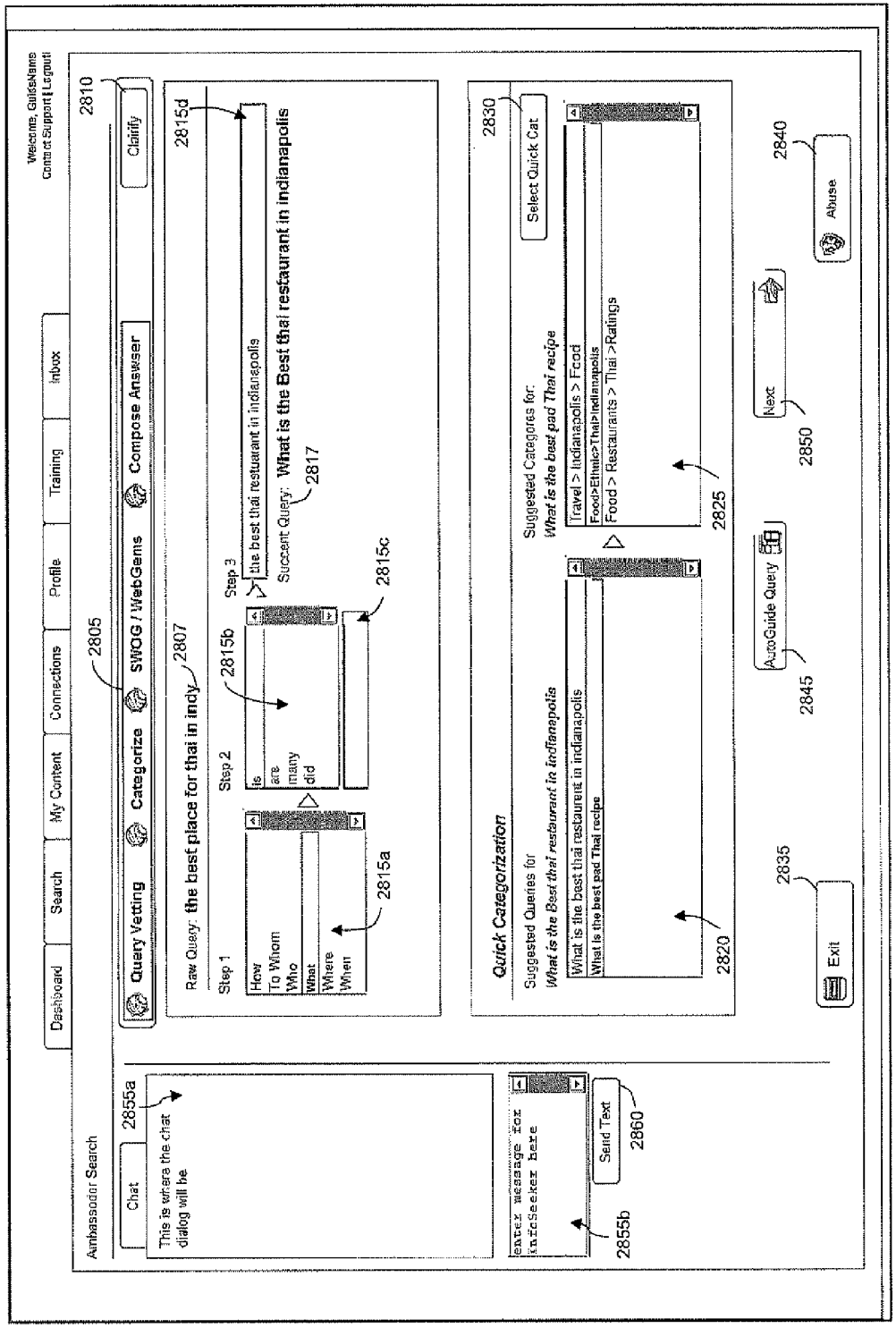
FIG. 28 illustrates a query processing GUI.

An ambassador may be presented with a query template which requires selection of one or more elements of a structured query from a list of available alternatives. In at least one embodiment, an interrogatory word or phrase such as 'what, who, when, where, how many', etc. may be selected from a list, a verb or verb form such as 'is, was, will be', etc. may be selected from a list. A structured query may be analyzed automatically to check for conformance to spelling and grammatical conventions of a target language. A structured or vetted query may allow a searcher to receive a query which contains a standard set of information from an ambassador. A vetted query may format a request for submission to an automated search system. An ambassador may select elements of a structured query based on a keyword(s) and/or category(ies) associated with a raw query. A raw query submitted by a user such as 'bear's quarterback', or 'QB for the bears' may for example be converted to a succinct or structured query such as 'Who is the starting quarterback for the Chicago Bears?'. One or more previously constructed structured queries associated with a raw query may be presented to an ambassador, as illustrated in FIG. 28.

In operation 330 (FIG. 3) a request is associated with one or more categories. A categorization may be automatically associated with the raw query by the search system 130 (FIG. 1). An ambassador may be presented with a list of categorizations which may be associated with a request. In at least one embodiment, an ambassador is not allowed to change a categorization associated with a structured query. For example, a categorization of a query reviewed by a number of ambassadors and/or searchers may not be permitted to be changed by a particular ambassador. Alternately, an ambassador may be allowed to change a categorization associated with a structured query based on various criteria. An ambassador may be allowed to change a categorization of a structured or vetted query based on a ranking, rating and/or other characteristic(s) associated with an ambassador and/or a structured query. For example, an ambassador who has correctly categorized a number or a percentage of succinct or structured queries may be allowed to modify a categorization associated with a structured query. If a structured query has not been categorized more than a number of times by an ambassador(s), an ambassador may be allowed to modify a categorization(s) associated with the structured query. For example, if a structured query is associated with a category three times a change of categorization may not be allowed subsequently. A structured query which is brief such as 'Who are the Bears?' may be allowed to be associated with multiple categories. A structured or "succinct" query which is more specific such as 'Who is the current quarterback for the University of California Bears?' may be allowed to be associated with only one category. Selection or creation of a structured query may change the ranking of a category(ies) associated with a request.

An ambassador may be presented with a taxonomy tree structure which allows an ambassador to modify a categorization(s) of a request. In at least one embodiment, a categorization selected by an ambassador(s) may be used to determine a most likely categorization of a vetted query. Control is passed to operation 335 and process 300 continues.

Figure 30:
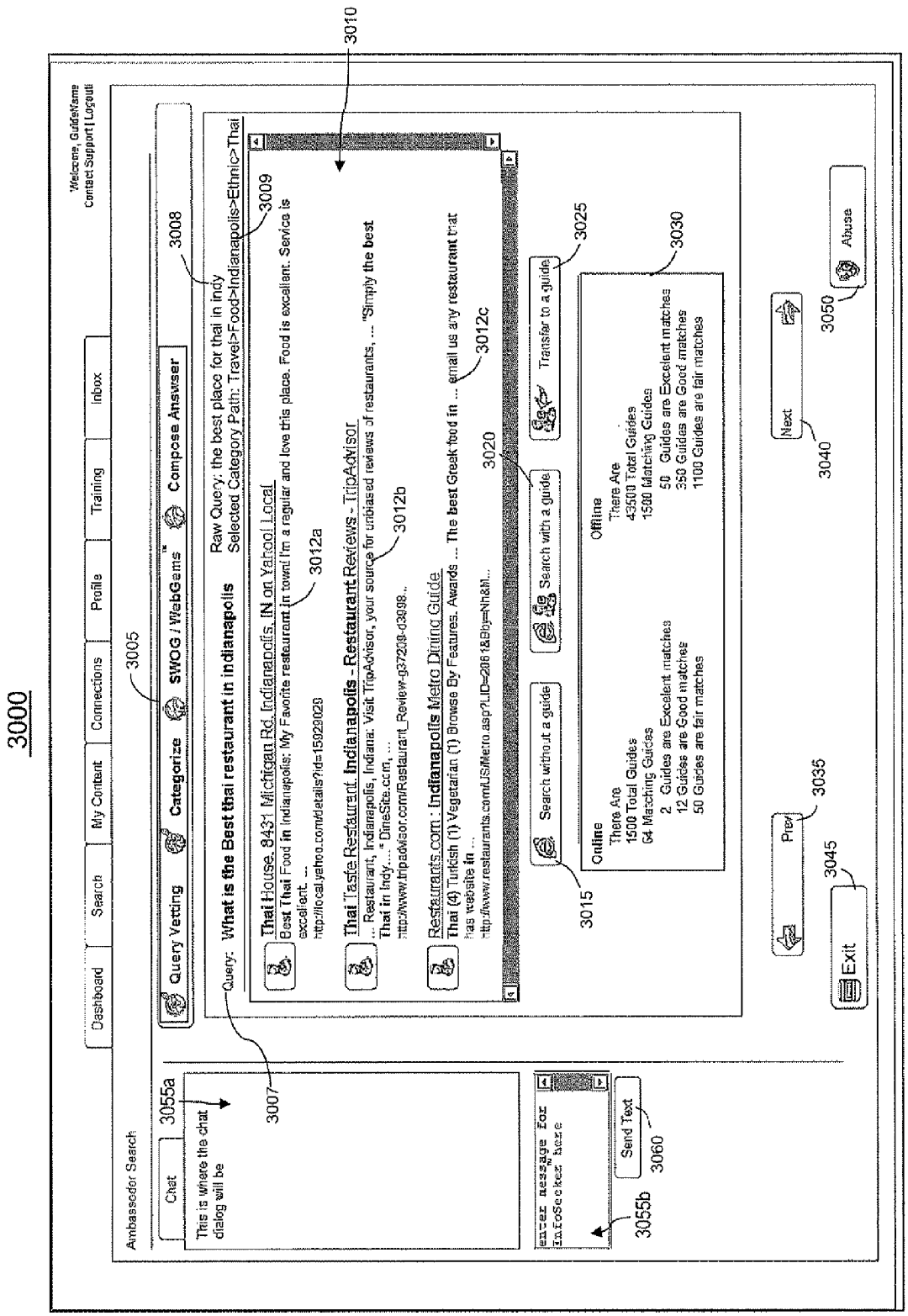
FIG. 30 illustrates a query processing GUI.

In operation 335 an ambassador selects information (response) which may be presented to a user. For example, an ambassador may select an advertisement(s) to be presented to a user. A selection may be based on an explicit selection by a guide, and/or may be based on one or more categories selected by a guide. A category association may be used to select a guide(s) and/or information to be presented to a user(s) and/or a guide(s) such as an advertisement(s), a search resource(s), and/or a search result(s). In at least one embodiment, an ambassador may be presented with one or more search results which have been associated with a vetted query based on a ranking of a search result(s). A search result(s) associated with a vetted query may be selected in various ways. A vetted query may be associated with a human-touched (reviewed) search result(s) which has been judged superior to one or more algorithmic search results based on voting by one or more guides. A vetted query may be associated with a search result(s) produced by an algorithmic search engine. A vetted query may be associated with a search result(s) produced by an affiliate group(s). An ambassador may select a search resource which may be provided to a guide and/or a user. A search result(s) may be automatically provided to a user based on the association of a search result(s) with a vetted query. A search result may be selected by an ambassador. An ambassador may select to transmit any or all information associated with a vetted query to a user. An exemplary GUI for selection of a response is illustrated in FIG. 30. Control is passed to operation 340 and process 300 continues.

In operation 340 a determination is made as to whether a response is accepted. If in operation 340 it is determined that a response is accepted, control is passed to operation 355 and process 300 continues. If in operation 340 it is determined that a response is not accepted control is passed to operation 345 and process 300 continues. In at least one embodiment, acceptance of a search result(s) may be determined based on user actions such as activating an action button, or clicking on a link associated with a result, or sending an acceptance text message. In at least one embodiment, if an ambassador selects a search result, it is determined that a response is accepted.

In operation 355 a rating of an ambassador is determined. A rating of an ambassador may be determined based on factors such as user acceptance of a search result(s) provided, time required to send a search result(s) to a user, number of structured queries submitted to a user for review, click-through of an advertisement(s), user ratings, ratings by a guide(s), ratings by system administrators, etc. For example, if a user accepts a first vetted query proposed by an ambassador, an ambassador may receive a high rating, or if a user clicks through a search result(s) or advertisement(s) provided by an ambassador, the ambassador may receive a high rating. In at least one embodiment, an ambassador rating may be based on acceptance of a vetted query by a searcher. In at least one embodiment, an ambassador rating may be based on the time between receiving a query and the time when a search result is accepted. In at least one embodiment, an ambassador rating may be based at least in part on a percentage of search queries which require a search by a guide other than the ambassador. A rating of an ambassador may be based on a combination of ratings from one or more search sessions, and/or one or more rating factors. An ambassador rating may be based on any information indicated in the database 120 (FIG. 1). The database 120 is updated. Information of a structured query, a raw query, a vetted query, a category, a keyword, an ambassador, and/or a user may be recorded and/or modified. Control is passed to operation 305 and process 300 continues.

In operation 345 a searcher is selected. An ambassador may select attributes of a searcher(s) to provide a search result(s) responsive to a vetted query. An ambassador may be presented with information regarding a searcher(s) available to respond to a request. An ambassador may communicate with a user in order to modify criteria used to select a searcher. For example, an ambassador may determine timer rating, ranking, affiliation, demographic, geographic and/or other criteria for selection of a searcher. In at least one embodiment, an ambassador may determine whether an immediate response is required by a user in order to select a searcher. In at least one embodiment, an ambassador may select a searcher(s) based on information such as a rating(s) of search result(s) which have been provided by a searcher(s). A searcher may be selected automatically by the search system 130 (FIG. 1). An exemplary GUI for review of available searchers is illustrated in FIG. 30. Control is passed to operation 350 and process 300 continues.

In operation 350 a search is performed by a selected searcher. A rating(s) of an ambassador may be determined. A rating(s) of an ambassador may be based on various criteria as described herein above. For example, action(s) of a selected searcher may influence a rating(s) of an ambassador(s) that responded to a request. The database 120 (FIG. 1) is updated. Control is passed to operation 305 and process 300 continues.

Figure 4:
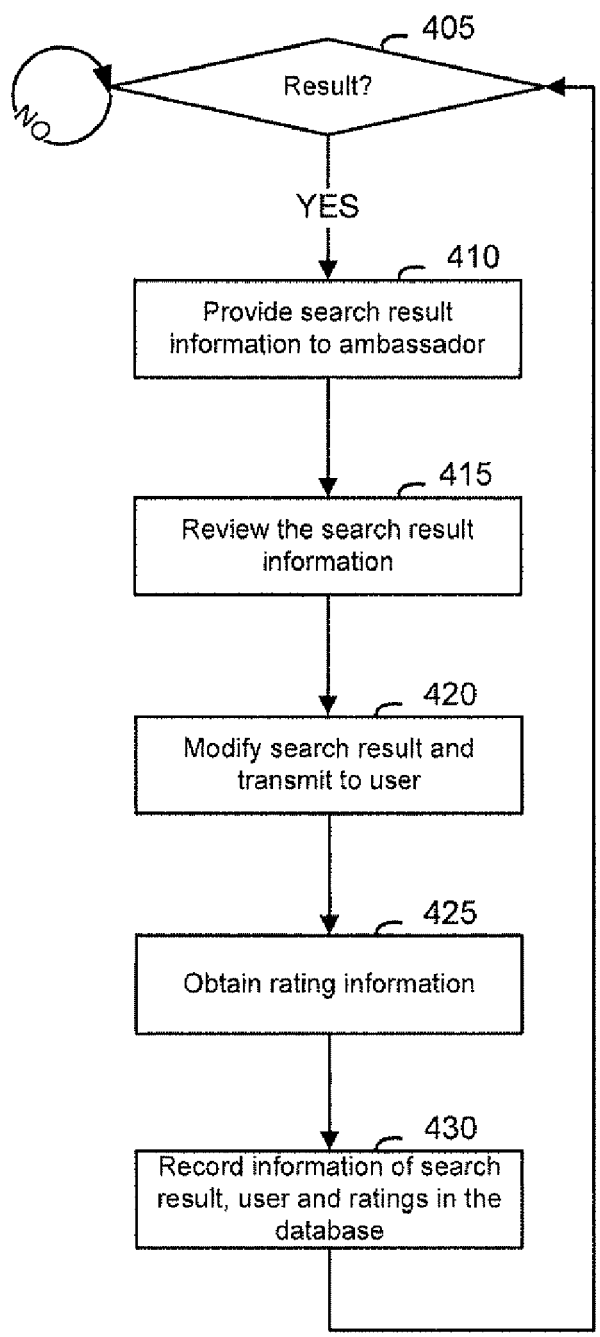
FIG. 4 illustrates a flow diagram of a process of responding to a search result.

As illustrated in FIG. 4, a process 400 for processing a search result(s) is provided.

In operation 405 a determination is made as to whether a search result(s) is received. If in operation 405 it is determined that a search result(s) is not received control remains at operation 405 and process 400 continues. If in operation 405 it is determined that a search result(s) is received control is passed to operation 410 and process 400 continues.

In operation 410 information of a search result(s) is presented for review by an ambassador who may also be a guide. In one embodiment, the guide is a first available ambassador selected by the search system 130 (FIG. 1). In other embodiments, a guide may be selected based on criteria such as a rating(s), a skill set(s) of a guide, a capability(ies) of a searcher system such as the ambassador system 145 (FIG. 1), or other information indicated in the database 120. Information of a search result(s) may be presented to a guide using a GUI such as the GUI 3000 illustrated in FIG. 30. Control is passed to operation 415 and process 400 continues.

In operation 415 a guide reviews information of a search result(s). A review may be based on criteria such as relevance, credibility, completeness, reference type, media type, etc. Control is passed to operation 420 and process 400 continues.

Figure 31:
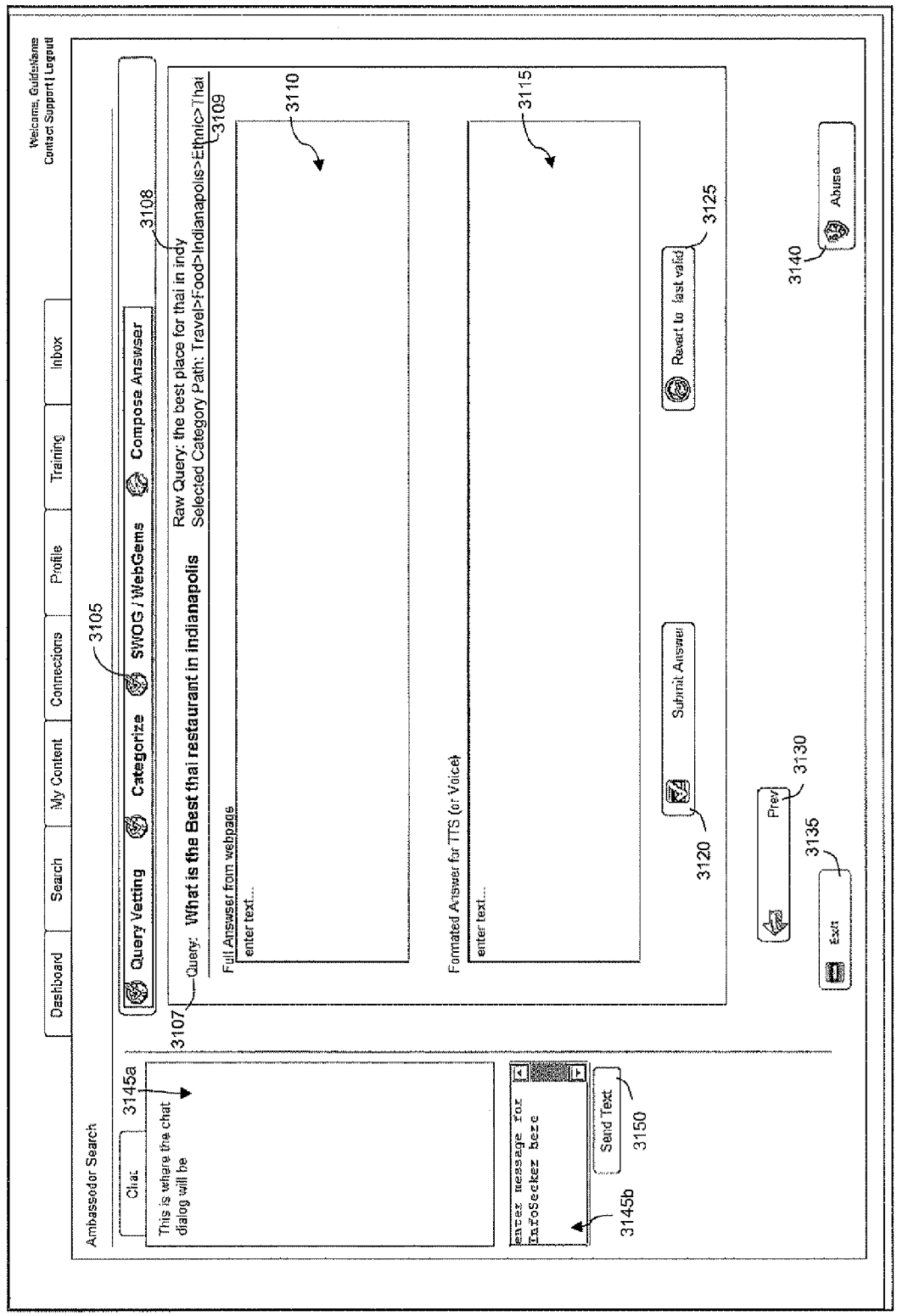
FIG. 31 illustrates a result processing GUI.

In operation 420 a search result(s) is modified by an ambassador and transmitted to a user. Modification of a search result(s) may be performed according to various techniques. In at least one embodiment, a search result(s) is restructured to a standard search result(s) format. An initial structured search result(s) may be presented to an ambassador, based on an automated analysis of a search result(s). A search result(s) may be modified for various reasons. For example, an ambassador may elect to send only one search result(s). This may for example be due to a constraint of a user system. For example, if a user is utilizing a messaging system such as SMS or other messaging services such as multimedia messaging service (MMS), a search result(s) may be modified to be suitable for the capabilities of a user device. Likewise, if a user is utilizing a voice-based device, an ambassador may modify a search result(s) to be suitable for voice communication such as VoIP, text-to-speech, or other voice systems. An ambassador may send a search result(s) to more than one user device. For example, an SMS result may be sent to a text-based user device, and a search result(s) may be posted to a web page of the search system 130 (FIG. 1) which may be accessed by a user at a later time, or a voice reply may be transmitted, and a text reply may be sent. An ambassador may determine a format for replying to a user based on interaction with a user. An ambassador may select an advertisement(s) to be sent to a user(s). An exemplary GUI for reviewing, modifying and transmitting a response to a user is illustrated in FIG. 31. Control is passed to operation 425 and process 400 continues.

In operation 425 a user rating(s) may be obtained. A user rating of a search result(s), an ambassador, and/or an overall rating(s) may be obtained. A rating of an ambassador may be determined based on various factors such as time from receipt of a search result(s) by an ambassador until a search result is sent to a user, number of search result(s) sent to a user, number of search result(s) accepted by a user(s), selection of an advertisement(s) sent by an ambassador to a user(s), selection of a search result(s) sent to a user(s) by an ambassador, subsequent usage of the search system 130 by a user(s) associated with an ambassador, number of search result(s) requiring the use of a searcher other than the ambassador, etc. Control is passed to operation 430 and process 400 continues.

In operation 430, the database 120 (FIG. 1) is updated. Information associated with ratings provided by a user, a searcher and/or ambassador rating and/or ranking, delivery of a search result, actions of a user, etc. may be recorded. Control is passed to operation 405 and process 400 continues.

As illustrated in FIG. 5, a sample of a raw query record, of which one or more may be associated with or resident in the database 120 (FIG. 1) is provided. The raw query record may include a query ID field 505, a keyword field 510, a category field 515, a structured query field 520, a user list field 525 and a profile field 530.

A raw query record may be created by various processes including a guided search session, an interactive training session, a non-interactive training session; may be imported from an external resource accessible to the search system, etc. In at least one embodiment, a raw query record is created if a request is received by the search system 130 (FIG. 1). A raw query is a request submitted to a search system. A raw query may include a fully-formed question/sentence, a keyword, a list of keywords and/or a search phrase. A raw query may include media, including images, audio, video, etc., and may include information such as a phone number, an IM credential, and/or other data which is associated with a user system and/or communication service.

The query ID field 505 preferably contains a unique identifier of a raw query, which is preferably used consistently. For example, in at least one embodiment, the query ID field 505 can include a randomly generated numerical code, and/or a text string indicating the content of a raw query. A query ID serves to distinguish a raw query record associated with a raw query from a raw query record associated with other raw query(ies). Although particular examples of identifiers are described herein, other types of identifiers uniquely indicating a query(ies) may be utilized without departing from the spirit and scope of the embodiments herein.

A unique identifier is assigned to a raw query when it is entered into the database 120 (FIG. 1). If it is determined that a raw query is identical to an existing raw query in the search database, that query may be assigned the same query ID and may be added to the raw query record associated with the query ID. A request may include other information than that explicitly provided by a user. For example, location information, profile information, etc. may be associated with a query which might differentiate the query from a raw query in the database 120 (FIG. 1). A query may receive a new query ID and create an associated raw query record based on information indicated by a guide. In at least one embodiment, each request is assigned a unique ID. As illustrated in FIG. 5, the string 'Who is the #1 quarterback for the Bears?' is the query ID for the raw query record 500.

The keyword field 510 includes information of a keyword (s) associated with a raw query. Content of the keyword field 510 may be created by an automated processing or parsing of a raw query. A human guide may select a keyword(s) which is associated with a raw query. A method for making and/or reviewing an association of a keyword with a raw query is further described herein. Using the example illustrated in FIG. 5 the keyword 'bears' and the keyword 'quarterback' are associated with the request 'Who is the #1 quarterback for the Bears?'. Keywords associated with a request may be ranked, and may be presented to an ambassador in an order based on the ranking. Keywords associated with a request may be used to rank information associated with the request.

The category field 515 includes information of a category (ies) associated with a raw query. Content of the category(ies) field 515 may be created by an automated classification of a raw query. A human guide may select a category(ies) which is associated with a raw query, A method for making and/or reviewing an association of a category with a raw query is further described herein. For example, in the record illustrated in FIG. 5, the categories 'Sports>News>NFL' and 'Sports>NCAA>Football' are associated with the raw query 'Who is the #1 quarterback for the Bears?'. A category associated with a raw query may be used to rank other information which may be selected responsive to the query. For example, if the category 'Sports>News>NFL' is associated with a query, guides(s) may be selected to respond to the query based on rankings associated with the category 'Sports>News>NFL'.

The structured query field 520 includes information of a structured query(ies) associated with a raw query. It may further include rating information of a structured query(ies) with respect to a raw query. A ranking or rating of a structured query may affect an order in which a structured query is presented to a guide when constructing a structured query. Using the example in FIG. 5, three structured queries have been associated with the raw query 'Who is the #1 quarterback for the Bears?' The structured query, 'Who is the quarterback for the Bears?', the structured query, 'Who is the starting quarterback for the Chicago Bears?' and the structured query, 'Who is the current quarterback for the University of California Bears?' are associated with the raw query 'Who is the #1 quarterback for the Bears?'. A structured query may be rated in various ways. For example, a more specific structured query such as 'Who is the current quarterback for the University of California Bears?' may be rated higher than a less specific structured query such as 'Who is the quarterback for the Bears?' Alternately, a structured query may be rated based on frequency of use in a time interval. For example, if the structured query 'Who is the starting quarterback for the Chicago Bears?' has been associated with the raw query 'Who is the #1 quarterback for the Bears?' by ambassadors 60% of the time in the last 24 hours, it might be ranked higher than another structured query which has been associated with the raw query 'Who is the #1 quarterback for the Bears?' by vetting guides 20% of the time in the last 24 hours. A structured query might be rated based on keyword(s) associated with a raw query. For example, if a user has submitted multiple queries which have been associated with a keyword(s), a structured query(ies) associated with that keyword might be rated higher. A structured query may be rated based on a category associated with a raw query. A structured query may be rated based on a combination of ratings.

The user list field 525 includes information of a user(s) that submitted a raw query to the search system 130 (FIG. 1). The user list field 525 (FIG. 5) may be used to associate a user(s) with a raw query. A raw query record may be created or modified when a user is associated with a raw query. Using the example illustrated in FIG. 5 the user 'Bill 1023' is associated with the raw query 'Who is the #1 quarterback for the Bears?'. Using the association of a user with a raw query, other information associated with a user may be presented to a guide.

The profile field 530 includes information of a profile associated with a raw query submitted to the search system 130 (FIG. 1). The profile field 530 (FIG. 5) may be used to associate a profile, which may contain additional information such as geographic data, demographic data, personality data, time data, location based data, user system data, etc., with a raw query. A raw query record may be created or modified when a profile is associated with a raw query. Using the example illustrated in FIG. 5 the profile 'Bill_1023_profile' has been associated with the raw query 'Who is the #1 quarterback for the Bears?'. This may indicate that profile information associated with the user 'Bill 1023' is associated with the raw query 'who is the #1 quarterback for the Bears?'

The search resource ID field 535 includes information of a search resource(s) associated with a raw query. Information of a search resource associated with a raw query may be used to locate search resources which may be provided to a guide in order to obtain a search result(s) responsive to a request. In at least one embodiment, a search resource is associated with a category. Using the example in FIG. 5, the resources 'Sporting News', 'NFL Network' and 'Chicago SunTimes' may be associated with 'Sports>News>NFL', and NCAA News' is associated with 'Sports>NCAA>Football'.

The search result ID field 540 includes information of a search result(s) associated with a raw query. Information of a search result(s) associated with a raw query may be used to provide a search result to a user. For example, the result 'Kyle Orton is the QB—Go Bears' might indicate a text message to be provided to a user via SMS, and the result 'www.nfl.com/kyleorton' might be provided using a web serving functionality to a browser of a user device.

The guide ID field 545 includes information of a guide(s) associated with a raw query. Information of a searcher associated with a raw query may be used to determine compensation for a guide. For example, a number of queries processed by an ambassador and/or a searcher may be used to determine compensation for the guide. Similarly, if a search result(s) provided by a guide is reused the guide may be compensated.

As illustrated in FIG. 6, a sample of a vetted query record 600, of which one or more may be associated with or resident in the database 120 (FIG. 1) is provided. The vetted query record 600 may include a vetted query ID field 605, a keyword field 610, a category field 615, a raw query field 620, a user list field 625 and a profile field 630.

A vetted query record may be created by various processes, including a guided search session, an interactive training session, a non-interactive training session; may be imported from an external resource accessible to the search system 130 (FIG. 1), etc. In at least one embodiment, a vetted query record is created by an ambassador. A vetted query may be associated with a number of search results. If a vetted query is selected, a search result(s) and/or other information associated with the vetted query may be provided responsive to the selection. For example, if a vetted query is selected by an ambassador responsive to a request, a search result(s) associated with the vetted query may be provided to a user.

The vetted query ID field 605 preferably contains a unique identifier of the vetted query, which is preferably used consistently. For example, in at least one embodiment, the vetted query ID field 605 can include a randomly generated numerical code, and/or a text string indicating the content of the vetted query. A vetted query ID serves to distinguish a vetted query record associated with a vetted query from a vetted query record associated with other vetted query(ies). Although particular examples of identifiers are described herein, other types of identifiers uniquely indicating a vetted query(ies) may be utilized without departing from the spirit and scope of the embodiments herein.

A unique identifier may be assigned to a vetted query when it is entered into the database 120 (FIG. 1). If it is determined that a vetted query is identical to an existing vetted query in the search database, that vetted query may be assigned the same vetted query ID and information may be added to the vetted query record associated with the vetted query ID. A vetted query may include other information than the explicit content of a request. For example, location information, profile information, etc. may be associated with a vetted query. For example, an identical such as 'Where is a good place for dinner?' might have multiple vetted queries depending on a profile (e.g. vegetarian, Muslim, Hindu) associated with the question. Information obtained by an ambassador may be used to differentiate one vetted query from another. As illustrated in FIG. 6, the string 'Who is the quarterback for the Chicago Bears?' is the query ID for the vetted query record 600 (FIG. 6).

The keyword field 610 includes information of a keyword(s) associated with a vetted query. Content of the keyword field 610 may be created by an automated processing or parsing of a query. Keywords associated with a vetted query may be used to rank the vetted query. For example, if a raw query includes a keyword(s) associated with a vetted query, the vetted query may be ranked higher and may be more likely to be provided to a user and/or an ambassador.

The category field 615 includes information of a category (ies) associated with a vetted query. If category associated with a vetted query is associated with a raw query, the vetted query may be ranked higher and may be more likely to be provided to a user and/or an ambassador.

The raw query field 620 includes information of a raw query(ies) which have been associated with a vetted query. It may further include rating information of a raw query(ies) with respect to a vetted query. The rating of a raw query associated with a vetted query may determine an order in which a vetted query may be presented to an ambassador when constructing a structured query responsive to a user request for information. For example, if a raw query has been associated with a vetted query by ambassadors 50% of the time, the vetted query may be presented higher in a list of suggested queries than a vetted query which has been associated with a raw query by ambassadors 20% of the time. A rating may be based on information such as ratings associated with a guide(s) making an association of a raw query with a vetted query, voting by a guide(s) associated with a category (ies), keyword(s), or other information associated with a vetted query, etc.

Using the example in FIG. 6, three raw queries have been associated with the vetted query 'Who is the quarterback for the Chicago Bears?'. The raw query, 'Who is the quarterback for the Bears?', the raw query. 'Who is the #1 quarterback for the Bears?' and the raw query, 'Chicago Bears quarterback' are associated with the vetted query 'Who is the quarterback for the Chicago Bears?'. Such an association may be used to assist an ambassador in associating a raw query(ies) with a vetted query and/or to perform other tasks such as selecting an advertisement(s), a searcher(s), etc.

The user list field 625 includes information of a user(s) that submitted a raw query which was associated with a vetted query to the search system 130 (FIG. 1). The user list field 625 (FIG. 6) may be used to associate a user(s) with a vetted query. A vetted query record may be created and/or modified when a user is associated with a vetted query. Using the example illustrated in FIG. 6 the user 'Bill 1023' may have submitted the raw query 'Who is the #1 quarterback for the Bears?', which is associated with the vetted query 'Who is the quarterback for the Chicago Bears?'.

The association of a user with a previous query may be used to associate a raw query submitted by a user with a vetted query. For example, a user who previously submitted the raw query 'Who is the #1 quarterback for the Bears?' which was associated with the vetted query 'Who is the quarterback for the Chicago Bears?' might submit a query such as 'Who was the punter for the Bears in 1960?'. As the previous raw query was associated with the vetted query 'Who is the quarterback for the Chicago Bears?' the new raw query might be associated with the vetted query 'Who was the punter for the Chicago Bears in 1960?' Historical context information may be used automatically and/or may be presented to an ambassador or searcher.

The profile field 630 includes information of a profile associated with a vetted query by the search system 130 (FIG. 1). The profile field 630 (FIG. 6) may be used to associate a profile which may include information such as geographic data, demographic data, personality data, time data, location based data, user system data, etc. with a vetted query. As previously mentioned, profile information may differentiate vetted queries which have similar query content. For example, if a raw query is associated with profile information, a ranking of a vetted query may be affected by a match between the profile information associated with the vetted query and the profile information associated with the raw query. A search result which is provided automatically when a vetted query is selected may be customized to a user profile. Profile information associated with a vetted query might also be used to determine information regarding a user. Using the example in FIG. 6, the profile 'Bears Fans' is associated with the vetted query 'Who is the quarterback for the Chicago Bears?'. Using the association of the users 'Bill_1023' and 'Mark 1000' with the vetted query, it may be inferred that the users are 'Bears Fans' if multiple vetted queries associated with that profile are associated with the users.

The search result ID field 635 includes information of a search result(s) associated with a vetted query. Search results may be rated associated with a vetted query. For example, a number of guides and/or users may be presented with a query associated with the vetted query and one or more search results and may indicate an opinion regarding the search result(s). As illustrated in FIG. 6, the search results 'Kyle Orton is the QB—Go Bears', 'www.nfl.com/kyleorton', 'I am in love with Kyle Orton!' and 'www.kyleortonfans.com' are associated with the vetted query 'Who is the quarterback for the Chicago Bears?'

The searcher ID field 640 includes information of a guide (s) associated with a vetted query. In at least one embodiment, a searcher is associated with a search result(s) produced by the searcher. This may for example allow the search system to track use of search result(s) provided by a searcher. For example, a searcher might provide multiple responses to a vetted query in order that reuse of a search result associated with the searcher may be increased. Likewise, a searcher might provide different results which might be delivered to users using various communication services. For example, a searcher might provide a brief answer as an SMS message, a link to a URL for a web browser, a mixed media message for email delivery, etc.

In at least one embodiment, a raw query record such as the raw query record 500 may be used to track information of a query as it is processed by the search system 130 (FIG. 1). For example, when a request is received by the search system 130 a raw query record is created and the query ID field 505 and the user list field 525 and the profile field 530 are populated. The query may be processed automatically, and content of the keyword field 510, the category field 515, and the structured query field 520 determined and rated. Automated categorization and keyword weighting may be performed using techniques well known in the art. Matching to a database of structured queries may be performed using a fulltext search facility such as Lucene which may perform stemming and fuzzy matching to determine a rating or probability that a raw query matches a structured query.

Subsequently, if an ambassador selects a structured query to associate with the raw query, a search result may be associated with the raw query. Using the example in FIG. 6, if an ambassador elects to associate the vetted query 'Who is the quarterback for the Chicago Bears?' with the raw query 'Who is the #1 quarterback for the Bears?', that raw query is indicated in the raw query field 620 (FIG. 6). The search results associated with the structured query record 600 may be associated with the raw query record 500, as indicated in the search result ID field 540. An ambassador may select one or more of the search results associated with a vetted query to be provided to a user. In such an instance, the results selected may be indicated in the search result ID field 540. As the searcher 'Searcher 22' is associated with the search results 'Kyle Orton is the QB—Go Bears' and 'www.nfl.com/kyleorton', as indicated in the searcher ID field 640 (FIG. 6), the ID of the searcher may be added to the Guide ID field 545 (FIG. 5). An identifier of an ambassador may be added to the raw query record 500 in order that ratings and/or compensation of an ambassador may be determined, as indicated in the guide ID field 545. If no search result is associated with a vetted query, or if a rating of a search result(s) associated with a vetted query is below a predetermined threshold, a query may be assigned to a searcher, as described further herein. A searcher may be provided with search resources associated with one or more categories selected by an ambassador.

A vetted query may allow the search system 130 (FIG. 1) to provide an automated response to a request. For example, if a vetted query is associated with a search result(s), if an ambassador selects and/or constructs a vetted query which is determined to match a vetted query in the database a highest ranking search result(s) associated with the vetted query may be provided to a user.

A structured query may be used to obtain a dynamic search result automatically. For example, if a user asked 'What did the Dow do today?' an ambassador might provide the structured query 'What is the closing price for the Dow Jones Industrial Average?' which might produce a programmatic search result. Various forms of a natural language question(s) may be mapped by an ambassador to a vetted query, which may improve utilization of searchers and ambassadors.

By providing an ambassador guide, requests for which a response is readily available may be handled quickly and efficiently. The use of an ambassador and information included in database of vetted queries may increase the number of automated responses, and/or may improve the targeting of a request to a searcher, the content and clarity of a request provided to a searcher and the selection of the search resources provided to a searcher. The activity of ambassador guides may be used to provide a database for processing of requests which may improve the performance of automated processing while providing human intervention efficiently.

Figure 7:
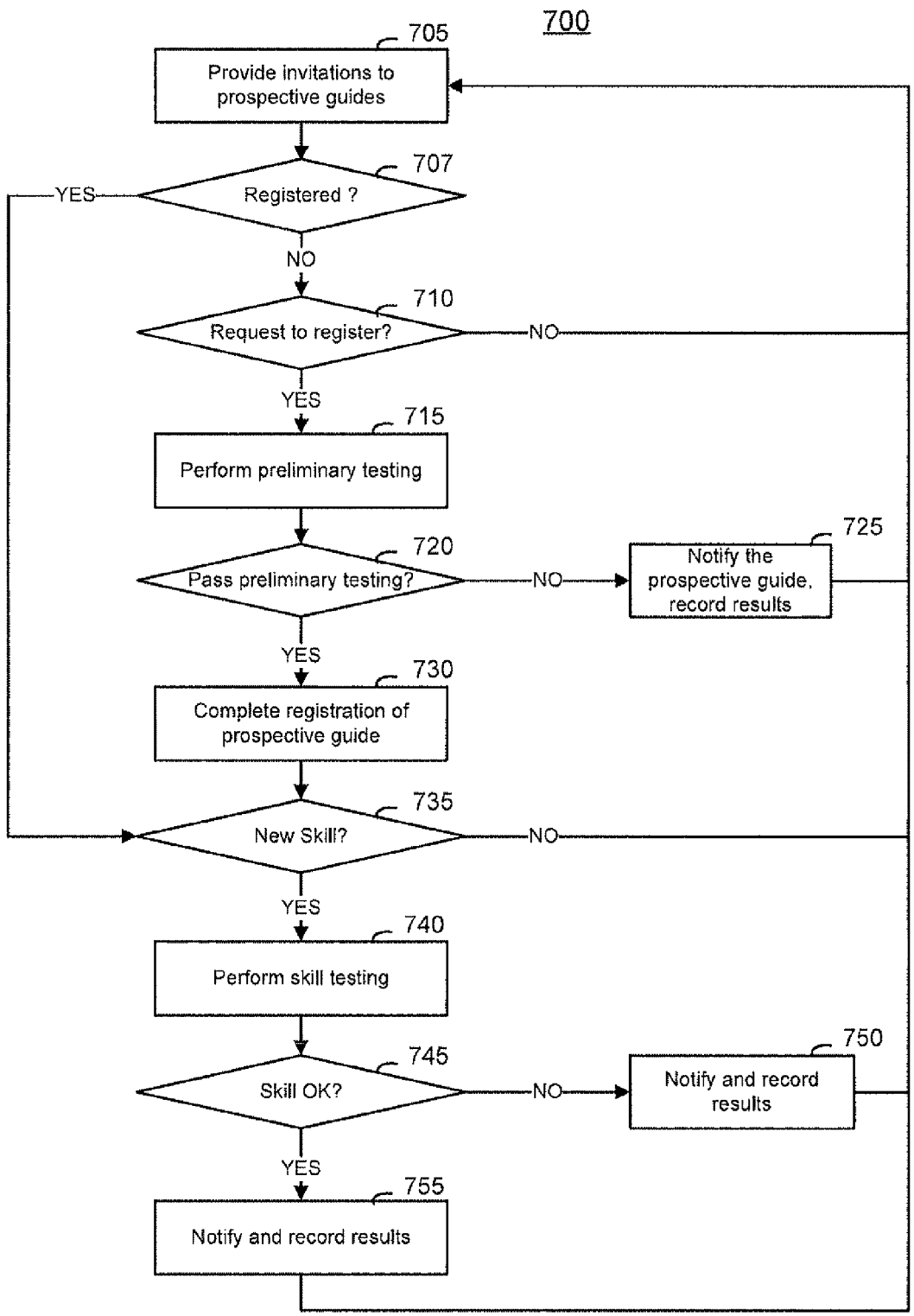
FIG. 7 illustrates a flow diagram of a process of managing guides.

As illustrated in FIG. 7, a process 700 for registering and training a guide is provided.

In operation 705 invitations are sent to prospective guides. An invitation may be sent using various techniques. For example, a guide may receive an email invitation, a guide may be referred by a person or an entity, such as a currently registered guide, an agent designated by the search system, an affiliate group or organization, etc. In at least one embodiment, an invitation includes a unique identifier of a person or organization which invited a person to register as a guide. Control is passed to operation 707 and process 700 continues.

In operation 707 a determination is made as to whether an access request is received from a registered guide. If in operation 707 it is determined that an access request from a registered guide is received, control is passed to operation 735 and process 700 continues. If in operation 707 it is determined that an access request from a registered guide is not received, control is passed to operation 710 and process 700 continues.

In operation 710 a determination is made as to whether a request to register as a guide is received. If in operation 710 it is determined that a request to register as a guide is not received, control is passed to operation 705 and process 700 continues. If in operation 710 it is determined that a request to register as a guide is received, control is passed to operation 715 and process 700 continues.

In operation 715 a preliminary testing where a prospective guide may participate in pre-screening activities is performed. A prospective guide may be required to fill out an application form, and to participate in various forms of testing and training in order to provide information which is used to determine whether a prospective guide is able to perform a set of tasks. A web form and GUI's for pre-registering, training, and testing of various skills are illustrated in FIGS. 8 through 18 herein below. While testing and training for a specific set of skills is illustrated, other types of testing and training may be utilized within the scope and spirit of the disclosure herein. Control is passed to operation 720 and process 700 continues.

In operation 720 a determination is made as to whether a prospective guide has passed the pre-screening testing (requirements). If in operation 720 it is determined that a prospective guide has not passed the pre-screening requirements, control is passed to operation 725 and process 700 continues. If in operation 720 it is determined that a prospective guide has passed the pre-screening requirements, control is passed to operation 730 and process 700 continues.

In operation 725 a prospective guide is informed that the prospective guide has not met the pre-screening requirements. The prospective guide may be presented with a GUI such as the GUI 1900 illustrated in FIG. 19. The GUI 1900 or other techniques may be utilized to obtain feedback and/or other information from a prospective guide who has not met the pre-screening requirements. Information of a prospective guide may be recorded in the database 120 (FIG. 1). Control is passed to operation 705 and process 700 continues.

In operation 730 a prospective guide who has met the pre-screening requirements completes the guide registration process. The process may include presentation of a webpage(s) such as the GUIs illustrated in FIG. 20 through 22 herein below. Various types of information as required by the system administrators of the search system 130 (FIG. 1) may be obtained as part of the registration process. Control is passed to operation 735 and process 700 continues.

In operation 735 a determination is made as to whether a guide is eligible to acquire certification of a new skill. If in operation 735 it is determined that a guide is not eligible to acquire certification of a new skill, control is passed to operation 705 and process 700 continues. If in operation 735 it is determined that a guide is eligible to acquire certification of a skill, control is passed to operation 740 and process 700 continues.

Figure 24:
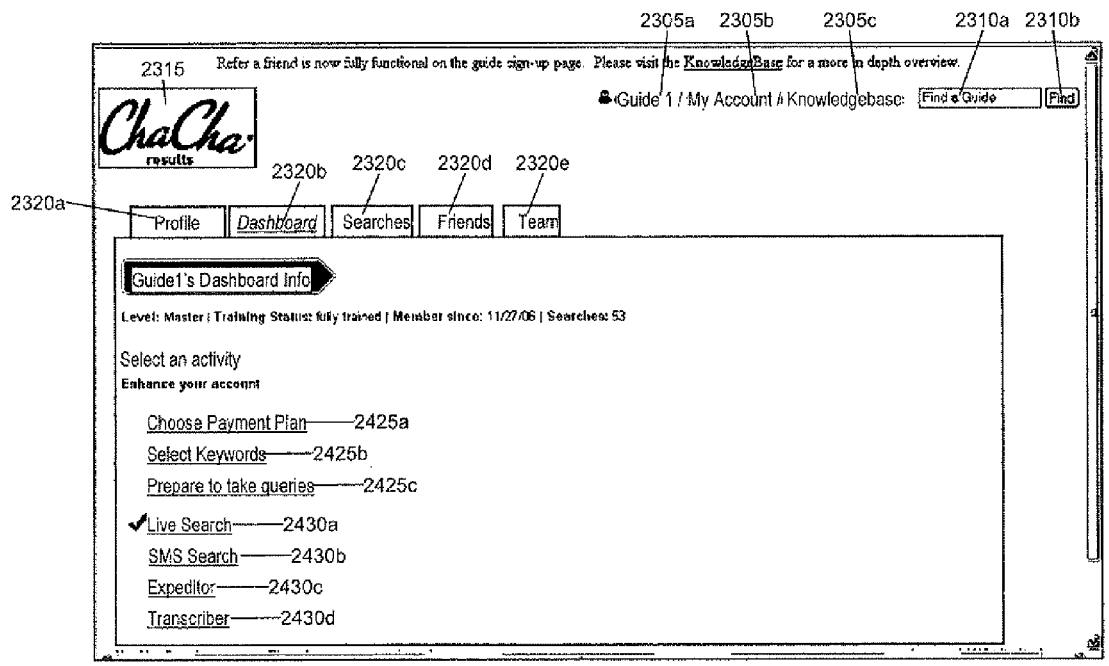
FIG. 24 illustrates a guide test GUI.

The determination in operation 735 may be made based on various criteria. In at least one embodiment, a guide may be offered an option to be trained and/or tested in order to acquire certification of a skill. In at least one embodiment, a guide may be required to meet one or more criteria in order to be eligible to acquire certification of a skill. For example, a guide may be required to be certified to accept a live query before the guide may obtain certification of skills, such as voice, text messaging, email, research or other skills. Any or all certifications of a guide may be recorded in the database 120 (FIG. 1). An exemplary GUI whereby a guide may select skill training and/or testing is illustrated in FIG. 24.

In operation 740 training and/or skill testing is performed. Any form of testing and/or training may be utilized. For example, a guide may be trained and tested using GUIs such as those illustrated in FIGS. 25 through 27 below. Training techniques, such as interactive session training with one or more trainer(s), audio, video, games, and/or other training and testing methods may be employed. Control is passed to operation 745 and process 700 continues.

In operation 745 a determination is made as to whether a guide skill meets a requirement. If in operation 745 it is determined that a guide skill does not meet a requirement, control is passed to operation 750 and process 700 continues. If in operation 745 it is determined that a guide skill does meet a requirement, control is passed to operation 755 and process 700 continues.

The determination in operation 745 may be made based on various criteria. For example, a percentage of correct answers to a multiple choice test may be required, a time interval to complete a task may be required to be greater or less than a value, or a guide may be required to win a competition with another guide, or a guide may be required to achieve a total number of points in a game, etc. Various pass/fail criteria may be applied to an activity to determine if a guide has met a skill requirement.

In operation 750 a guide may be informed of the guide's result(s) from the testing and/or training activity in operation 740 and the result(s) are recorded. A guide may be presented with various form(s) of notification, such as a pop-up GUI, an audio message, a graphical representation of results, etc. Information of the guide's performance relating to training or testing is recorded in the database 120 (FIG. 1). Information regarding a testing or training result(s) may be used to determine whether a guide may be eligible to request certification for a skill(s). Control is passed to operation 705 and process 700 continues.

In operation 755 a guide may also be informed of the guide's result(s) from the testing and/or training activity in operation 740. Information relating to the skill test in operation 740 is updated in the database 120 (FIG. 1). As mentioned above, a guide may be presented with various form(s) of notification, such as a pop-up GUI, an audio message, a graphical representation of results, etc.

Using the process 700 a prospective guide may be pre-screened to determine if the guide meets one or more requirements. Once a guide has been determined to meet one or more requirements, the guide may be trained to perform various tasks. A guide may have multiple skills. As such any guide may be an ambassador, a searcher, a transcriber, an interpreter, etc. Any skill of a guide may be evaluated and certified.

An individual is invited to participate in potentially becoming a guide through an invitation medium. In one embodiment, the invitation is included in an email sent to an individual. An invitation is not limited to be included in an email, a potential guide may be invited by any number of methods such as by providing a link on a web page, obtaining a text message, etc. In one embodiment, an invitation may not be copied or forwarded to another individual. An invitation to a potential guide may include a link to more information about becoming a potential guide. An invitation includes a link or other techniques for directing a potential guide to a guide registration process. In one embodiment, the directing technique will be able to be used once.

If a potential guide elects to register to become a guide he or she can point a browser to a URL which may be provided. A link in an invitation may direct a potential guide's web browser to a URL of a guide registration landing page.

FIG. 8 illustrates an exemplary registration web page 800 provided for entering information for creating an account associated with the search system 130 (FIG. 1). As illustrated in FIG. 8, the registration page 800 may be divided into a credentials section 805, a basic information section 810, areas of interest section 815 and an additional information section 820. The registration page may also include a frequently asked questions (FAQ's) section 885 which may include links to other web pages, drop-down lists, and/or pop-ups, etc. The FAQ's section may provide a potential guide with information regarding the search system, searcher system requirements, discontinuing the registration process, etc. As shown in FIG. 8, the credential section 805 and the basic information section 810 may include a plurality of text boxes and/or drop-down lists for entry of data associated with a potential guide. A user name text box 830 is provided for input of user identification information regarding a potential guide that may be utilized to identify the potential guide within the search system. The registration page 800 may also include the password text box 835 and the password confirmation text box 840 wherein a prospective guide may enter a password and confirm the password that will be utilized when logging in to the registration process and/or logging in to the search system 130 (FIG. 1). The credential section 805 may also include an email text box 845 for input of a prospective guide's email address as shown in FIG. 8.

The basic information section 810 may include the first name text box 850, the middle initial text box 852, and the last name text box 854 for entry of the name of a prospective guide. As shown in FIG. 8, the basic information section 810 may include multiple address text box lines 856, 858, the city text box 860, a state text box or drop-down list 862 and the postal code text box 864 for entry of the prospective guide's address information. A phone number text box 866 may be provided for entry of a phone number of a prospective guide. Preferably the phone number text box requires entry of a ten-digit number including area code. Address and/or area code information may be utilized to establish a geographic location for a guide, which geographic location information may be utilized in a process for selecting a guide(s) eligible to respond to a query(ies) submitted by an information seeker or user.

The registration page may also include a gender text box or preferably a drop-down list 868 and a date of birth text box or preferably a drop-down list 870 whereby a prospective guide may indicate his or her gender and date of birth. As shown in FIG. 8, the registration page may also include the areas of interest section 815 which includes check boxes populated with a list of a plurality of interest areas whereby a prospective guide may indicate areas that may be of interest, familiarity, proficiency, etc. As shown in FIG. 8, the registration page may also include the additional information section 820.

The additional information section 820 includes the level of education text box 880, the internet connection speed text box 882, and the referral text box 884. The level of education text box 880 is preferably a drop-down list of levels of education to permit a prospective guide to indicate the highest level of education he or she has completed or may be completing. The internet connection speed text box 882 is preferably a drop-down list of internet connection speeds to permit a prospective guide to indicate the speed at which he or she will connect to the system. The referral text box 884 is preferably a drop-down list of a plurality of sources from which a potential guide may indicate his or her source of information regarding the search system. Upon indicating any data required for the registration page 800, a prospective guide may click on the "Sign Up" button 825 or may otherwise indication completion of the registration page. Although registration is described using a registration page 800 in FIG. 8, the present invention is not limited to any particular interface to register a guide to the system 100 (FIG. 1).

Figure 9:
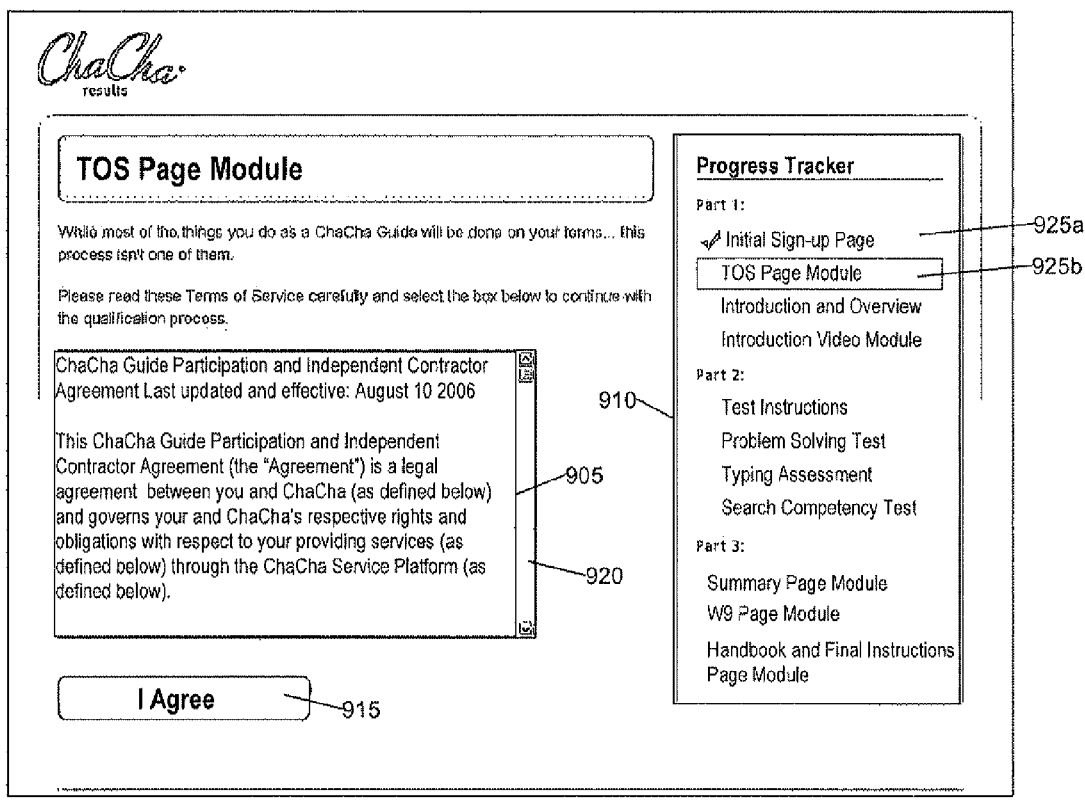
FIG. 9 illustrates a guide terms of service GUI.

As illustrated in FIG. 9, following the registration page 800, the web browser of a prospective guide is directed to the terms of service page 900. The terms of service page 900 includes a terms of service section 905, a progress tracker 910 and a decision button 915. The progress tracker indicates the current status of the prospective guide within the registration process. The progress tracker may include a list of a plurality of operations included in the registration process and any of the operations may be subdivided into parts or separate sections as illustrated. As shown in FIG. 9, operation(s) of the registration process that have been completed and the registration operation currently in progress may be marked by an indicator. In one embodiment, the registration operation(s) completed are identified by a check mark, and the current registration operation in progress is highlighted.

The identification methods in the progress tracker are not limited to any configuration, for example completed registration operation(s) may be indicated by a flag, strikethrough, etc. and the current registration operation may be indicated by a flag, underline, highlighted, etc. The terms of service section 905 may include a scrollable text box or other controls for viewing the text setting forth the conditions, terms, rules and/or regulations applicable to registered guides within the search system 130 (FIG. 1). The decision button 915 to agree to the terms, conditions, rules and regulations set forth in the terms of service section 905 may be provided whereby a prospective guide may indicate willingness to comply with the terms and conditions set forth. If a potential searcher indicates an unwillingness to comply with the terms and conditions set forth in the terms of service section 905, the prospective guide may not be allowed to continue registration. Upon review of any data required for registration with the search service, a prospective guide may click on an "I Agree" button or may otherwise indicate completion of the terms of service page 900 for registration.

As illustrated in FIG. 10, following the terms of service page 900, the web browser of a prospective guide may be directed to the overview page 1000. The overview page includes a progress tracker 1005 and a "Next" button 1010. The progress tracker 1005 as previously described in FIG. 9, provides a prospective guide with his or her updated progress during the registration process. The overview page 1000 provides a prospective guide with an overview of the plurality of operations included in the registration process. Upon review of any data required for registration with the search service, a prospective guide may click on the "Next" button 1010 or may otherwise indicate completion of the overview page 1000 for registration.

Figure 11:
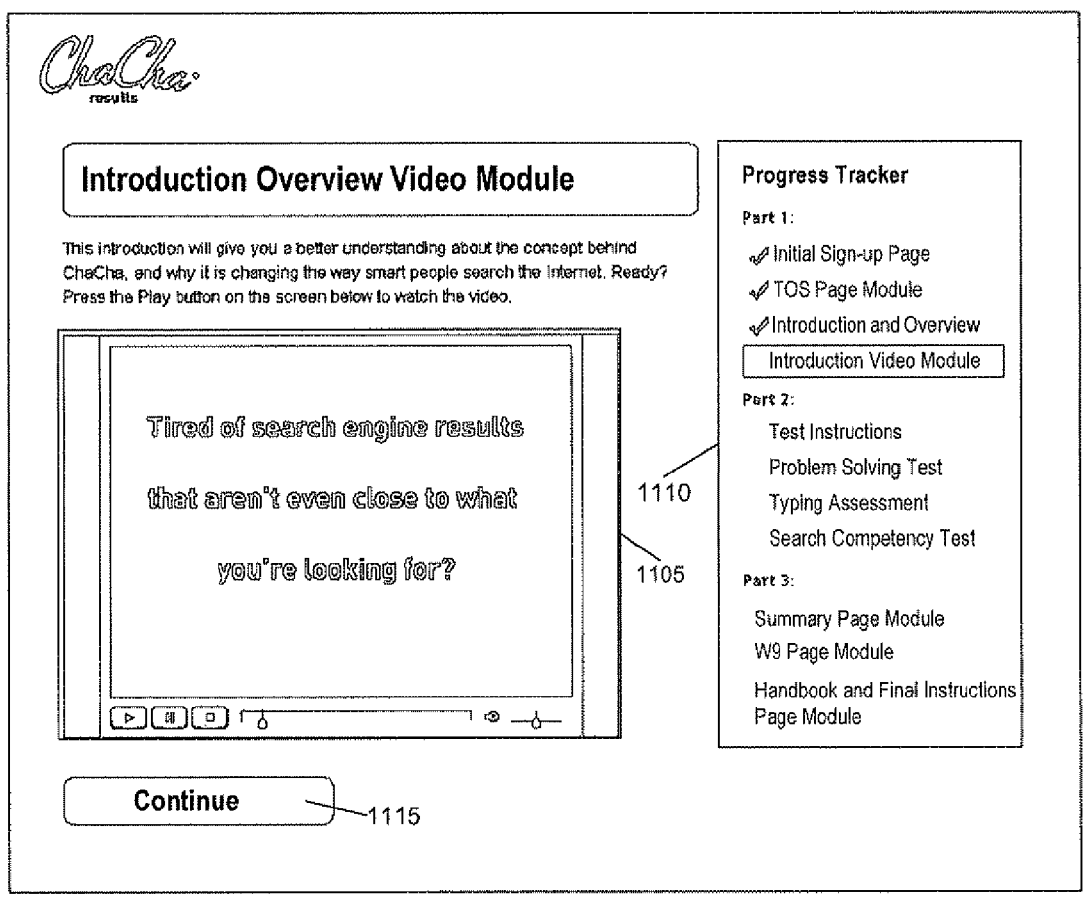
FIG. 11 illustrates a guide training GUI.

As illustrated in FIG. 11, following the overview page 1000, the web browser of a prospective guide is directed to the introduction page 1100. The introduction page 1100 includes a media window 1105, a progress tracker 1110 and a "Continue" button 1115. The progress tracker 1110 as previously described in FIG. 9, provides the prospective guide with his or her updated progress during the registration process. The introduction page 1100 also includes the media window 1105. The media window 1105 is preferably a video window with controls provided whereby a prospective guide may control media play. The introduction media is not limited to a video, for example, image(s), a slideshow, and/or audio recording, etc. may be included as introduction material(s) for a prospective guide. Upon review of any data required for registration with the search service, a prospective guide may click on the "Continue" button 1115 or may otherwise indicate completion of the introduction page 1100 for registration.

As illustrated in FIG. 12, following the introduction page 1100, the web browser of a prospective guide is directed to the test instructions page 1200. The test instructions page 1200 includes a progress tracker 1205 and a "Start Test Now" button 1210. The progress tracker 1205 as previously described in FIG. 9, provides the prospective guide with his or her updated progress during the registration process. The test instructions page 1200 may provide a prospective guide an overview of the testing part of the registration process. The test instructions page 1200 may include a list of a plurality of tests that will be administered to a prospective guide. In one embodiment, the tests include a problem solving test, a typing assessment test, and a search competency test. A testing procedure explanation may also be provided on the test instructions page 1200. An explanation may include for example, the amount of time a prospective guide has to complete each test, the materials a prospective guide may use to complete the tests, etc. The test instructions page 1200 may also provide the prospective guide instructions on the option of discontinuing the registration and testing process. Upon review of any data on the test instructions page 1200, a prospective guide may click on the "Start Test Now" button 1210 or may otherwise indicate completion of the test instructions page 1200 for registration.

Figure 13:
FIG. 13 illustrates a guide test instruction GUI.

As illustrated in FIG. 13, following the test instructions page 1200, the web browser of a prospective guide is directed to the test cover page 1300. The test cover page 1300 includes a progress tracker 1305 and a "Start" button 1310. The progress tracker 1305 as previously described in FIG. 9, provides a prospective guide with his or her updated progress during the registration process. The test cover page 1300 may provide a prospective guide a plurality of instructions associated with a particular test, an example(s) of questions that may be posed, and/or the option to discontinue the testing process. On the test cover page 1300 a link may be provided to direct a prospective guide to a URL where he or she may navigate to continue the testing process if the browser window is closed during the testing process. In one embodiment, the option to continue testing may only be provided to a prospective guide before or after a test has been administered. Upon review of any data on the test cover page, a prospective guide may click on the "Start" button 1310 or may otherwise indicate completion of the test cover page 1300.

As illustrated in FIG. 14, following the test cover page 1300, the web browser of a prospective guide is directed to a test page. The test page 1400 may be one of several GUI's in a particular test that may be presented to a prospective guide. As illustrated in FIG. 14, the test page 1400 includes a progress tracker 1405, test question windows 1410, selection controls 1415, a time tracker 1420 and a "Next" button 1425. The progress tracker as previously described in FIG. 9, provides a prospective guide with his or her updated progress during the registration process. The test page 1400 includes a plurality of test question windows 1410 and selection controls 1415. In one embodiment the selection controls 1415*a*, 1415*b* are radio buttons presented to a prospective guide whereby he or she may select his or her choice of mutually exclusive answers to a question(s). The selection controls 1415 are not limited to any certain type. For example, a prospective guide may indicate his or her choice of answer by entry in a text box, selecting from a drop-down list, marking a check box, etc.

The test page 1400 also includes a time tracker 1420. In one embodiment, the time tracker 1420 displays the time a prospective guide has remaining in a test. Upon review of the questions presented in the test window 1410, a prospective guide may click the "Next" button 1425 or may otherwise indicate completion of the test page 1400. The test page(s) may include any configuration of controls, for example, a test page(s) subsequent to a first test page may include a "Back" button to provide a prospective guide an option to navigate to a previously viewed test page. Any number of test pages may be presented to a prospective guide during a particular test. Test pages may include questions of any type, for example multiple-choice type questions, true/false questions, fill-in-the-blank questions, etc. Tests may include interactive activities such as training and/or testing sessions with a guide, user, or other person(s), etc. Upon review of the final question in a particular test, a prospective guide may click on a done button or may otherwise indicate completion of a particular test.

In at least one embodiment, a second test is provided to a prospective guide. As illustrated in FIG. 15, following the completion of a prior test, the web browser of a prospective guider or searcher is directed to a second test cover page 1500. The second test cover page 1500 includes a progress tracker 1505 and a "Start" button 1510. The progress tracker as previously described in FIG. 9, provides the prospective guide with his or her updated progress during the registration process. The second test cover page 1500 may provide a prospective guide a plurality of instructions associated with a particular test, an example(s) of questions that may be posed, and/or the option to discontinue the testing process. On the second test cover page 1500 a link is provided to direct a prospective guide to a URL where he or she may navigate to continue the testing process if the browser window is closed during the testing process. In one embodiment, the option to continue testing may only be provided to a prospective guide before or after a test has been administered. Upon review of any data on the second test cover page 1500, a prospective guide may click on the "Start" button 1510 or may otherwise indicate completion of the second test cover page 1500.

Figure 16:
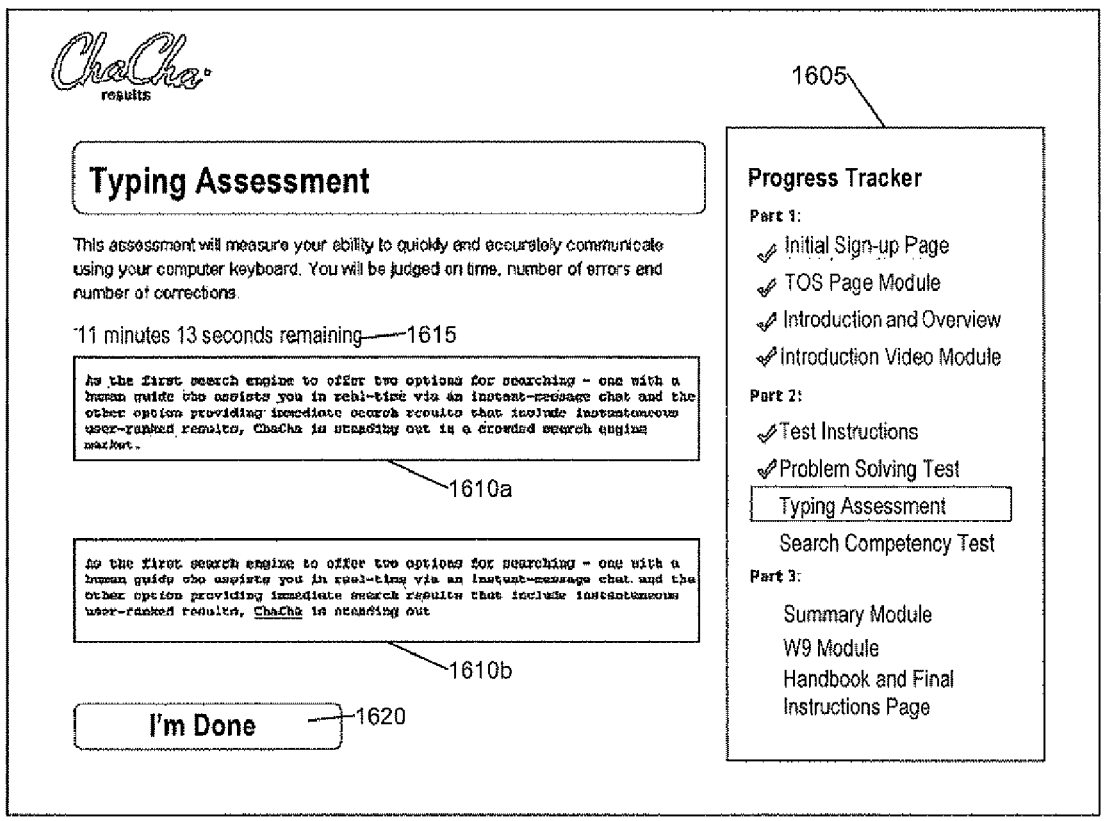
FIG. 16 illustrates a guide test GUI.

As illustrated in FIG. 16, following the second test cover page 1500, the web browser of a prospective guide is directed to a test page. The test page 1600 may be one of several GUI's in a particular test that may be presented to a prospective guide. As illustrated in FIG. 16, the test page 1600 includes a progress tracker 1605, test windows 1610, a time tracker 1615, and an "I'm Done" button 1620. The progress tracker 1605 as previously described in FIG. 9, provides the prospective guide with his or her updated progress during the registration process. In one embodiment, the test page 1600 includes a passage of text in the text window 1610*a* and the text box 1610*b* is provided to test the typing proficiency of a prospective guide. Text is self-populated and displayed in the text window 1610*a* at a pace associated with the rate at which text is typed by a prospective guide in the text box 1610*b*. The test page 1600 may also include a time tracker 1615. In one embodiment, the time tracker 1615 displays the time a prospective guide has remaining in a certain test. Upon review and/or completion of the test, a prospective guide may click the "I'm Done" button 1620 or may otherwise indicate completion of the test page 1600.

Any number of test pages may be presented to a prospective guide during a particular test. For example, multiple typing proficiency tests may be presented on a plurality of test pages in a particular test. The test pages may include any configuration of controls, for example, if a test includes a plurality of test pages, a first test page may include a "Next" button to provide a prospective guide the option of continuing to a subsequent test page, or a test page subsequent to a first test page may include a "Back" button to provide a prospective guide an option to navigate to a previously viewed test page. Test pages may include questions of any type, for example multiple-choice type questions, true/false questions, fill-in-the-blank questions, etc.

Figure 17:
FIG. 17 illustrates a guide test instruction GUI.

As illustrated in FIG. 17, following the completion of a prior test, the web browser of a prospective guider or searcher may be directed to a third test cover page. The test cover page 1700 includes a progress tracker 1705 and a "Start" button 1710. The progress tracker 1705 as previously described in FIG. 9, provides a prospective guide with his or her updated progress during the registration process. The test cover page 1700 may provide a prospective guide a plurality of instructions associated with a particular test, an example(s) of questions that may be posed, and/or the option to discontinue the testing process. In one embodiment, the test cover page 1700 provides a link that opens a browser window on the prospective guide's searcher system. The browser window may be used for completion of the test. As illustrated in FIG. 17, the test cover page 1700 may include a link to direct a prospective guide to a URL where he or she may navigate to continue the testing process if the browser window is closed during the testing process. In one embodiment, the option to continue testing may only be provided to a prospective guide before or after a test has been administered. Upon review of any data on the test cover page 1700, a prospective guide may click on the "Start" button 1710 or may otherwise indicate completion of the test cover page 1700.

As illustrated in FIG. 18, following the test cover page 1700, the web browser of a prospective guide is directed to a test page. The test page 1800 may be one of several GUI's in a particular test that may be presented to a prospective guide. As illustrated in FIG. 18, the test page 1800 includes a progress tracker 1805, test question windows 1810, selection controls 1815, a time tracker 1820 and a "Next" button 1825. The progress tracker 1805 as previously described in FIG. 9, provides a prospective guide with his or her updated progress during the registration process. In one embodiment, the test window 1800 includes a plurality of test question windows 1810 and selection controls 1815.

In one embodiment the selection controls 1815 are radio buttons 1815a, 1815b presented to a prospective guide whereby he or she may select his or her choice of mutually exclusive answers to a question. The selection controls 1815 are not limited to any certain type. For example, a prospective guide may indicate his or her choice of answer by entry in a text box, selecting from a drop-down list, marking a check box, etc. The test page 1800 may also include a time tracker 1820. In one embodiment, the time tracker 1820 displays the time a prospective guide has remaining in a certain test. Upon review of the question(s) presented in the test window 1810, a prospective guide may click the "Next" button 1825 or may otherwise indicate completion of the test page 1800. The test pages may include any configuration of controls, for example, test pages subsequent to a first test page may include a "Back" button to provide a prospective guide an option to navigate to a previously viewed test page. Any number of test pages may be presented to a prospective guide during a particular test. Test pages may include questions of any type, for example, multiple-choice type questions, true/false questions, fill-in-the-blank questions, etc. Upon review of a final question in a particular test, a prospective guide may click on a done button or may otherwise indicate completion of a particular test.

Figure 19:
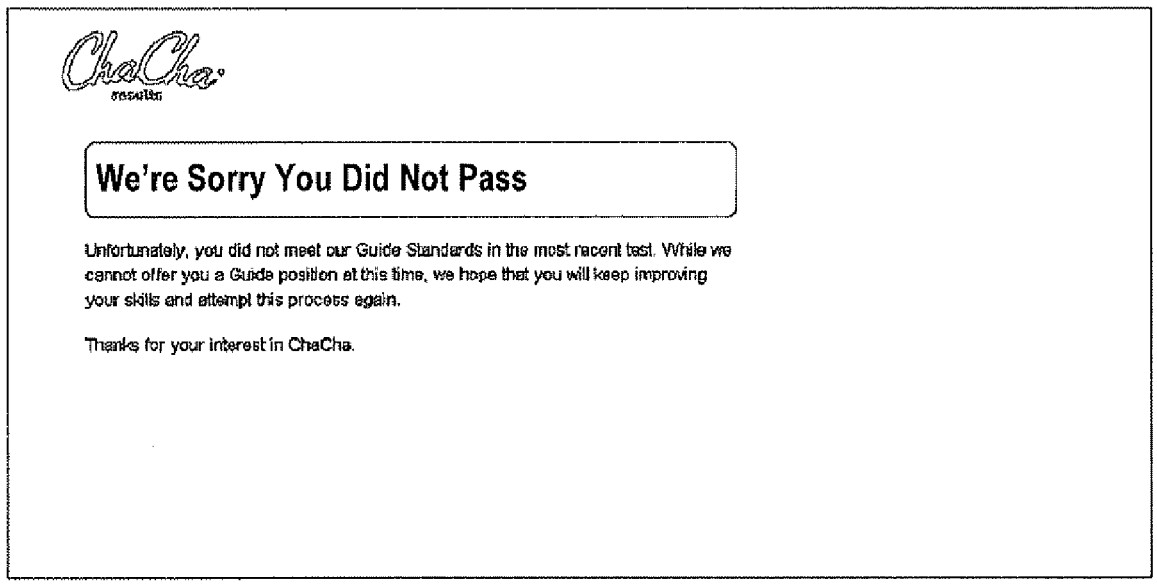
FIG. 19 illustrates a guide notification GUI.

Any number of tests may be presented to a prospective guide. If a prospective guide does not meet certain system requirements for any test(s) at any point in the registration process, a message noting the inability of the prospective guide to continue with the registration process may be provided. As illustrated in FIG. 19, the exemplary message page 1900 may be provided to a prospective guide that is unable to continue. After completion of a plurality of tests, if a guide meets certain system requirements for all tests, the web browser of a prospective guide will be directed to a summary page indicating the ability to continue with the registration process.

Figure 20:
FIG. 20 illustrates a guide notification GUI.

As illustrated in FIG. 20, a summary page 2000 includes a progress tracker 2005 and a "Continue" button 2010. The progress tracker 2005 as previously described in FIG. 9, provides the prospective guide with his or her updated progress during the registration process. The summary page 2000 may provide a prospective guide a summary of the scores associated with completed tests, a plurality of remaining operations associated with registration, and/or the option to discontinue the testing process. In one embodiment, the summary of scores is presented as bars indicating a percentage associated with a particular test. As illustrated in FIG. 20, on the summary page 2000 a link is provided to direct a prospective guide to a URL where he or she may navigate to continue the registration process if the browser window is closed during the testing process. In one embodiment, the option to continue testing may only be provided to a prospective guide before or after a test has been administered. Upon review of any data on the summary page 2000, a prospective guide may click on the "Continue" button 2010 or may otherwise indicate completion of the summary page 2000.

Figure 21:
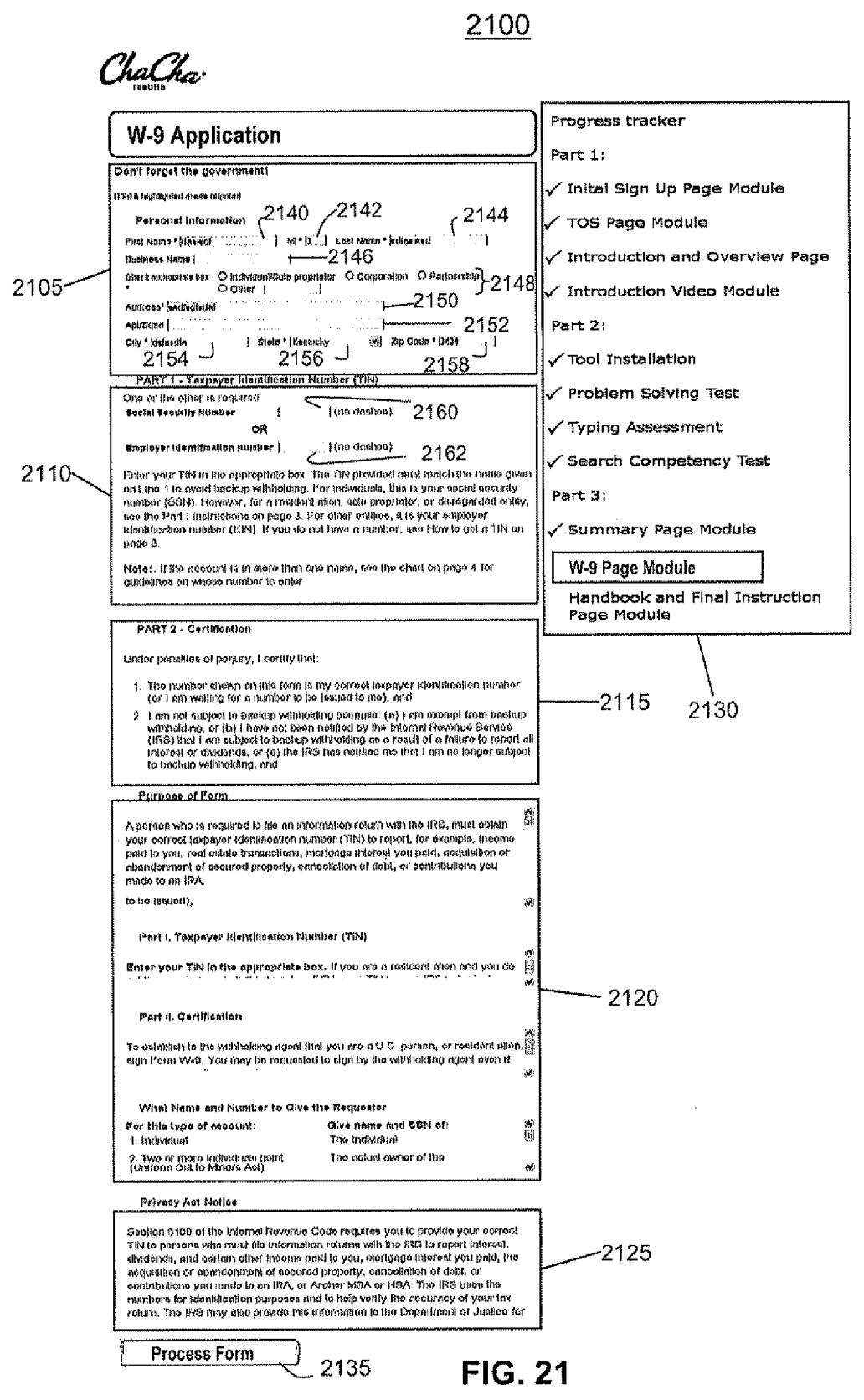

As illustrated in FIG. 21, upon completion of the summary page 2000, the web browser of a prospective guide is directed to a tax application page 2100. The tax application page 2100 includes a personal information section 2105, a taxpayer identification section 2110, a certification section 2115, terms and conditions sections 2120, and a privacy notice section 2125. The personal information section 2105 includes first name text box 2140, the middle initial text box 2142, the last name text box 2144, the business name text box 2146 and the business type selection boxes 2148 for entry of the personal name and/or business name and/or business type of the prospective guide. As shown in FIG. 21, the personal information section 2105 may include multiple address text box lines 2150, 2152, the city text box 2154, a state text box or drop-down list 2156 and the postal code text box 2158 for entry of the prospective guide's address information. The taxpayer identification section 2110 includes a social security text box 2160 and an employer identification number text box 2162. Preferably the social security number text box and the employer identification number text box requires entry of number without dashes. The certification section 2115 includes a plurality of selection controls whereby a prospective guide may certify the validity of the information he or she provided.

The selection controls may be check boxes, drop-down lists, and/or radio buttons. The terms and conditions section 2120 includes a plurality of scrollable text windows containing terms, conditions, restrictions, etc. associated with the information provided on the tax application page. The privacy notice section 2125 may include legal and/or other information associated with the rights, terms, conditions, etc. related to the collection of any information provided on the tax application page 2100. The tax application page 2100 also includes the progress tracker 2130 and the "Process Form" button 2135. The progress tracker 2130 as previously described in FIG. 9, provides the prospective guide with his or her updated progress during the registration process. Upon indicating any data required for the tax application page 2100, a prospective guide may click on the "Process Form" button 2135 or may otherwise indication completion of the registration page.

As illustrated in FIG. 22, upon completion of the tax application page, the web browser of a prospective guide is directed to a final page 2200. The final page 2200 includes a progress tracker 2205 and a "Visit your Profile" button 2210. The progress tracker as previously described in FIG. 9, provides the prospective guide with his or her updated progress during the registration process. The final page may include information and/or links associated with the search system 130 (FIG. 1). The links may be provided to direct a prospective guide to a URL where he or she may navigate to set-up a guide profile, complete a payment process, access information, etc. Upon review of the information and/or links on the final page, a prospective guide may click on the "Visit your Profile" button 2210 whereby the web browser of a prospective guide will be directed to his or her guide profile.

Figure 23:
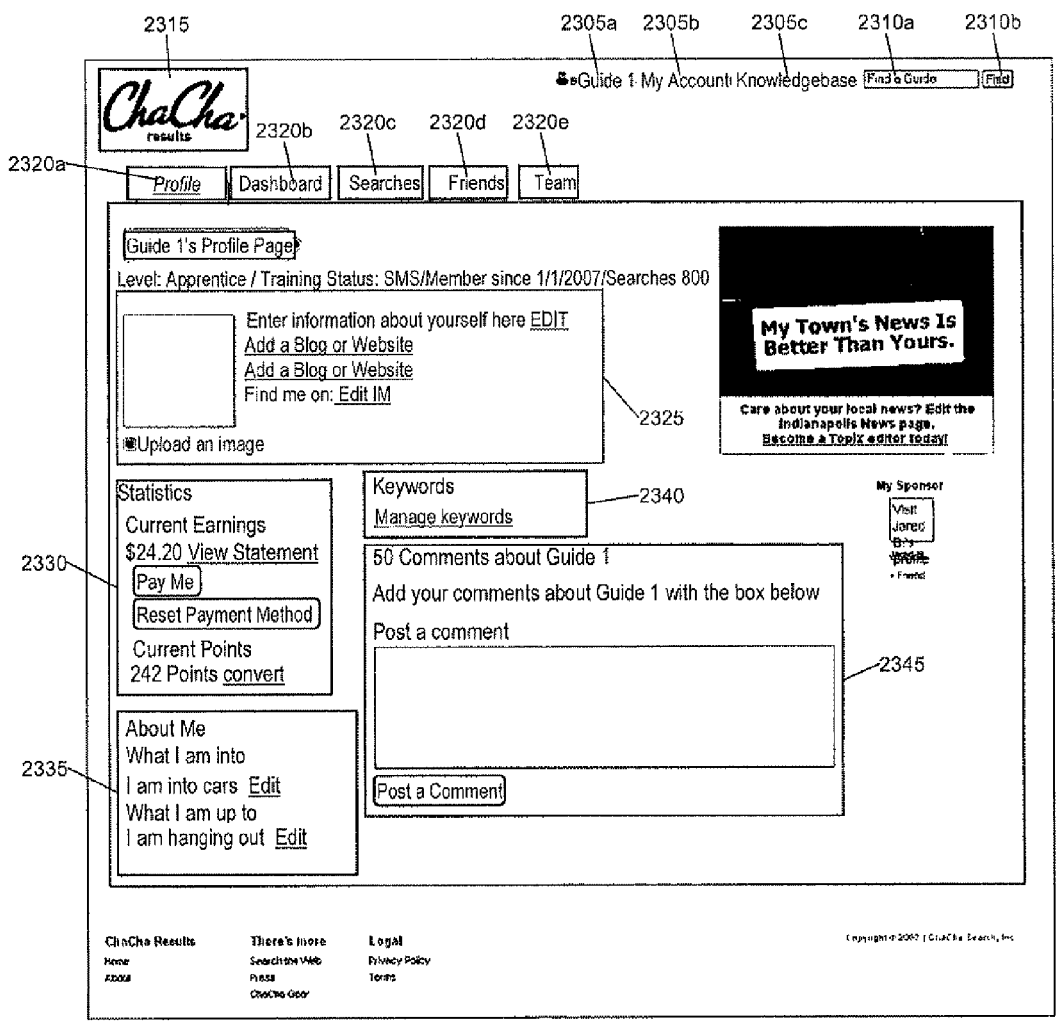
FIG. 23 illustrates a guide profile GUI.

An exemplary guide profile page 2300 is illustrated in FIG. 23. The guide profile page 2300 includes account navigation controls 2305, guide locator controls 2310, an advertising window 2315, navigation tabs 2320, a personal contact window 2325, a payment information window 2330, an interest window 2335, a keywords window 2340 and a comments window 2345.

The account navigation controls 2305 allow a guide to navigate to web pages provided by the search system 130 (FIG. 1). The "Guide 1" account navigation control 2305*a* may be used to log-on of log-off the system. The "My Account" account navigation control 2305*b* may be used to cause the GUI 2300 to be presented. The "Knowledgebase" account navigation control 2305*c* may be used to view documentation provided to guides. The guide locator controls 2310 may be used to locate a guide. A search term may be entered in the search box 2310*a* and submitted for a search using the "Find" button 2310*b*. The advertising window 2315 includes an advertisement which may be targeted based on information indicated in the GUI 2300. Multiple advertising windows may be present in the GUI 2300.

The navigation tabs 2320 may be used to navigate to web pages associated with a guide account with the search system 130 (FIG. 1). The "Profile" navigation tab 2320*a* may be used to display the GUI 2300. The "Dashboard" tab 2320*b* may be used to display the GUI 2400 (FIG. 24). The "Searches" tab 2320*c* may be used to display information of searches performed by a guide. The "Friends" tab 2320*d* may be used to display information of other guides associated with a guide. The "Team" tab 2320*e* may be used to display information of guides who have a sponsorship relationship to the guide.

The personal contact window 2325 may be used to indicate contact information, an image, and other information which may be included in a profile of a guide. The payment information window 2330 may be used to indicate payment information associated with a guide. The interest window 2335 may be used to indicate information regarding current activities of a guide. The keywords window 2340 may include controls to allow a guide to view and manage keywords associated with the guide. The comments window 2345 may be used to provide information of comments associated with a guide.

Subsequent to registration, a guide may be offered an option to take a certification test(s) for a skill(s). For example, a GUI such as the GUI 2400 illustrated in FIG. 24 may be presented to a guide. The GUI 2400 may be used to display and select items such as skills for which a guide may elect to become certified. The GUI 2400 may include account navigation controls 2305, guide locator controls 2310, an advertising window 2315, navigation tabs 2320, guide activity controls 2425 and guide skill controls 2430.

The account navigation controls 2305 allow a guide to navigate to web pages provided by the search system 130 (FIG. 1). The "Guide 1" account navigation control 2305*a* may be used to log-on of log-off the system. The "My Account" account navigation control 2305*b* may be used to cause the GUI 2300 to be presented. The "Knowledgebase" account navigation control 2305*c* may be used to view documentation provided to guides. The guide locator controls 2310 may be used to locate a guide. A search term may be entered in the search box 2310*a* and submitted for a search using the "Find" button 2310*b*. The advertising window 2315 includes an advertisement which may be targeted based on information indicated in the GUI 2300. Multiple advertising windows may be present in the GUI 2300.

The navigation tabs 2320 may be used to navigate to web pages associated with a guide account with the search system 130 (FIG. 1). The "Profile" navigation tab 2320*a* may be used to display the GUI 2300. The "Dashboard" tab 2320*b* may be used to display the GUI 2400 (FIG. 24). The "Searches" tab 2320*c* may be used to display information of searches performed by a guide. The "Friends" tab 2320*d* may be used to display information of other guides associated with a guide. The "Team" tab 2320*e* may be used to display information of guides who have a sponsorship relationship to the guide.

The guide activity controls 2425 may be used to select an activity. The activity control 2425*a* may be used to select a payment plan for a guide. The activity control 2425*b* may be used to manage keywords. The activity control 2425*c* may be used to prepare to receive search requests.

The guide skill controls 2430 may be used to select various options for acquiring a new skill certification. The "check mark" indicator beside the "Live Search" skill control 2430*a* may indicate that a guide is certified to perform live interactive searches. The "SMS Search" skill control 2430*b* be used to cause the GUI 2500 (FIG. 25) to be provided, The "Expeditor" skill control 2430*c* may cause a certification test associated with the ambassador role to be provided. The "Transcriber" skill control 2430*d* may cause a certification test associated with voice transcription to be provided. While a 'check mark' has been used as an indicator any type of indication may be used. Any number of guide skill options, guide status indicators, or other indicators may be presented using the GUI 2400.

In at least one embodiment, a registered guide may be provided with a skills test, such as an SMS skills test. Activation of a link such as the "SMS Search" skill control 2430*b* (FIG. 24) may cause the GUI 2500 to be presented. As illustrated in FIG. 25, following the activation of the SMS query link 2430 (FIG. 24) may direct the browser of a guide to the SMS test cover page. The test cover page 2500 (FIG. 25) includes the progress tracker 2505 and the "Start Test Now" button 2510. The progress tracker 2505 provides a registered searcher with an indication of the searcher's updated progress during the testing process. The test cover page 2500 may provide a guide a plurality of instructions associated with a particular test, an example(s) of questions that may be posed, and/or the option to discontinue the testing process. In one embodiment, the test cover page 2500 provides a link that opens a browser window on the guide's computer system. The browser window may be used for completion of the test.

As illustrated in FIG. 25, the test cover page 2500 may include a link that may be provided to direct a guide to a URL where he or she may navigate to continue the testing process if the browser window is closed during the testing process. In one embodiment, the option to continue testing may only be provided to a searcher before or after a test has been administered. Upon review of any data on the test cover page 2500, a guide may click on the "Start Test Now" button 2510 or may otherwise indicate completion of the test cover page 2500.

Figure 26:
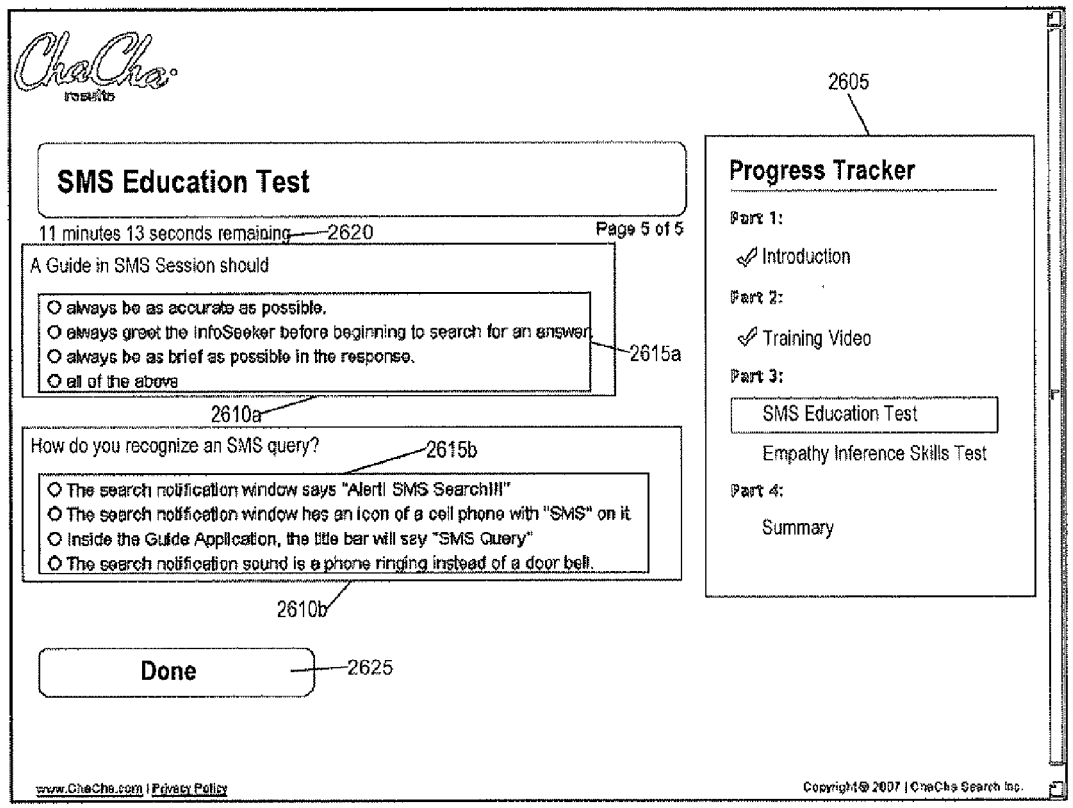
FIG. 26 illustrates a guide test GUI.

As illustrated in FIG. 26, following the test cover page 2500, the web browser of a registered guide is directed to a test page. The test page 2600 may be one of several GUIs in a particular test that may be presented to a guide. As illustrated in FIG. 26, the test page 2600 includes the progress tracker 2605, the test question windows 2610, the selection controls 2615, the time tracker 2620 and the "Done" button 2625. The progress tracker 2605 as previously described in FIG. 25, provides a registered searcher with an indication of the searcher's updated progress during the testing process. In one embodiment, the test window 2600 includes a plurality of test question windows and selection controls 2615. In one embodiment the selection controls 2615 are radio buttons 2615a, 2615b presented to a guide whereby he or she may select his or her choice of mutually exclusive answers to a question(s). The selection controls 2615 are not limited to any certain type. For example, a guide may indicate his or her choice of answer by entry in a text box, selecting from a drop-down list, marking a check box, etc.

The test page 2600 may also include a time tracker 2620. In one embodiment, the time tracker 2620 displays the time a guide has remaining in a certain test. Upon review of the questions presented in the test window 2610, a guide may click the "Done" button 2625 or may otherwise indicate completion of the test page 2600. The test pages may include any configuration of controls, for example, test pages subsequent to a first test page may include a "Back" button to provide a guide an option to navigate to a previously viewed test page. Any number of test pages may be presented to a guide during a particular test. Test pages may include questions of any type, for example, multiple-choice type questions, true/false questions, fill-in-the-blank questions, etc. Upon review of a final question in a particular test, a guide may click on the "Done" button 2625 or may otherwise indicate completion of a particular test.

Figure 27:
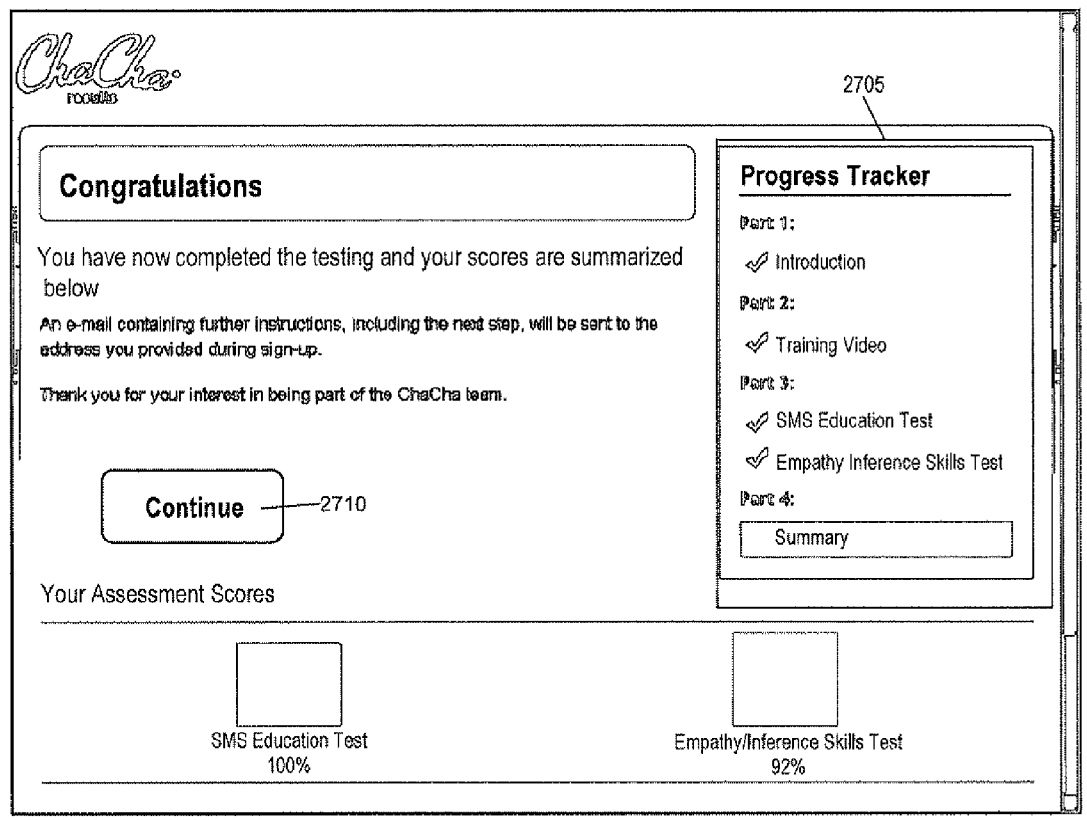
FIG. 27 illustrates a guide test GUI.

As illustrated in FIG. 27, the summary page 2700 includes a progress tracker 2705 and a "Continue" button 2710. The progress tracker 2705 as previously described in FIG. 25, provides a registered searcher with an indication of the searcher's updated progress during the testing process. The summary page 2700 may provide a guide a summary of the scores associated with completed tests, a plurality of remaining operations associated with a skill certification, and/or the option to discontinue the testing process. In one embodiment, the summary of scores is presented as bars indicating a percentage associated with a particular test. As illustrated in FIG. 27, on the summary page 2700 a link may be provided to direct a guide to a URL where he or she may navigate to return to a GUI such as the GUI 2400 illustrated in FIG. 24. In one embodiment, the option to continue testing may only be provided to a searcher before or after a test has been administered. Upon review of any data on the summary page 2700, a guide may click on the "Continue" button 2710 or may otherwise indicate completion of the summary page 2700.

A guide skill certification test may assess the competence of a guide to perform a task(s). A guide may be trained and/or tested on the use of tools such as the query formation tools and/or the response processing tools further described herein below.

As illustrated in FIG. 28, an exemplary GUI is provided for creation of a vetted query based upon a raw query which is to be associated with a category(ies). The GUI 2800 includes a progress bar 2805, a raw query box 2807, a "Clarify" button 2810, query formation controls 2815, a succinct query indicator 2817, a query selection window 2820, a category selection window 2825, a "Select Quick Category" button 2830, an "Exit" button 2835, an "Abuse" button 2840, an "AutoGuide Query" button 2845, a "Next" button 2850, chat windows 2855 and a "Send Text" button 2860.

The progress bar 2805 indicates operation(s) that a guide has completed using the GUI 2800. Using the example in FIG. 28, an ambassador may perform an operation process in which a succinct query is formed based on information obtained using the GUI 2800; a categorization of a query is performed using the GUI 2900 illustrated in FIG. 29, a review of available search results and guides responsive to the categorized succinct query is performed using the GUI 3000 illustrated in FIG. 30, and a review and revision of a response to a user query is performed using the GUI 3100 illustrated in FIG. 31. Indication in the progress bar 2805 may be done using indicators such as color, shading, underlining, flags, etc.

As illustrated in the FIG. 28, information of a raw query is displayed in the raw query box 2807. A raw query may be a query provided to a guide by an information seeker, by the search system database, etc. For example, the raw query may be the text that an information seeker or user typed into a search query box, on a web page, submitted as an SMS text message, or which was converted from speech to text by a transcriber, an automated process, etc. As shown in FIG. 28, the query box 2807 is illustrated as a text box, however other information may be provided to a guide, such as an audio record associated with a raw query, images which may be associated with a raw query, etc.

The query formation controls 2815 may be used by a guide to transform a raw or free-form query into a succinct or structured query. As shown in FIG. 28, the query formation controls 2815 may be scrollable text boxes such as the text boxes 2815a, 2815b populated with a list of a plurality of words or phrases, and/or query text boxes such as the query text boxes 2815c, 2815d allowing entry of text, or containing keywords or other elements related to the raw query. The query formation controls 2815 may include any number of text boxes, drop-down lists, etc. provided to form a succinct or structured query.

As shown in the GUI 2800, a succinct query is formed by combining the selection(s) in the query formation text boxes. As shown in FIG. 28, the combination of the selections "What", "is", and "the best that restaurant in Indianapolis" from the query formation text boxes is used to form the succinct query, "What is the best that restaurant in Indianapolis", as displayed in the succinct query indicator 2817.

If a guide requests clarification of a query, the guide may click the "Clarify" button 2810. The "Clarify" button 2810 may cause the GUI 2870 illustrated in FIG. 28A to be displayed.

The chat windows 2855 of FIG. 28 are provided for interaction between an information seeker and a guide(s) or searcher(s). The user chat window 2855a may contain text entered by a user responsive to a clarification request from a guide, text derived from an audio response by a user, controls for playback of one or more audio recordings which may have been provided by a user, images, video, or other media, etc.

The searcher chat window 2855b may be provided to allow a guide to enter free-form text which may be transmitted to a user. The "Send Text" button 2860 is provided to a guide to send dialogue, for example, in response to an information seeker, to request assistance in the construction of a structured query, or to send a structured query to a user for review. Such information may be processed using text-to-speech or other technologies to provide an interface between a user and a guide.

The query suggestion window 2820 is populated with a list of suggested succinct queries. A list of suggested queries may be initially generated in relation to a raw query. As a guide selects an option(s) using the query formation controls 2815, the query selection window 2820 may be automatically modified and/or filtered based on any selection(s). The query suggestion window 2820 may include the currently constructed succinct query and/or any number of succinct queries that are associated with the succinct query as composed using the query formation controls 2815.

If a guide selects a query from the query selection window, the category selection window 2825 may be populated with a list of suggested categories. For example, if a guide selects the query, "What is the best pad That recipe" from the query selection window 2820, the category selection window 2825 may be indicate a category including "Food>Ethnic>That>Indianapolis". If a guide is satisfied with a suggested categorization presented in the category selection window 2825 the "Select Quick Category" button 2830 may be selected. The "Select Quick Category" button will direct the vetting application to omit the categorization operation in the vetting process as shown by the "Categorize" tab in the progress bar and direct the application to the "SWOG/WebGems™" section of the query vetting application. The suggested queries and the categories may include previously suggested queries and/or categories stored in the database 120 (FIG. 1) in relation to keyword(s) contained in the raw query box 2807.

If the "Exit" button 2835 is selected, the search session is ended and the guide is made available. The search session may be transferred to a different guide.

If the "Abuse" button 2840 is selected, a message may be sent to the system database, administrator, etc. reporting the incident. A user who is reported for abuse may not be permitted to utilize the services of a guide. The "Abuse" button 2840 may cause a review of a search session to be conducted. A search session may be terminated and/or transferred to another guide.

The "AutoGuide Query" button 2845 allows a guide to submit information provided in the GUI 2800 for an automated search and/or response. For example, if a guide determines that a search result(s) may be provided without further assistance of a human searcher, selection of the "Auto Guide Query" button 2845 may cause the search system 130 (FIG. 1) to process information obtained using the GUI 2800 to provide a response to a user. For example, information from a search resource may be automatically formatted to provide a response to a user. In at least one embodiment a voice response may be provided using text-to-speech processing and/or a text response may be provided to a user which is automatically generated.

Upon completion of any required information of the query vetting process, a guide may click on the "Next" button 2850. The application will be directed to the categorization section of the application such as the GUI 2900 illustrated in FIG. 29.

Figure 28A:
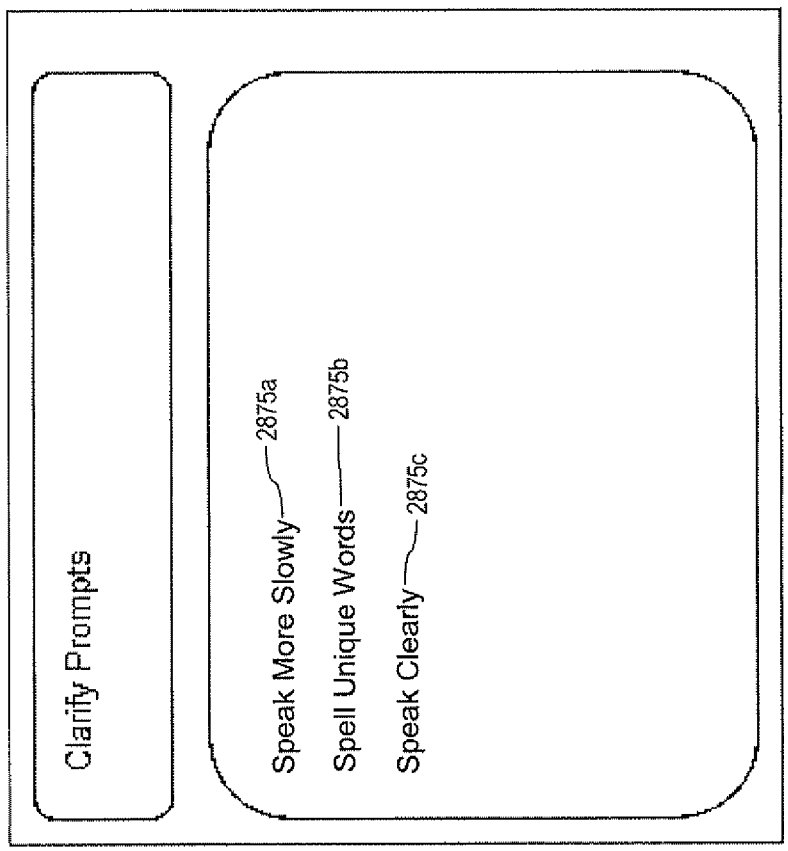
FIG. 28A illustrates a dialogue GUI.

The GUI 2870 illustrated in FIG. 28A allows a guide to request clarification, of a search request from a user. The GUI 2870 may contain a list of standard clarification request phrases such as the clarification prompts 2875. For example in a voice-based interaction with a user activation of the clarification prompt 2875a may send the audio message 'Speak more slowly' to a user. Activation of the clarification prompts 2875b and 2875c may send the associated spoken phrases to a user. Use of a standard set of response phrases may allow a more uniform response to a user. In the case of an interactive chat session, a guide may respond more rapidly using the standard prompts than by typing text in the chat windows 2855 (FIG. 28). In at least one embodiment, a guide may not be provided with the chat window 2855b. The GUI 2870 may be provided as a 'pop-up' or may be provided as an element of the GUI 2800 (FIG. 28).

Figure 29:
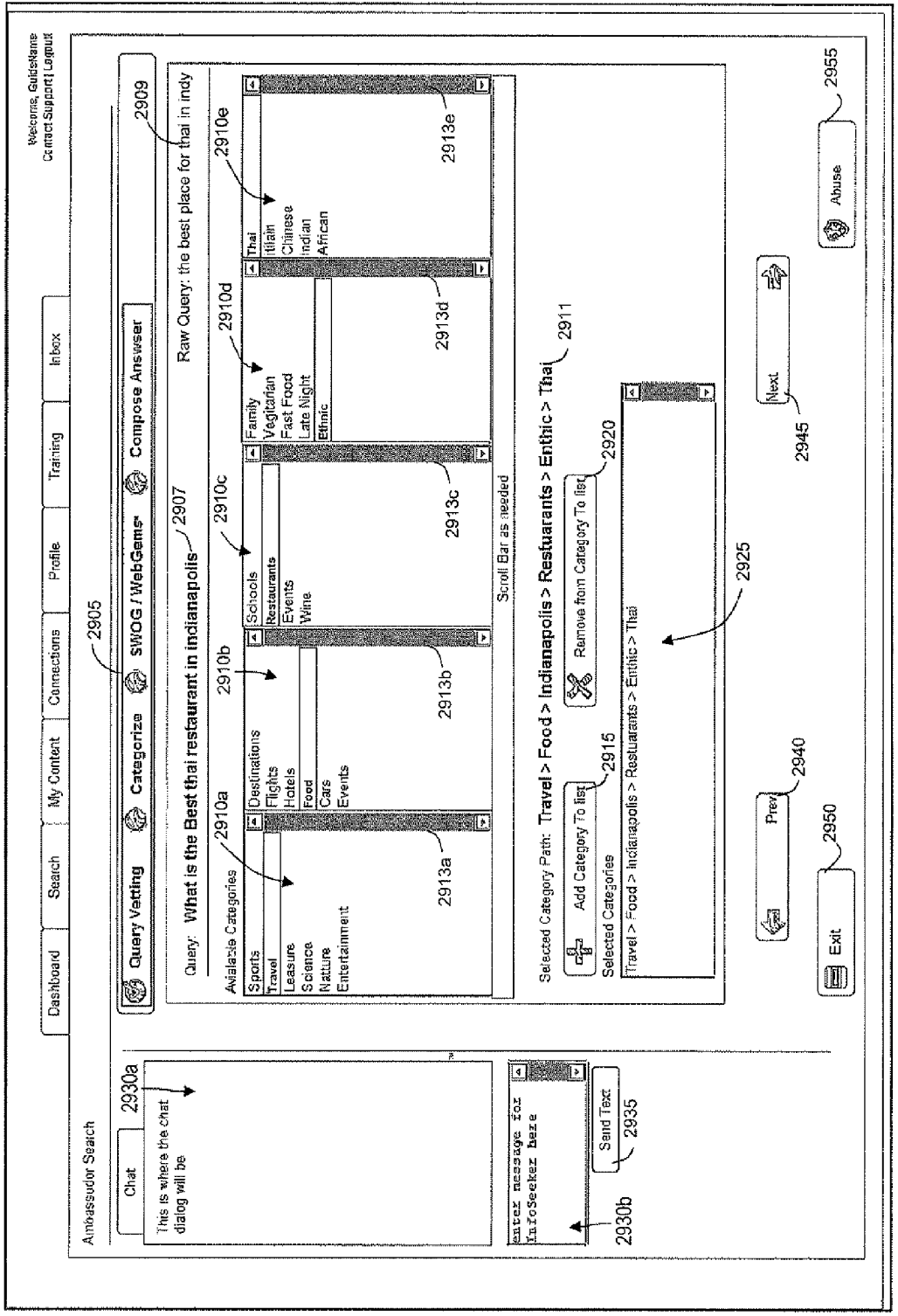
FIG. 29 illustrates a query processing GUI.

As illustrated in FIG. 29, an exemplary GUI 2900 is provided for categorization of a structured query. The GUI 2900 includes a progress bar 2905, a query box 2907, a raw query indicator 2909, category selection controls 2910, an "Add Category to List" button 2915, a "Remove Category from List" button 2920, a categorization list 2925, chat windows 2930, a "Send Text" button 2935, a "Prev" button 2940 a "Next" button 2945, an "Exit" button 2950, and an "Abuse" button 2955. The progress bar 2905 may include a list of a plurality of operations included in the vetting process and any operations may further be subdivided into parts or separate sections as desired. As shown in FIG. 29, any operations of the vetting process that have been completed and the vetting operation currently in progress may be marked by an identifier. In one embodiment, the vetting operations completed are identified by a check mark, and the current vetting operation in progress is highlighted and/or marked a different color. The identification methods in the progress bar 2905 are not limited to any configuration, for example completed vetting operations may be indicated by a flag, strikethrough, etc. and a current vetting operation may be indicated by a flag, underline, highlighted, etc.

A query constructed or selected during the vetting process is displayed in the query box 2907 and the raw query provided to a guide by an information seeker, by the search system database, etc. is displayed in the raw query indicator 2909.

The category selection controls 2910 are provided for selection of a categorization(s) of a query. The category text boxes are populated with a list of a plurality of elements within a taxonomy. The first level categorization control 2910a may include a list of the first level classifications in a taxonomy. Selection of an element using the first level categorization control 2910a may determine elements presented in the second level categorization control 2910b. Selection of an element using the second level categorization control 2910b may determine elements displayed in the third level categorization control 2910c. Selection of an element using the third level categorization control 2910c may determine elements displayed in the fourth level categorization control 2910d and selection of an element using the fourth level categorization control 2910d may determine elements displayed in the fifth level categorization control 2910e. Any number of categorization elements and/or levels may exist and any number of categorization controls and/or lists may be displayed during the categorization process. A guide may select any elements displayed to form a hierarchal category path for categorization of a vetted query. As shown in FIG. 29, the category selection controls 2910 may be scrollable text boxes, drop-down lists, text fields and/or any other form of controls which allow entry or selection of words or characters.

Categorizations associated with a query displayed in the query box 2907 are displayed in the categorization list 2925. If a guide desires to associate a query with a selected categorization he or she may click the "Add Category to List" button 2915. If a guide desires to remove a category from the category list 2925 the guide may click the "Remove Category from List" button 2920.

To navigate to the previous vetting GUI, a guide may select the "Prev" button 2940, and upon completion of the categorization screen, a guide may select the "Next" button 2945 to navigate to the next GUI. The "Next" button 2945 may not be active if required information has not been provided in the GUI 2800 (FIG. 1) or the GUI 2900 (FIG. 29).

As previously explained with respect to FIG. 28, the chat windows 2930a, 2930b are provided for dialogue among an information seeker and guide(s) or searcher(s). The "Send Text" button 2935 is provided for a guide to send dialogue responses to an information seeker. If the "Exit" button 2950 is selected, the search session is ended and the guide is made available. If the "Abuse" button 2955 is selected, a message may be sent to the system database, administrator, etc. reporting the incident.

Upon completion of any required information in the categorization GUI 2900, a guide is directed to the "SWOG/WebGems™" section of the vetting application.

As illustrated in FIG. 30, the GUI 3000 includes a progress bar 3005, a structured query indicator 3007, a raw query indicator 3008, a categorization indicator 3009, a browser window 3010, a "Search without a guide" (SWOG) button 3015, a "Search with a guide" button 3020, a "Transfer to a guide" button 3025, a guide availability lists 3030, a "Prev" button 3035, a "Next" button 3040, an "Exit" button 3045, an "Abuse" button 3050, a chat windows 3055, and a "Send Text" button 3060.

The progress bar 3005 may include a list of a plurality of operations included in the vetting process and any operations may further be subdivided into parts or separate sections as desired, as previously explained with respect to FIG. 28. A query identified during the vetting process is displayed by the structured query indicator 3007 and information of a raw query provided to a guide by an information seeker, by the search system database, etc. is displayed by the raw query indicator 3008. The categorization indicator 3009 displays the selected categorizations associated with the structured query displayed by the structured query indicator 3007.

The results window 3010 may display any number of search results associated with the categorizations selected and the structured query constructed using the GUI 2800 and the GUI 2900. The results window 3010 may be a scrollable window as illustrated in FIG. 30. A guide may review any or all of the search results presented in the results window 3010. A guide may determine if a search result(s) indicated in the results window 3010 should be transmitted to a user.

If a guide selects the "Search without a guide" button 3015, the vetted, categorized query may be submitted for a search without the assistance of a human searcher. This option may be selected if a guide determines that none of the search results indicated in the results window 3010 may satisfy a user request. A guide may interact with a user to make such a determination. Submission of the categorized succinct query for a search without a guide may cause any number of search results to be added to the results indicated in the search results window 3010. A guide may return to the categorization and/or the query vetting GUI to modify the search results and/or the searcher information displayed in the GUI 3000.

A guide may view information displayed in the guide availability list 3030 to determine if a live guide is available to respond to the categorized vetted query. If a guide determines that a suitable guide is available, the guide may select the "Search with a guide" button 3020. The "Search with a guide" button 3020 may cause a search request to be directed to one or more guides who are not currently online. If a guide determines that a suitable guide is not immediately available based on information indicated in the guide availability list 3030, and that a user may accept a search result(s) provided by a guide at a later time, the "Search with a guide" button 3020 may be selected.

If a guide selects the "Transfer to a guide" button 3025, the session is transferred to an available guide associated with the system. A guide may elect to activate the "Transfer to a guide" button for various reasons. For example, a user request may require further interaction with a guide who has domain-specific knowledge, or a user may request a live interactive session with a searcher in order to obtain a search result(s) more rapidly.

A guide may elect to activate any or all of the action buttons 3015, 3020, 3025. While a specific set of options is illustrated in the GUI 3000, other options for conducting a search might be made available in the GUI 3000. Activation of any or all of the action buttons 3015, 3020, 3025 may cause the GUI 3000 to close.

The guide availability list 3030 indicates "online" and "offline" guides or searchers within the system. The online and/or offline statistics may include, for example, the total number of guides, the total number of matching guides, for example those well-suited to receive the search query, etc. Such information may be utilized by a guide in order to determine an optimal match between user requests and system resources.

To navigate to a previous GUI screen, a guide may select the "Prev" button 3035, and upon completion of the current screen, a guide may select the "Next" button 3040 to navigate to the next screen.

As previously explained with respect to FIG. 28, the chat windows 3055a, 3055b are provided for dialogue among an information seeker and guide(s) or searcher(s). The "Send Text" button 3060 is provided for a guide to send dialogue responses to an information seeker. If the "Exit" button 3045 is selected, the search session is ended and the guide is made available. If the "Abuse" button 3050 is selected, a message may be sent to the system database, administrator, etc. reporting the incident, and a guide may be made available.

The GUI 3100 illustrated in FIG. 31 may be presented to a guide subsequent to completion of required information, or to selection of a search result(s) using the GUI 3000 (FIG. 30). The GUI 3100 may be presented to a guide when a search result(s) have been provided responsive to a search request which was handled by another guide. For example, a search result may have been provided by a guide responsive to a user query which was not time critical, or a user may have requested that a search result(s) be provided as soon as possible, or a user may have requested that a search result(s) be provided using one or more communication services, etc. In such cases, a guide may be presented with the GUI 3100 illustrated in FIG. 31 without providing information required in the GUI 2800, the GUI 2900, or the GUI 3000.

As illustrated in FIG. 31, the GUI 3100 includes a progress bar 3105, a structured query indicator 3107, a raw query indicator 3108, a categorization indicator 3109, a full answer window 3110, a formatted answer window 3115, a "Submit answer" button 3120, a "Revert to last valid" button 3125, a "Prev" button 3130, an "Exit" button 3135, an "Abuse" button 3140, a chat windows 3145, a "Send Text" button 3150.

The progress bar 3105 may include a list of a plurality of operations included in the vetting process and any operations may further be subdivided into parts or separate sections as desired, as previously explained with respect to FIG. 28.

The structured query indicator 3107 indicates a vetted query associated with a search result(s) indicated in the full answer window 3110. The raw query indicator 3108 indicates a raw query as provided to a guide by an information seeker, by the search system database, etc. The categorization indicator 3109 indicates one or more category(ies) associated with a vetted query indicated in the structured query indicator 3107. The full answer window 3110 may indicate any search result(s) which have been provided responsive to a search request. Search result(s) associated with the vetted query and the categorization(s) indicated in the structured query indicator 3107 and the categorization indicator 3109 are displayed in the full answer window 3110.

The full answer window may be provided as a text box, scrollable window, drop-down list populated with a plurality of search results, etc. The formatted answer window 3115 displays a response to a user query which has been formatted to match one or more communication services associated with a user. For example, a search result may be modified in order to fit the maximum length of an SMS message; a search result may be modified to be a set of phonetic symbols in order that an audio response may be delivered to a users a search result(s) may be formatted for multiple communication services.

Various type(s) of modification(s) of a search result(s) may be presented in the formatted answer window 3115. The formatted answer window 3115 may be provided as a text box, scrollable window, drop-down list populated with a plurality of answers, etc. A guide may be able to modify information indicated in the formatted answer window 3115. For example, a guide may type, and/or paste text or other information from a search result(s) presented in the full answer window 3110 into the formatted answer window 3115. The formatted answer window 3115 may provide various forms of assistance for a guide to create a formatted answer. For example, the number of characters contained in a text message may be displayed in order that a guide may know when a limit has been reached, or a number of seconds of audio, or video may be indicated, or a number or size of images may be indicated, or a rendering of a result(s) on a user device may be indicated, etc.

If a guide selects the "Submit answer" button 3120, the formatted answer is transmitted to a user. If a guide selects the "Revert to last valid" button 3125, modifications to a formatted answer may be canceled and a previous formatted answer may be presented in the formatted answer window 3115.

To navigate to a previous GUI screen, a guide may select the "Prev" button 3130. As previously explained with respect to FIG. 28, the chat windows 3145a, 3145b are provided for dialogue among an information seeker and guide(s) or searcher(s). The "Send Text" button 3150 is provided for a guide to send dialogue responses to an information seeker If the "Exit" button 3135 is selected, the search session is ended and the user is made unavailable. If the "Abuse" button 3140 is selected, a message may be sent to the system database, administrator, etc. reporting the incident.

An alternate embodiment of tools for creation of a vetted query is illustrated below. The alternate embodiment may be used by an ambassador to process a user request.

As illustrated in FIG. 32, the GUI 3200 includes a customer information window 3202, an advertisement window 3208, a query building window 3210, a category selection window 3230, a location selection window 3238, a 'Send to Guide' button 3242, a status selection tool 3244, and user controls 3246.

The customer information window 3202 may include the last known location indicator 3204 and the recent activity indicator 3206. The last known location indicator 3204 may display a user's most recent geographic location. This information may be used by the search system and/or a guide to facilitate provision of a query answer to a user that is relevant to a certain location, area, region, etc. The recent activity indicator 3206 may display a user's most recent use of the search system and other context information which may be relevant to a request. For example, the recent activity indicator 3206 may display a user's previous query(ies), responses by the search system, any advertisements that may have been provided to the user, previous search results, profile information of a user, etc. The advertisement window 3208 may display a selected advertisement based on content of the GUI 3200, which may be transmitted to a user based on actions of a guide.

Prior to a providing a response to a query, an initial guide or ambassador may user the GUI 3200 to develop a well-formed or structured query from a user submitted query, categorize the query, provide a database response, ask a user for clarification, report abuse to the search system, etc, before passing (forwarding) the well-formed query on to an additional guide (s). The query building window 3210 may include a query type control 3212, a session time indicator 3214, query segment selection tools 3216, query segment controls 3218, a query building text box 3220, interrogative word selection controls 3222, a suggested questions window 3224, suggested question indicators 3226, and a scrolling control 3228.

Figure 37:
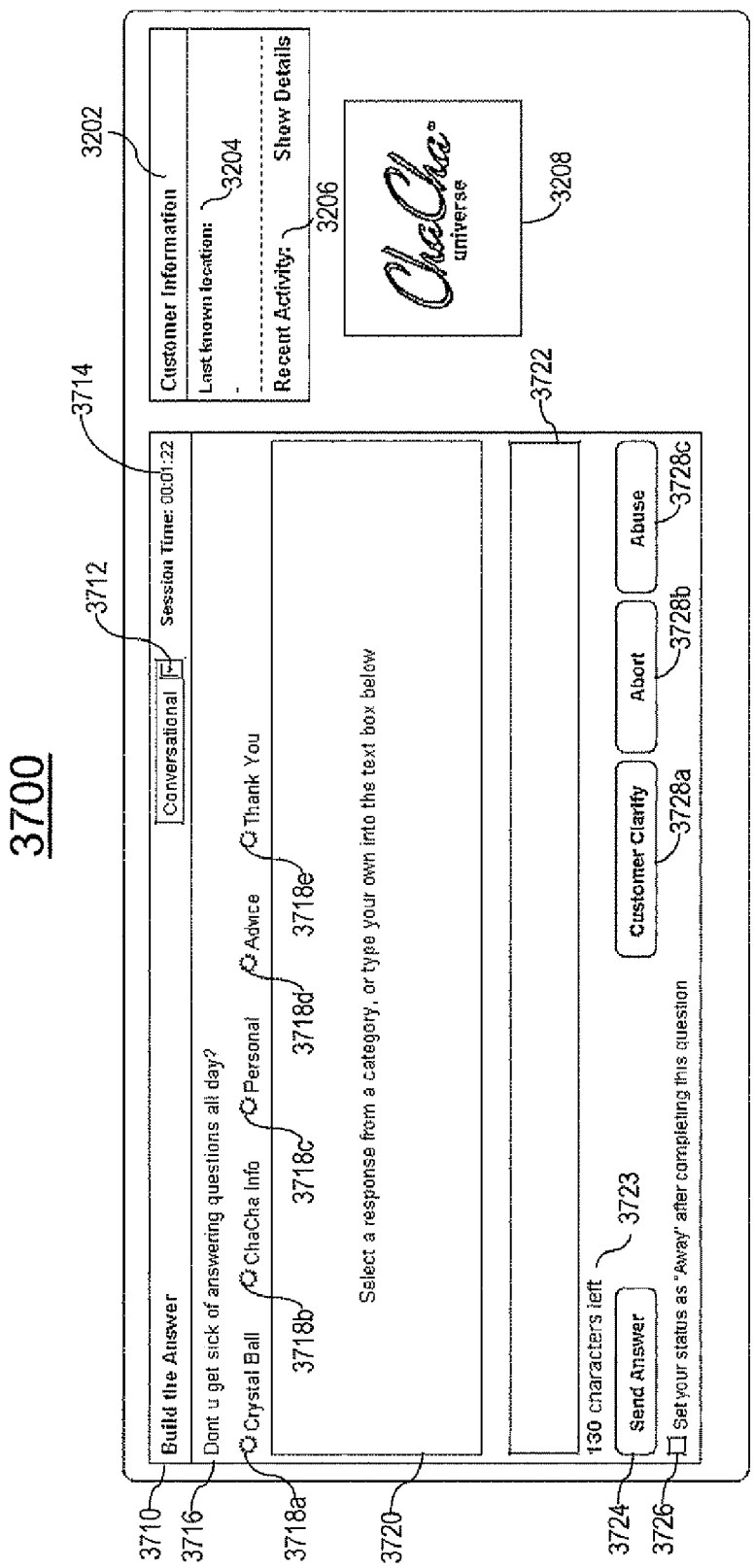
FIG. 37 illustrates a query processing GUI.

The query building window 3210 may be used by a guide to develop a well-formed query based upon a user submitted query. For example, as illustrated in FIG. 32, the query 'Translate oso from spanish to english' has been submitted to the search system. A guide may use the query type control 3212 to classify a response that may be provided in return to an incoming query. For example, an incoming query may be classified as a 'Standard' in which a guide may continue through the GUI 3200 building a well-formed query in response to the user submitted query. Alternatively, the query type control 3212 may include the option 'Conversational', which if selected by a guide, may result in the GUI 3700 as shown in FIG. 37 being presented. The session time indicator 3214 may display the amount of time that is being spent by a guide using the GUI 3200.

The query segment selection tools 3216 may allow a guide to select any number of the initial segments of a user submitted query to include in a well-formed query that may be assembled in the query building text box 3220. For example, a guide may choose to select only the subject of a user submitted query, such as the word 'oso' illustrated in FIG. 32. If a guide selects the query segment selection tool 3216b corresponding to the word 'oso' then the word 'oso' would be added to the query building text box 3220. To select all segments of a user submitted query, the query segment controls 3218 may include a 'Select All' control 3218a, and to deselect all segments of a user submitted query, the 'Reset All' control 3218b may be included.

The interrogative word selection controls 3222 may include any number of interrogative words that a guide my select in assembling a well-formed query in the query building text box 3220. For example, if a query is submitted to the search system by a user in a declarative form, a guide may choose to start a well-formed query with a word such as 'Who' 3222a, 'What'3222b, etc.

Figure 33:
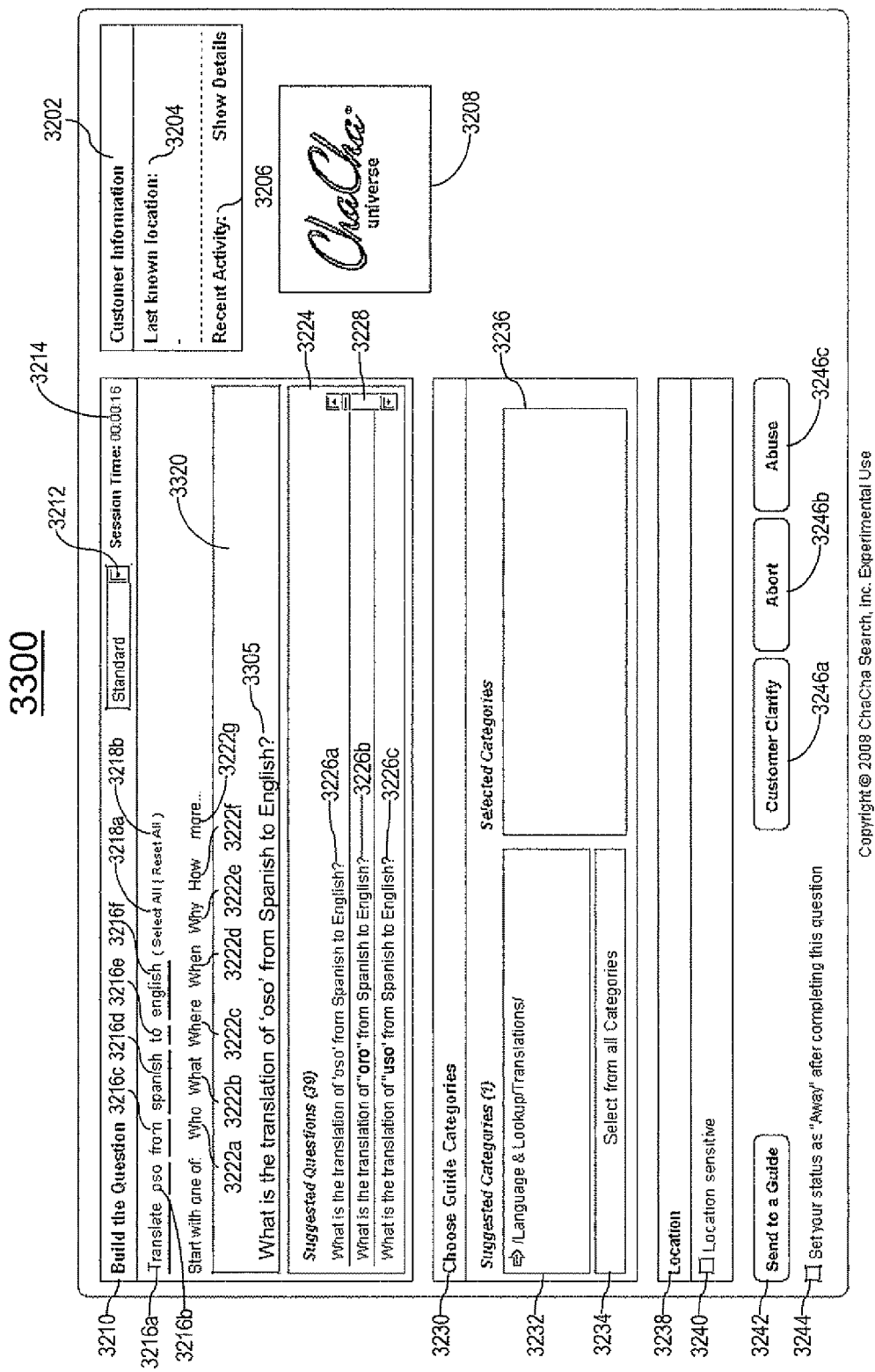
FIG. 33 illustrates a query processing GUI.

The query building window may include the suggested questions window 3224. The suggested questions window 3224 may include any number of suggested question indicators 3226 contained in the search system database. The suggested questions 3226 may be provided by the search system database as associated with the user submitted query based on any of the words or segments contained in the user submitted query. For example, as illustrated in FIG. 32, the search system database has returned the suggested questions, 'What is the translation of 'oso' from Spanish to English?', ', 'What is the translation of 'oro' from Spanish to English?' and, 'What is the translation of 'uso' from Spanish to English?' based on the user submitted query, 'Translate oso from spanish to english'. A guide may use the scrolling control 3228 to view any additional suggested questions that may not be displayed. A guide may select a suggested question indicator 3226 by clicking or otherwise selecting the question. If a guide selects a suggested question indicator 3226, the selected question is entered into the query building text box 3220 as shown in FIG. 33.

The category selection window 3230 may contain the suggested categories window 3232, the categories selection control 3234, and the selected categories window 3236. The suggested categories window 3232 may display any categories determined by the search system to be a potential category associated with the user submitted query. For example, as illustrated in FIG. 32, the category '/Language & Lookup/Translations/' is displayed in the suggested categories window 3232 as a potential 'match' to the user submitted query, 'Translate oso from spanish to english'. A guide may use the categories selection control 3234 to select any category that may not be contained in the suggested categories window 3232. If a guide selects a category from the suggested categories window 3232, such selection may be indicated by the addition of the suggested category to the selected category window 3234 as shown by the selected category in FIG. 34.

The location selection window 3238 may include a location selection control 3240. If a guide determines that a user submitted query may be location related, a guide may select the location selection control 3240 in which case a subsequent guide may better provide an answer to a user submitted question.

The 'Send to a Guide' button 3242 may be selected if a guide has completed the assembly, formation, selection or otherwise of a well-formed query, and completed categorization of the query, or other operations as may be determined by the search system. A guide may select the 'Send to Guide' button to pass the vetted query to an additional guide(s), or to the search system that may in turn provide an answer to a user submitted query based on the vetted query. A guide may alternatively select from the user controls 3246. The 'Customer Clarify' user control 3246a may be selected to obtain clarification of a user submitted query and/or obtain additional information from a user that may be advantageous in forming a well-formed query. The 'Abort' user control 3246b may be used to cancel the current session and close the GUI 3200. The 'Abuse' user control 3246c may be used to report abuse or other prohibited behavior of a user to the search system. In addition, a guide may select the status selection tool 3244 to indicate that the guide desires to change his or her status to 'Away' and not accept additional queries after completion of the current session.

As illustrated in FIG. 33, a guide has made a selection of the suggested question 3226a of GUI 3200 (FIG. 32). GUI 3300 (FIG. 33) illustrates a guide's selection of a suggested question contained in the suggestion question window 3224. As illustrated in GUI 3300, a guide has selected the suggested question 3226a, 'What is the translation of 'oso' from Spanish to English?'. If selected, a suggested question contained in the suggested question window 3224 may be entered into the query building text box 3320. For example, as shown in GUI 3300, the suggested question 3226a has been selected and is shown as the selected suggested question 3305 displayed in the query building text box 3320.

Figure 34:
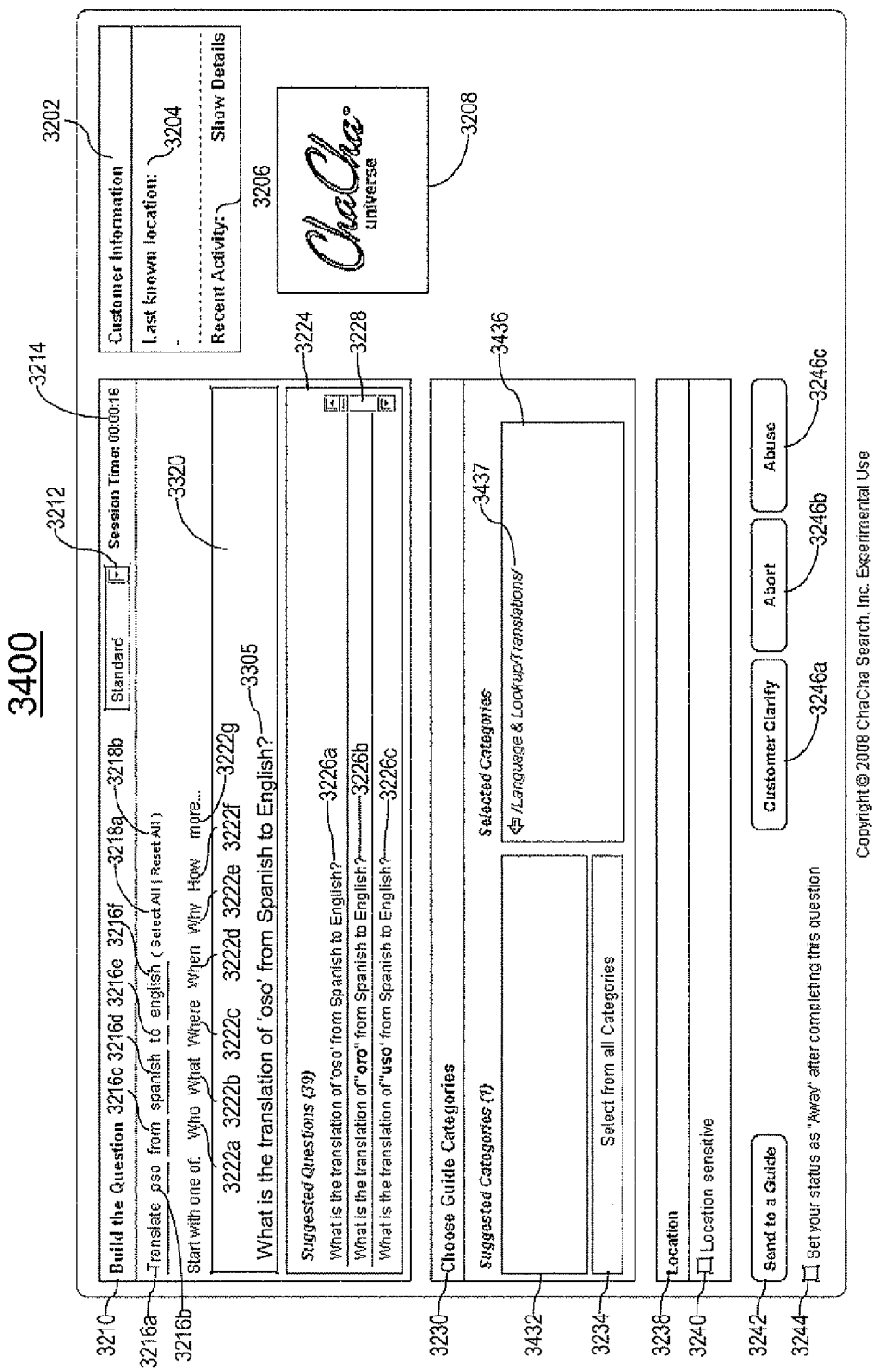
FIG. 34 illustrates a query processing GUI.

As illustrated in FIG. 32, a guide has made a selection of the suggested category contained in the suggested categories window 3232 of GUI 3200 (FIG. 32). GUI 3400 (FIG. 34) illustrates a guide's selection of a suggested category contained in the suggested category window 3232 using the category selection control 3234. As illustrated in GUI 3400, a guide has selected the suggested category '/Language & Lookup/Translations/'. If a guide selects a suggested category from the suggested category window 3232, the category is moved from the suggested category window 3232 to the selected categories window 3236. As a result, as illustrated in FIG. 34, the suggested category window 3432 of GUI 3400 no longer contains a suggested category. The suggested category has been selected, becoming the selected category 3437 of the selected category window 3436 of GUI 3400.

Figure 35:
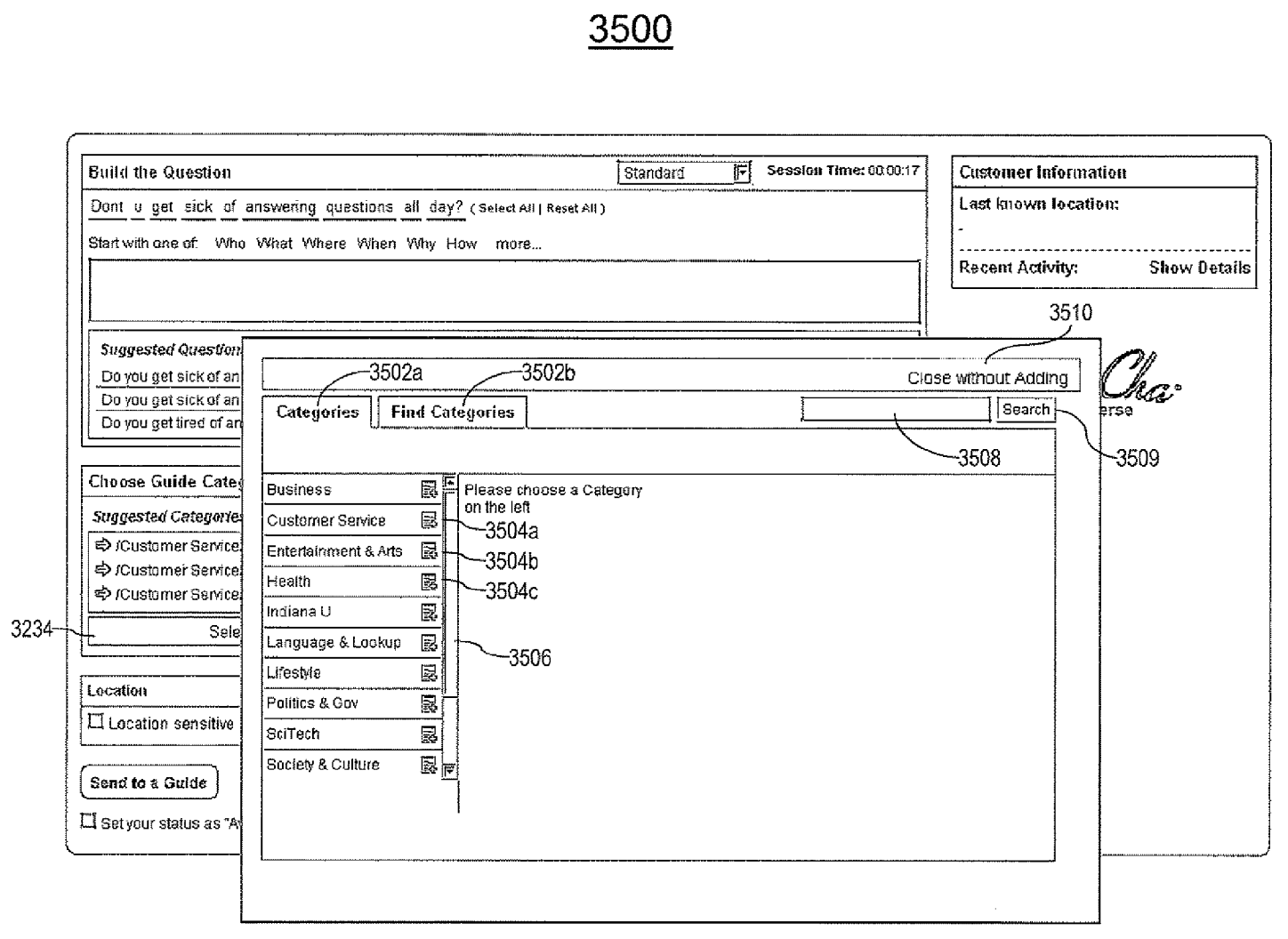

If a guide determines that the suggested categories are not sufficient, a guide may select the categories selection control 3234 to display any categories contained in the search system database. As illustrated in FIG. 35, a guide's selection of the categories selection control 3234 may result in the GUI 3500 being presented to the guide. The GUI 3500 may be presented as at 'pop-up' window. The GUI 3500 may contain the category tabs 3502, the category list 3504, the category scroll tool 3506, the search box 3508, the search selection control 3509 and the cancellation control 3510.

The GUI 3500 may contain any number of category tabs 3502. As illustrated in FIG. 35, the GUI 3500 contains the 'Categories' tab 3502a and the 'Find Categories' tab 3502b. Selection of the 'Categories' tab 3502a may display the category list 3504. The category list 3504 may be populated with any categories that may be contained in the search system database. For example, the category list contains the categories, 'Customer Service' 3504a, 'Entertainment & Arts' 3504b, 'Health' 3504c, as well as additional categories that are illustrated. A guide may use the category scroll tool 3506 to navigate up and down the category list 3504. A guide may select any category contained in the category list 3504 by 'clicking' on or otherwise selecting a category.

The GUI 3500 may contain the search box 3508 to allow a guide to enter text to search available categories contained in the search system database. If a guide enters text into the search box 3508, a guide may select the search selection control 3509 to initiate a search of the search system database on the entered text. The system may locate number of categories based on association of a search term with the text entered by a guide.

As illustrated in FIG. 35, the GUI 3500 may contain additional category tabs, such as the 'Find Categories' tab 3502b that may allow for additional searching or selection of desired categories. The cancellation control 3510 may allow a guide to exit or cancel out of the GUI 3500, or return to a previous window or GUI without making a selection of any category.

Figure 36:
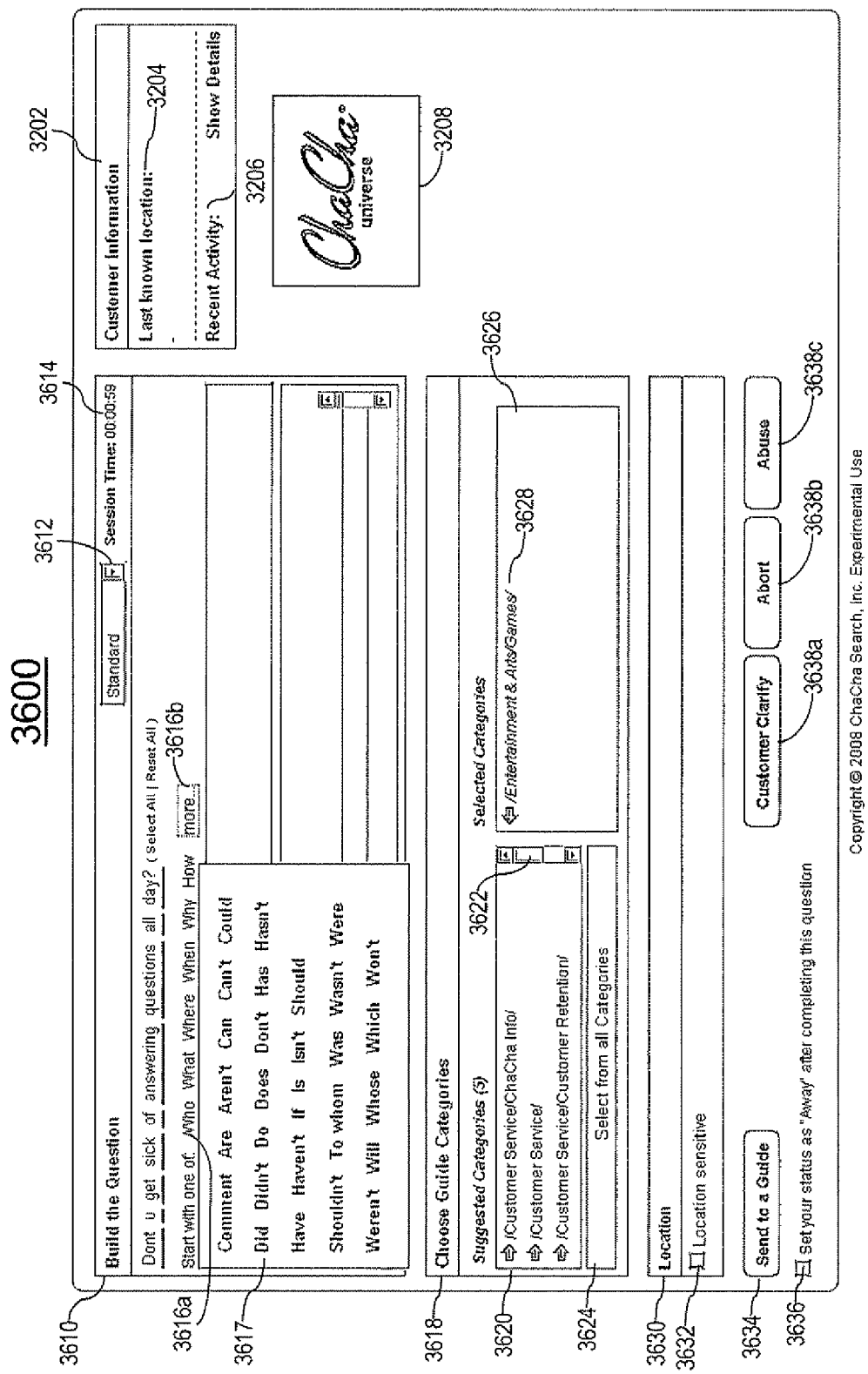
FIG. 36 illustrates a query processing GUI.

As illustrated in FIG. 36, GUI 3600 includes a customer information window 3202, an advertisement window 3208, a query building window 3610, a category selection window 3618, a location selection window 3630, a 'Send to a Guide' button 3634, a status selection tool 3636, and user controls 3638.

The query building window 3610 may include a query categorization control 3612, a session time indicator 3614, interrogative word selection controls 3616 and interrogative word window 3617.

The query building window 3610 may display a user submitted query with grammatical errors. For example, as illustrated in FIG. 36, the query 'Dont u get sick of answering questions all day?' has been submitted to the search system. The query contains the letters 'Dont' which a guide may recognize to be the interrogative word, 'Don't', however as 'Don't' is not displayed as a choice of the visible interrogative word selection controls 3616a, a guide may select the interrogative word 'more' selection control 3616b resulting in additional words display in the interrogative word window 3617. A guide may select any of the words contained in the interrogative word window 3617 in assembling a well-formed query.

The category selection window 3618 may contain the suggested categories window 3620, the categories scroll control 3622, the categories selection control 3624, the selected categories window 3626 and the selected categories 3628. The suggested categories window 3620 may display any categories determined by the search system to be a potential category(ies) associated with the user submitted query. For example, as illustrated in FIG. 36, the categories, '/Customer Service/ChaCha Info/', '/Customer Service/' and '/Customer Service/Customer Retention/' are displayed in the suggested categories window 3620 as potential 'matches' to the user submitted query, 'Dont u get sick of answering questions all day?'. As illustrated, the text '(5)' of the suggested categories window 3620 indicates that the search system database returned five potential matches. As three categories are visible in the suggested categories window 3620, a guide may use the categories scroll control 3622 to navigate up and down the window to display additional categories. A guide may use the categories selection control 3624 to select any category that may not be contained in the suggested categories window 3620. If a guide selects a category from the suggested categories window 3620, such selection may be indicated by the addition of the suggested category to the selected category window 3626 as shown by the selected category 3628 in FIG. 36.

The location selection window 3630 may include a location selection control 3632. If a guide determines that a user submitted query may be location related, a guide may select the location selection control 3632 in which case a subsequent guide may better provide an answer to a user submitted question.

The 'Send to a Guide' button 3634 may be selected if a guide has completed the assembly, formation, selection or otherwise of a well-formed query, and completed categorization of the query, or other operations as may be determined by the search system. A guide may select the 'Send to Guide' button to pass the vetted query to an additional guide(s), or to the search system that may in turn provide an answer to a user submitted query based on the vetted query. A guide may alternatively select from the user controls 3638. The 'Customer Clarify' user control 3638a may be selected to obtain clarification of a user submitted query and/or obtain additional information from a user that may be advantageous in forming a well-formed query. The 'Abort' user control 3638b may be used to cancel the current session and close the GUI 3600. The 'Abuse' user control 3638c may be used to report abuse or other prohibited behavior of a user to the search system. In addition, a guide may select the status selection tool 3636 to indicate that the guide desires to change his or her status to 'Away' and not accept additional queries after completion of the current session.

The session time indicator 3614 may keep track of the total time a guide has spent on a particular query and display the amount of time that is being spent by the guide using the GUI 3600. A guide may use the query type control 3612 to classify a response that may be provided in return to an incoming query. For example, an incoming query may be classified as a 'Standard' in which a guide may continue through the GUI 3600 building a well-formed query in response to the user submitted query. Alternatively, the query type control 3612 may include the option 'Conversational', which if selected by a guide, may result in the GUI 3700 as shown in FIG. 37 being presented. For example, a guide may recognize the user submitted query, 'Dont u get sick of answering questions all day?' as a conversational query as opposed to a standard or fact-based question. Use of the query type control 3612 may allow an ambassador guide to rapidly respond to queries which require minimal effort. For example, a standard set of responses may be provided for queries which are within a class. If a guide uses the query type control 3612 to indicate 'Conversational' a GUI such as the GUI 3700 (FIG. 37) may be displayed.

As illustrated in FIG. 37, a guide has selected the 'Conversational' selection of the categorization control 3712 resulting in the display of the GUI 3600. The GUI 3700 may be used by a guide to assemble an answer to a user submitted query that the guide has recognized as conversational in nature. As illustrated in FIG. 37, the GUI 3700 includes a customer information window 3202, an advertisement window 3208, an answer building window 3710, a query type control 3712, a session time indicator 3714, a user submitted query 3716, conversational type selection tools 3718, a provided answer display window 3720, an answer building text box 3722, a 'Send Answer' button 3724, a status selection tool 3726, and user controls 3728.

The answer building window 3710 displays the user submitted query 3716. The conversational category selection tools 3718 may be selected by a guide based on a guide's interpretation of the user submitted query 3716. For example, as illustrated in FIG. 37, the user submitted query, 'Don't you get sick of answering questions all day?' may be interpreted to be a conversational query that elicits an answer from the category, 'Thank You' of the category selection tool 3718e. Alternatively, a user submitted query may be better answered by a conversational category of 'Crystal Ball' 3718a, 'ChaCha info' 3718b, 'Personal' 3718c, or 'Advice' 3718d. If a guide selects any of the conversational category selection tools 3718, individual responses associated with the selected category in the search system database may be displayed in the provided answer display window 3720. A guide may select any response displayed in the provided answer display window 3720 to submit as a response to a query. Alternatively, a guide may use any part of a provided answer and/or his or her own text as a response to a user submitted query by entering such text into the answer building text box 3722. The text remaining indicator 3723 may display the number of characters a guide has remaining to provide in the answer building text box 3722 based on a total number of characters and/or words that a guide is allowed to use in building his or her answer. The number of characters may be based on a user device constraint, or any system constraints.

The 'Send Answer' button 3724 may be selected if a guide has completed the assembly, formation, selection or otherwise an answer in response to the user submitted query. A guide may alternatively select from the user controls 3728. The 'Customer Clarify' user control 3728a may be selected to obtain clarification of a user submitted query and/or obtain additional information from a user that may be advantageous in forming an answer. The 'Abort' user control 3728b may be used to cancel the current session and close the GUI 3700. The 'Abuse' user control 3728c may be used to report abuse or other prohibited behavior of a user to the search system. In addition, a guide may select the status selection tool 3726 to indicate that the guide desires to change his or her status to 'Away' and not accept additional queries after completion of the current session.

Using the methods and systems described herein, a guide(s) or human searcher(s) may be pre-screened prior to registration. Subsequent to registration, a guide may be trained and tested to determine if the guide is competent to perform a task(s). A guide may be trained and certified to perform as an ambassador guide, a live guide, a searcher guide, an SMS guide, and/or to perform other tasks.

An ambassador may act as a 'first line' responder to a user request. An ambassador guide is trained and provided with a toolset which allows the ambassador to construct a vetted query. A vetted query is categorized, formatted to remove spelling, grammar, structure or other natural-language ambiguities or errors, and may be associated with information such as a location, or attributes of a user who submitted a query.

Utilizing an ambassador, who may spend a few seconds to at most a few minutes to process a query, the cost to serve a customer is greatly reduced.

An ambassador may respond to a user request which does not require a rigorous search using a tool which provides a selection of approved response options. By responding with a standardized set of responses which may be targeted by the search system, efficiency of the ambassador may be improved while retaining the human touch and avoiding unstructured replies. As a query which is not requesting information is not directed to a searcher, the quality of such a response is improved, and searchers are not occupied with irrelevant queries. By providing an ambassador, the cost and speed of response to a user request is improved. An ambassador may create a query which may be mapped to a query in a database which may be associated with a search result(s). The more effective categorization and systematic formulation of a query may greatly increase the reuse of previous answers, reducing cost and improving answer quality.

Pre-processing of a query by an ambassador may reduce the time required by a searcher to provide a response, as a searcher receives a request which is clear, concise and is directed to or forwarded to an appropriate searcher. A less experienced or lower cost searcher may be selected which may reduce the overall cost to serve a customer. A better targeted advertisement may be delivered to a user more rapidly, which may be provided to the user during a search process.

As a raw query is mapped to a vetted or structured query, the re-use of search results may be improved. The mapping of a raw query to a structured query may be personalized to a user, as an ambassador may indicate relevance of location, and may categorize a request, and may include information based on a history record obtained by the search system An ambassador guide may be presented with information regarding availability of system resources. An ambassador guide may be able to view information regarding search result(s), available searcher(s), rating information, etc. which may be used to respond to a user search request. An ambassador guide may respond to a user request, may transfer a search request to a searcher or other guide, and/or may utilize an automated search resource to respond to a user. An ambassador guide may select one or more communication services which may be used to provide information to a user responsive to a search request(s).

When a search result(s) is available, an ambassador guide may review a result(s) and may determine whether and/or how a search result(s) is provided to a user. An ambassador guide may interact with a user to determine how information responsive to a search request is transmitted to a user. An ambassador guide may process a search result(s) so that it is suited to a user device(s) and/or communication service(s). An ambassador may be provided with a tool set which may be used to perform formatting or other processing of information provided responsive to a search request. An ambassador guide may select an advertisement and/or other information to be provided to a user responsive to a search request.

Information of activity by ambassador guides may be used to improve automated matching of requests to resources. For example, a database of requests which have been associated with vetted queries may be used to improve automated categorization, structuring of a query, etc. in order that a query may be answered automatically and/or may be automatically routed to a suitable searcher without the intervention of an ambassador. The ambassador activity may be preformed more rapidly than a free-form search activity. As a result, the compensation of an ambassador per activity may be lower than that for a searcher. If the percentage of queries which can receive either an automated response or a response from an ambassador is increased, overall system costs and efficiency may be improved. Likewise, as a vetted query may be directed to a more knowledgeable searcher, response time of the searcher, quality of a search result, and user experience may be improved.

While the ambassador role has been described in the context of a search request, it may be applied in other types of human-assisted information processing. For example, an ambassador might determine that a request included a request for a product, service, or item. An ambassador might obtain additional information from a user and route the user to a guide or other person who might fulfill the user request.

The disclosed system and method includes forwarding a request of a user to a human guide who qualifies a request based on a review of information of the request and executing a search using the request qualified by the guide.

The many features and advantages of the claimed invention are apparent from the detailed specification and, thus, it is intended by the appended claims to cover all such features and advantages of the claimed invention that fall within the true spirit and scope of the invention. Further, since numerous modifications and changes will readily occur to those skilled in the art, it is not desired to limit the invention to the exact construction and operation illustrated and described for the disclosed embodiments, and accordingly all suitable modifications and equivalents may be resorted to, failing within the scope of the claimed invention. It will further be understood that the phrase "at least one of A, B and C" may be used herein as an alternative expression that means "one or more of A, B and C."

What is claimed is:

1. A method, comprising:
receiving a search request;
ranking an item based on the search request;
directing the search request to a guide;
providing an indicator of the item to the guide, the guide modifying the search request by activating the indicator; and
providing a search result responsive to the modified search request.

2. The method of claim 1, comprising:
providing to the guide a query indicator in an order based on a rank of a structured query based on a keyword of the search request;
associating a category with the search request based on a selection from a ranked list; and
determining whether a geographic location indicated to the guide is relevant to the search request based on an activation of a location indicator.

3. The method of claim 2, further comprising:
selecting the search result based on activation of the query indicator and a rating of the search result for a query; and
formatting said search result to be compatible with a user device.

4. The method of claim 2, further comprising:
presenting historical information of a user submitting the search request including a previous search request of the user and a profile describing the user to the guide;
providing the modified search request to a human searcher, and wherein the human searcher provides the search result and wherein the human searcher is registered for a keyword, and the human searcher is selected based on a ranking of the human searcher for the keyword of the modified search request; and the human searcher formats said search result to be compatible with a user device.

5. The method of claim 1 wherein the search result is provided by submitting the modified search request to a search resource selected based on a category associated with the resource and the modified search request and wherein a user interface determined by a classification assigned to the search request is provided to the guide.

6. The method of claim 5, wherein the guide reviews the search result prior to the search result being provided to a user submitting the search request.

7. The method of claim 1, wherein the guide is a trained specialist in query modification.

8. The method of claim 1, wherein the search result is provided by obtaining an answer rated highest for a query when determining that the query is indicated by a selection from a list of indicators.

9. The method of claim 1, wherein the item includes one of a geographic location, a category and a structured query.

10. The method of claim 1, comprising:
presenting the guide with a template associated with a search resource, wherein said modifying is based on a selection of a segment of the search request by the guide.

11. The method of claim 1, wherein said modifying of the search request by the guide is rated.

12. The method of claim 1, wherein the guide selects a ranking criterion of a human searcher selected to execute a search responsive to the modified search request.

13. The method of claim 1, wherein said ranking is based on information from multiple guides registered in association with a subject matter of the search request.

14. The method of claim 13, wherein the information is of prior requests handled by the guides.

15. The method of claim 1, wherein an advertisement selected based on the item is provided with the search result.

16. The method of claim 1, further comprising:
selecting the guide based on availability of the guide and a ranking of the guide for the item.

17. The method of claim 1, further comprising:
selecting the guide based on a ranking of the guide based on a number of requests received by the guide which are searched by another guide.

18. The method of claim 1, further comprising:
presenting a category to the guide in an order based on a ranking of the category;
presenting a user interface to the guide based on a classification of the search request by the guide;
distributing a query to the guide in an order based on a rank of the query;
ranking the query based on the modified search request;
determining a geographic location relevant to the search request based on an activation of a location indicator by the guide;
displaying an advertisement to the guide based on the ranking;
directing the modified search request to a searcher registered for a keyword of the modified search request;
selecting the searcher based on a ranking of the searcher for the modified search request;
providing to an expeditor a response of the searcher based on a ranking of the expeditor for the search result; and
retrieving the search result based on a capability of a user device as indicated to the expeditor and the response.

19. A system, comprising:
a user device submitting a search request;
a search system ranking an item for the search request and distributing the search request to an ambassador, determining whether assistance of a guide will be used, and choosing the ambassador and a searcher;
an ambassador device receiving an indicator of the item based on a rank of the item and modifying the search request based on the indicator;
a database system providing a search result ranked highest for a query selected based on the modified search request when determining that the ambassador device has selected an indicator of the query; and
a searcher system providing the search result.

20. A non-transient computer readable medium storing therein a program for causing a computer to execute an operation including processing a request, comprising:
forwarding a request of a user to a human guide who modifies the request;
selecting the human guide based on a rating of the human guide;
rating the human guide based on a source of the request;
providing an indicator of items comprising at least one of a category and a query to the human guide in an order based on a rank of an item for the request;
modifying the request based on a selection of the indicator of the item by the human guide; and
executing a search by submitting the modified request to a search resource selected based on the ranking and the modified request.

* * * * *